(12) United States Patent
Yamada et al.

(10) Patent No.: US 6,512,841 B2
(45) Date of Patent: Jan. 28, 2003

(54) IMAGE PROCESSING SYSTEM

(75) Inventors: Masahiko Yamada, Kanagawa-ken (JP); Eiji Ogawa, Kanagawa-ken (JP); Hideya Takeo, Kanagawa-ken (JP); Kazuo Shimura, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/144,522

(22) Filed: Aug. 31, 1998

(65) Prior Publication Data

US 2002/0154797 A1 Oct. 24, 2002

(30) Foreign Application Priority Data

Aug. 29, 1997 (JP) .............................................. 9-234400
Aug. 29, 1997 (JP) .............................................. 9-234401
Sep. 30, 1997 (JP) .............................................. 9-265553
Sep. 30, 1997 (JP) .............................................. 9-265649
Sep. 30, 1997 (JP) .............................................. 9-265650

(51) Int. Cl.[7] ................................................. G06K 9/00
(52) U.S. Cl. ...................................... 382/128; 128/922
(58) Field of Search ................................. 382/128, 162, 382/129, 130, 131, 132, 133; 358/518, 520, 519; 346/154

(56) References Cited

U.S. PATENT DOCUMENTS

| 4,315,318 A | | 2/1982 | Kato et al. ................... 364/515 |
|---|---|---|---|
| 4,317,179 A | | 2/1982 | Kato et al. ................... 364/515 |
| 4,534,059 A | | 8/1985 | Yamada ........................ 382/54 |
| 5,003,326 A | * | 3/1991 | Suzuki et al. ................ 346/154 |
| 5,172,419 A | | 12/1992 | Manian ........................ 382/6 |
| 5,272,339 A | | 12/1993 | Shimura et al. ............. 250/584 |
| 5,359,702 A | | 10/1994 | Mukai ......................... 395/109 |
| 5,581,376 A | * | 12/1996 | Harrington ................... 358/518 |
| 5,684,889 A | * | 11/1997 | Chen et al. .................. 382/128 |
| 5,740,267 A | | 4/1998 | Echerer et al. .............. 382/132 |
| 5,812,286 A | * | 9/1998 | Lin ............................. 358/519 |
| 5,961,457 A | * | 10/1999 | Raylman et al. ............. 600/436 |
| 5,978,107 A | * | 11/1999 | Murai et al. ................. 358/520 |
| 6,091,848 A | * | 7/2000 | Yamamoto .................... 382/162 |

* cited by examiner

*Primary Examiner*—Leo Boudreau
*Assistant Examiner*—Abolfazl Tabotabor
(74) *Attorney, Agent, or Firm*—Sughrue Mion, PLLC

(57) ABSTRACT

At least one kind of image input modality and at least one kind of image information output device are connected to an image processing system. At least one kind of image input modality, which is among connected image input modalities, includes a plurality of image information input apparatuses having different input device characteristics. The image processing system comprises a standardization device for carrying out transform processing on image information such that, in every case where the image information has been received from one image information input apparatus, which is among the plurality of the image information input apparatuses, the received image information may be transformed into standard image information, which does not depend upon the input device characteristics of the one image information input apparatus and depends upon standard device characteristics having been set previously for the image input modality including the one image information input apparatus.

53 Claims, 34 Drawing Sheets

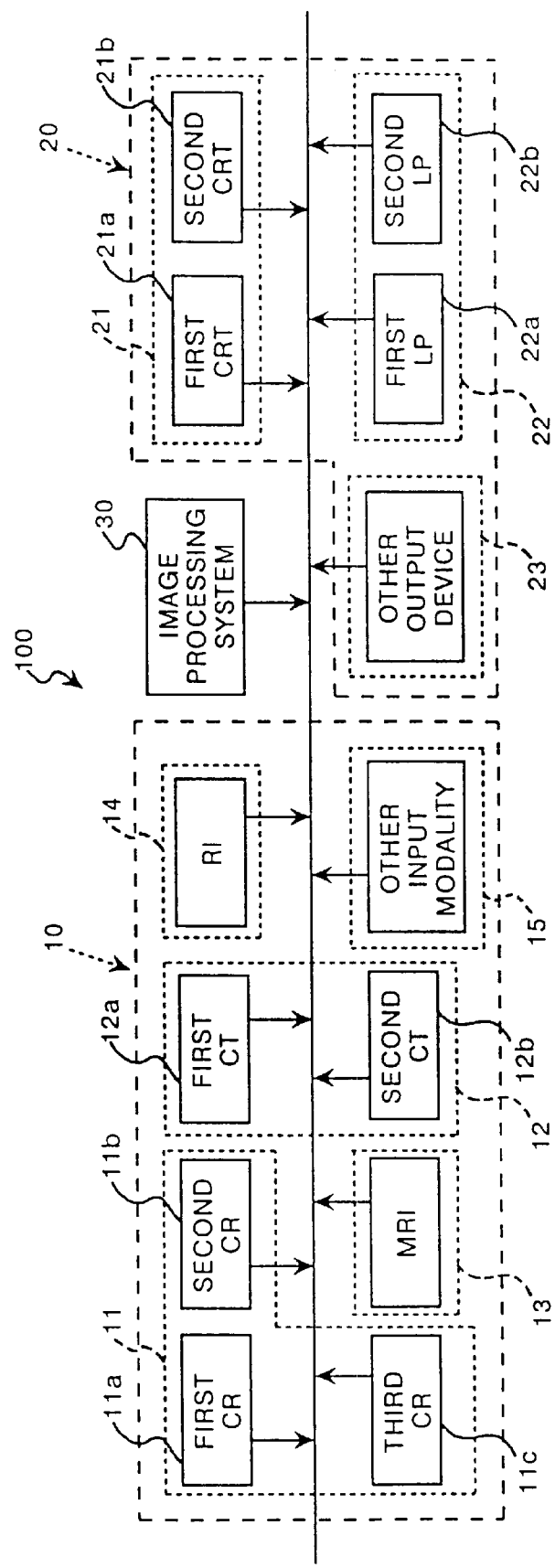

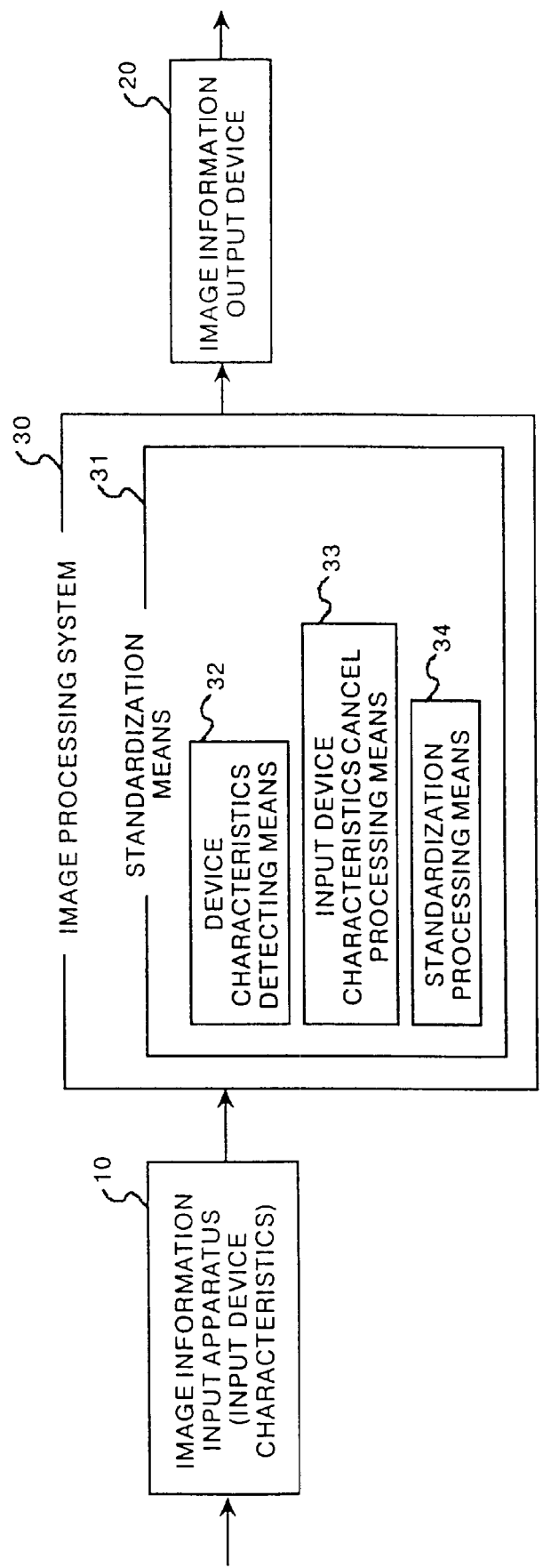

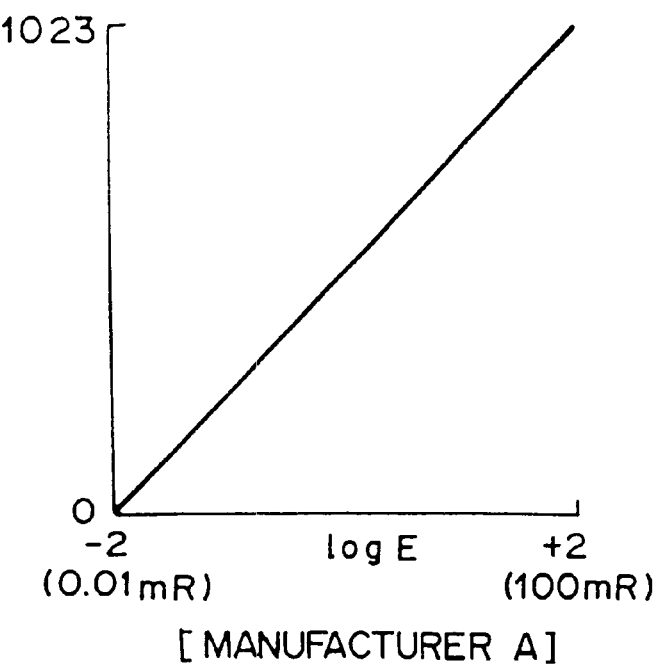
F I G. 3A
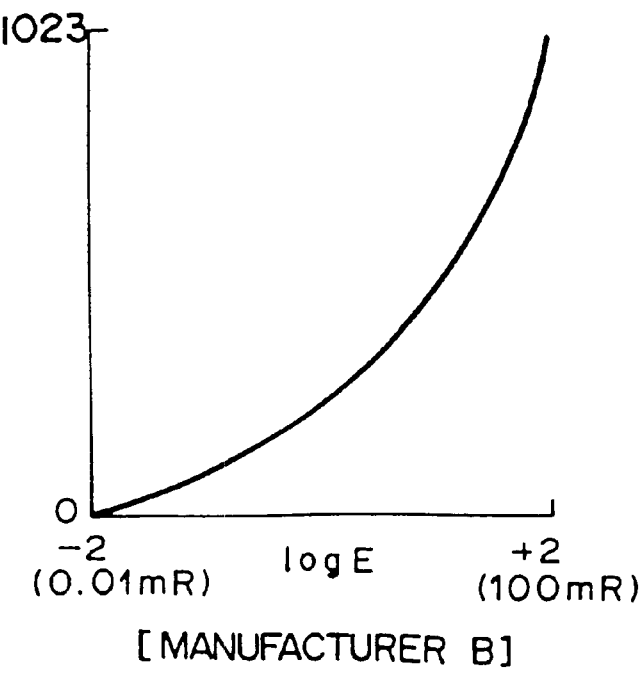
F I G. 3B

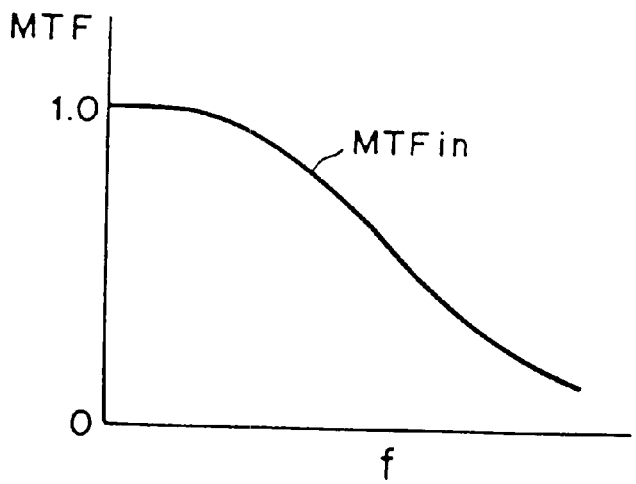
F I G. 6A
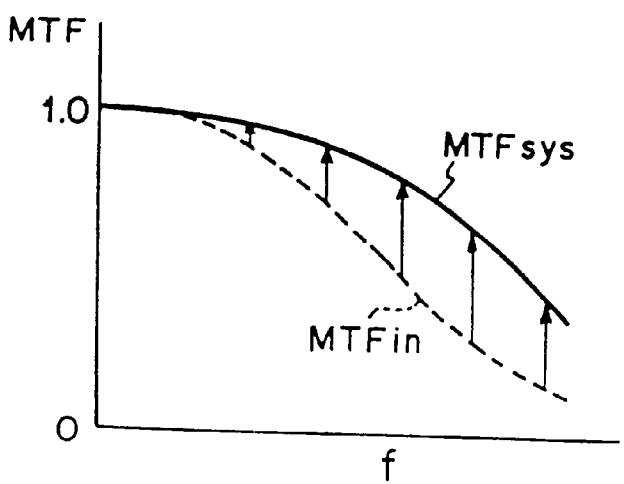
F I G. 6B

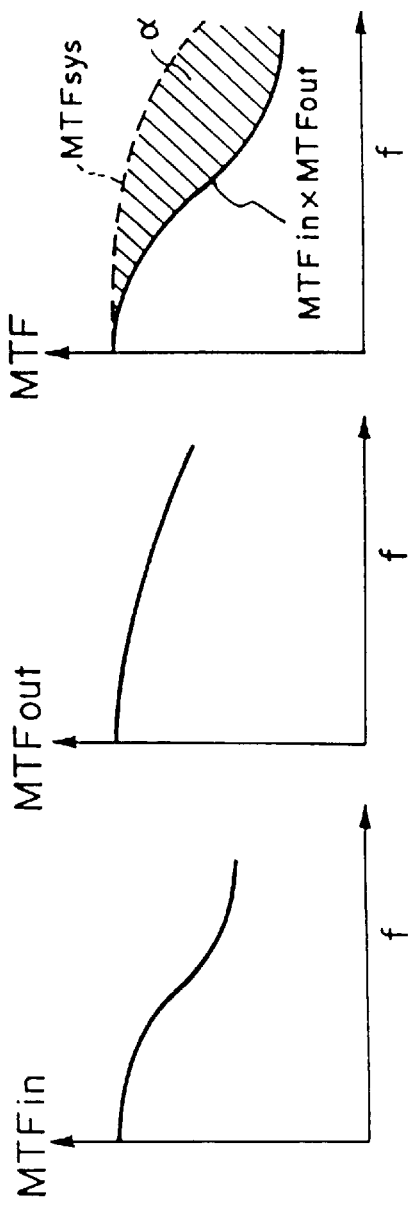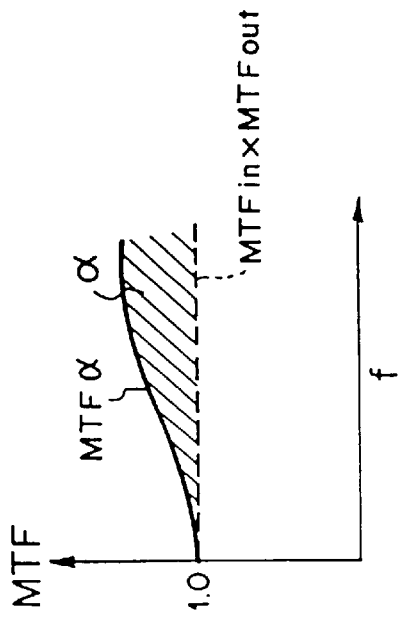

F I G. 22A
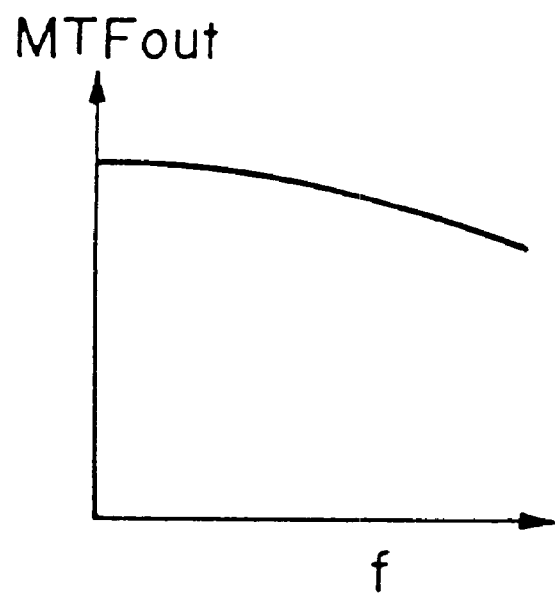
F I G. 22B
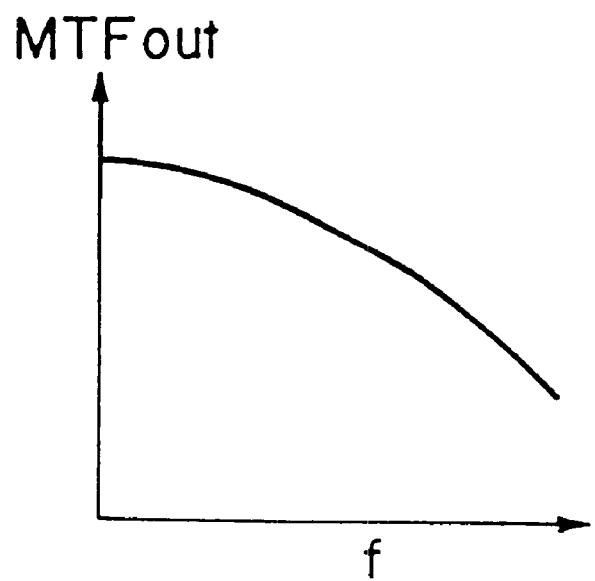

FIRST CR APPARATUS

SECOND CR APPARATUS

THIRD CR APPARATUS

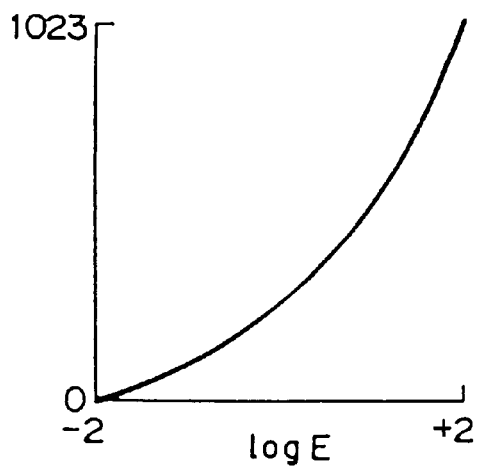
F I G. 30A
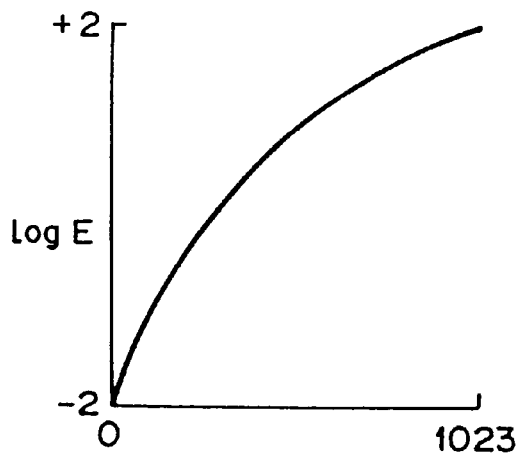
F I G. 30B
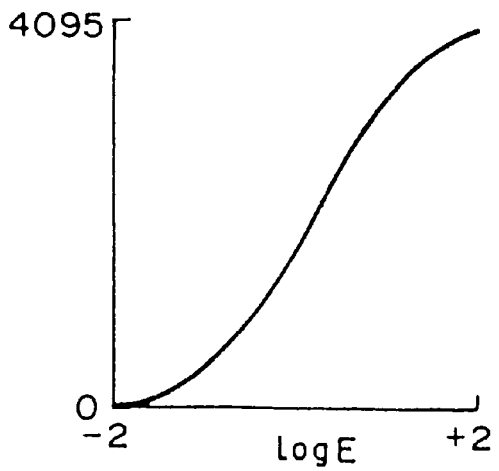
F I G. 30C

ASSUMED OUTPUT
GRADATION

GRADATION BEFORE
CORRECTION

GRADATION CORRECTION

IMAGE PROCESSING SYSTEM

BACKGROUND OF THE INVENTION

1. Field of the Invention

This invention relates to an image processing system. This invention particularly relates to an image processing system, to which image information input apparatuses and image information output devices are connected. This invention also relates to an improvement in processing of image information in an image processing system. This invention further relates to an image output device.

2. Description of the Prior Art

Various image forming apparatuses (modalities) for diagnosis, in which X-rays, or the like, are utilized, have heretofore been used in the medical field. As such modalities, computed radiography (CR) apparatuses, computed tomography (CT) scanners, magnetic resonance imaging (MRI) apparatuses, and the like, have been used in practice. An image having been formed by each modality is displayed on a cathode ray tube (CRT) display device or is reproduced on film by a laser printer (LP), or the like. The reproduced image is utilized for making a diagnosis, e.g. for investigating the presence or absence of a diseased part or an injury or for ascertaining the characteristics of the diseased part or the injury.

The CR apparatuses are radiation image recording and read-out systems. With the radiation image recording and read-out systems, a radiation image of an object, such as a human body, is recorded on a sheet provided with a layer of a stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. Recently the CR apparatuses are widely used in practice. In cases where the CR apparatuses are connected to a network, which will be described later, the CR apparatuses may take on the form of the entire radiation image recording and read-out systems described above or, for example, radiation image read-out apparatuses alone, which can feed the ultimatelly detected image signal (i.e., image information) into the network.

With the rapid advances made in communication technology and computer technology in recent years, various kinds of networks utilizing computers have been built in hospitals. The aforesaid modalities, which were used in the past as stand-alone apparatuses, constitute part of the network as image information input apparatuses. Also, CRT display devices and LP's constitute part of the network as image information output devices.

The image information input apparatuses (the image forming apparatuses) and the image information output devices have heretofore been produced on the assumption that they will be used alone. Therefore, the problems occurred in that there was no compatibility in the form of image information at the time of input and output of the image information between the image information input apparatuses and the image information output devices. However, with the advances made in the networking technology, the problems are solved little by little.

However, even if the compatibility in the form of image information at the time of input and output of the image information between the image information input apparatuses and the image information output devices is established, and a plurality of kinds of image input modalities and a plurality of image information output devices can be connected as the constituent elements of a network, the problems described below will occur. Specifically, even if the image Information input apparatuses are the ones belonging to the same kind of image input modality, each of the image information input apparatuses will have device characteristics, such as response functions [a contrast transfer function (CTF) and a modulation transfer function (MTF)] and gradation characteristics, which are inherent to the manufacturer and the type or the version (the improvement generation number) of the apparatus. Therefore, in cases where two pieces of image information, which have been inputted from two image information input apparatuses belonging to the same kind of image input modality, are fed into a single image information output device, reproduced images having different image quality are obtained for different manufacturers and different types or versions of the image information input apparatuses.

More specifically, for example, a single image input modality, which is classified as CR apparatuses, includes a CR apparatus made by a manufacturer A and a CR apparatus made by a manufacturer B. As illustrated in FIG. 3A, the CR apparatus of the manufacturer A has a linear profile of gradation characteristics, i.e., the correspondence relationship between input quantity logE (−2 to +2), which is obtained from logarithmic transform of radiation dose (0.01 mR to 100 mR), and output quantity represented by digital values of 0 to 1,023. On the other hand, as illustrated in FIG. 3B, the CR apparatus of the manufacturer B has a non-linear profile of gradation characteristics. Therefore, in cases where two pieces of image information, which are fed respectively from the two CR apparatuses, are the ones representing images of the same object, which images have been recorded under the same image recording conditions, and the two pieces of image information are fed into a single CRT display device and respectively reproduced and displayed on the CRT display device, images having identical gradation characteristics cannot be obtained. The difference in gradation characteristics appears as a difference in impression given by the images, and therefore there is a risk that an accurate diagnosis cannot be made.

The same problems also occur with the image information output devices. Specifically, in cases where a single piece of image information is fed into two or more image information output devices having different output device characteristics, visible images having different gradation characteristics, different frequency characteristics, and the like, and giving different impressions are reproduced by the image information output devices.

More specifically, for example, a single kind of image information output device, which is classified as CRT display devices, includes a CRT display device made by a manufacturer A and a CRT display device made by a manufacturer B. The CRT display device of the manufacturer A may have frequency characteristics which are defined by a response function $MTF_{out}$ of a profile shown in FIG. 22A. The CRT display device of the manufacturer B may have frequency characteristics, which are defined by a response function $MTF_{out}$ of a profile shown in FIG. 22B. In such cases, even if a single piece of image information, which has been obtained with a single CR apparatus and represents an image of an object having been recorded under certain image recording conditions, is fed into the two CRT display device, an image reproduced and displayed on the CRT display device of the manufacturer A and an image reproduced and displayed on the CRT display device of the manufacturer B cannot have identical frequency characteristics. The difference in frequency characteristics appears as a difference in impression given by the images, and therefore there is a risk that an accurate diagnosis cannot be made.

SUMMARY OF THE INVENTION

The primary object of the present invention is to provide an image processing system, wherein at least two pieces of image information, which are received respectively from at least two image information input apparatuses belonging to a single kind of image input modality, are capable of being processed as pieces of image information, which do not depend upon input device characteristics of the image information input apparatuses.

Besides the cases where act least two image information input apparatuses belong to a single kind of image input modality, the aforesaid problems due to dependence of image information upon image information input apparatuses also occur with respect to image information input apparatuses, which belong to at least two different image input modalities (for example, a CR apparatus and a CT scanner, a CR apparatus and an MRI apparatus, or a CT scanner and an MRI apparatus).

Specifically, for example, a CR apparatus has gradation characteristics such that input quantity logE (−2 to +2), which is obtained from logarithmic transform of radiation dose (0.01 mR to 100 mR) and output quantity, which is represented by digital values of 0 to 1,023, may correspond to each other. A CT scanner has gradation characteristics such that input quantity, which is represented by CT values of −1,000 to +1,000, and output quantity, which is represented by digital values of 0 to 65,535, may correspond to each other. An MRI apparatus has gradation characteristics such that input quantity, which is represented by a T1 emphasis degree, a T2 emphasis degree, or a hydrogen density, and output quantity, which is represented by digital values of 0 to 65,535, may correspond to each other. Also, ordinarily, the correspondence relationships in the CR apparatus, the CT scanner, and the MRI apparatus are of different profiles.

Therefore, even if the same image processing is carried out on the pieces of image information, which have been obtained from the image information input apparatuses, identical effects of image processing cannot be obtained for the different image information input apparatuses.

Another object of the present invention is to provide an image processing system, wherein at least two pieces of image information, which are received respectively from at least two image information input apparatuses belonging respectively to different kinds of image input modalities, are capable of being processed as pieces of image information, which do not depend upon input device characteristics of the image information input apparatuses.

A further object of the present invention is to provide an image processing system, wherein image processing is carried out such that images, which are reproduced respectively by a plurality of image information output devices that are of the same kind, may not depend upon output device characteristics of the image information output devices.

Besides the cases where at least two image information output devices are of the same kind, the aforesaid problems due to dependence of images, which are reproduced by image information output devices, upon image information output devices also occur with respect to at least two image information output devices, which are of different kinds (for example, an LP and a CRT display device).

A still further object of the present invention is to provide an image processing system, wherein image processing is carried out such that images, which are reproduced respectively by a plurality of image information output devices that are of different kinds, may not depend upon output device characteristics f the image information output devices regardless of the kinds of the image information output devices.

Also, pieces of image information, which are received respectively from a plurality of image information input apparatuses belonging to a single kind of image input modality and having different input device characteristics, may be fed respectively into at least two image information output devices that are of the same kind and that have different output device characteristics, and images may thereby be reproduced by the image information output devices. In such cases, the images, which are reproduced by the image information output devices, depend also upon the input device characteristics of the image information input apparatuses. Therefore, if the output device characteristics of the image information output devices are merely standardized, images having identical image quality cannot be obtained from the image information output devices.

Another object of the present invention is to provide an image processing system, wherein image processing is carried out such that, in cases where pieces of image information, which are received respectively from a plurality of image information input apparatuses belonging to a single kind of image input modality and having different input device characteristics, are reproduced as images respectively by image information output devices that are of the same kind, the reproduced images may not depend upon the input device characteristics and output device characteristics.

Further, in cases where pieces of image information, which are received respectively from different kinds of image input modalities, are reproduced as images by image information output devices that are of different kinds, it is desired that the images reproduced by the image information output devices have identical image quality.

A further object of the present invention is to provide an image processing system, wherein image processing is carried out such that, in cases where pieces of image information, which are received respectively from image information input apparatuses belonging to different kinds of image input modalities, are reproduced as images by image information output devices that are of different kinds, the reproduced images may not depend upon input device characteristics and output device characteristics.

A still further object of the present invention is to provide an image processing system, to which an image information input apparatus and an image information output device are connected, wherein image processing is carried out such that an image, which is reproduced by the image information output device and with a scale of enlargement or a scale of reduction that is desired by the user, may have standard characteristics, which do not depend upon response characteristics of the image information output device and are approximately identical with response characteristics that are obtained in cases where image size enlargement or reduction processing is not carried out.

Another object of the present invention is to provide an image processing system, wherein image processing is carried out such that dependence upon input device characteristics of an image information input apparatus and dependence upon output device characteristics of an image information output device may be canceled.

A further object of the present invention is to provide an improved image information filing method in an image processing system.

A still further object of the present invention is to provide an image output device, wherein an image is capable of being reproduced with output gradation, which is assumed in image processing.

First and second image processing systems in accordance with the present invention are characterized by being provided with a standardization means for transforming image information, which has been received from an image information input apparatus, into standard image information, which does not depend upon device characteristics of the image information input apparatus and depends upon predetermined standard characteristics of the system.

In a first image processing system in accordance with the present invention, image information is unified as standard image information, which depends upon standard characteristics, within a single kind of image input modality. In a second image processing system in accordance with the present invention, image information is unified as standard image information, which depends upon standard characteristics, regardless of the kinds of image input modalities.

Specifically, the present invention provides a first image processing system, to which at least one kind of image input modality and at least one kind of image information output device are connected, at least one kind of image input modality, which is among connected image input modalities, including a plurality of image information input apparatuses, which have different input device characteristics, the image processing system comprising:

a standardization means for carrying out transform processing on image information, the transform processing being carried out such that, in every case where the image information has been received from one image information input apparatus, which is among the plurality of the image information input apparatuses, the received image information may be transformed into standard image information, which does not depend upon the input device characteristics of the one image information input apparatus having fed the image information and depends upon standard device characteristics having been set previously for the image input modality including the one image information input apparatus having fed the image information.

The term "image input modality" as used herein means one of various kinds of image forming apparatuses for diagnosis, in which X-rays, or the like, are utilized. The kinds of the image input modalities include CR apparatuses, CT scanners, MRI apparatuses, radioisotope (RI) scanners, ultrasonic imaging apparatuses, and the like.

The kinds of the image information output devices include CRT display devices, LP's, and the like.

The term "input device characteristics" as used herein means, for example, the characteristics concerning response which are related to frequency characteristics, characteristics concerning gradation that represent the correspondence relationship between, input quantity, which may be represented by radiation dose, or the like, and output quantity, which may be represented by image signal values (image information), or the like.

In the first image processing system in accordance with the present invention, by way of example, the standardization means may comprise:

a) a device characteristics detecting means for detecting the input device characteristics, upon which the received image information depends, b) an input device characteristics cancel processing means for canceling the dependence of the received image information upon the input device characteristics (the canceling being carried out for each image input modality), and c) a standardization processing means for transforming the received image information, whose dependence upon the input device characteristics has been canceled, into the standard image information (with respect to each image input modality).

Also, in the first image processing system in accordance with the present invent ion, in order for the input device characteristics to be detected by the device characteristics detecting means, for example, the kind of the modality of the image information input apparatus, which has fed the image information, and elements specifying the input device characteristics may be appended as subsidiary information to the image information. In such cases, the elements specifying the input device characteristics may be profile information or parameter information, which directly defines the input device characteristics. Alternatively, in cases where profile information of each image information input apparatus, or the like, is stored previously in the image processing system, the elements specifying the input device characteristics may be the information specifying the image information input apparatus.

By way of example, the processing of the input device characteristics cancel processing means for canceling the dependence upon the input device characteristics may be carried out with the technique described below.

Specifically, the image information, which is fed from the image information input apparatus into the image processing system, is the one obtained by carrying out transform processing, which depends upon the input device characteristics, on the image information given to the image information input apparatus (the given image information is the raw data, such as radiation dose, before being detected by the image information input apparatus and does not depend upon the input device characteristics). Therefore, inverse transform processing may be carried out such that the image information, which is fed from the image information input apparatus into the image processing system, may be restored into the image information before being detected by the image information input apparatus.

In order for the inverse transform processing to be carried out, each time the input device characteristics are detected by the device characteristics detecting means, a table (an inverse transform table), which defines a profile of the inverse transform, or the like, may be formed in accordance with the detected input device characteristics. Thereafter, the inverse transform processing may be carried out in accordance with the table. Alternatively, the table may be stored previously, and the inverse transform processing may be carried out in accordance with the stored table.

The standard characteristics of the system with respect to each modality may be fixed or may be set such that they can be altered to desired characteristics.

In the first image processing system in accordance with the present invention, predetermined image processing, such as normalization processing [exposure data recognizer (EDR) processing], gradation processing, emphasis processing, image size enlargement or reduction processing (including interpolation processing), or abnormal pattern detection processing, may be carried out on the received image information. In such cases, the predetermined image processing may be carried out on the image information before being processed by the input device characteristics cancel processing means. Alternatively, the predetermined image processing may be carried out on the image information after being processed by the input device characteristics cancel processing means.

The present invention also provides a second image processing system, to which at least two kinds of image input modalities and at least one kind of image information output device are connected, the image processing system comprising:
a standardization means for carrying out transform processing on image information, the transform processing being carried out such that, in every case where the image information has been received from an image information input apparatus belonging to one image input modality, which is among the connected image input modalities, the received image information may be transformed into standard image information, which does not depend upon input device characteristics of the image information input apparatus having fed the image information and depends upon standard device characteristics of the system that have been set previously.

In the second image processing system in accordance with the present invention, as in the first image processing system in accordance with the present invention, the standardization means may comprise:
a) a device characteristics detecting means for detecting the input device characteristics, upon which the received image information depends,
b) an input device characteristics cancel processing means for canceling the dependence of the received image information upon the input device characteristics (the canceling being carried out for each image input modality), and
c) a standardization processing means for transforming the received image information, whose dependence upon the input device characteristics has been canceled, into the standard image information.

Also, in the second image processing system in accordance with the present invention, in order for the input device characteristics to be detected by the device characteristics detecting means, for example, the kind of the modality of the image information input apparatus, which has fed the image information, and elements specifying the input device characteristics may b;appended as subsidiary information to the image information. In such cases, the elements specifying the input device characteristics may be profile information or parameter information, which directly defines the input device characteristics. Alternatively, in cases where profile information of each image information input apparatus, or the like, is stored previously in the image processing system, the elements specifying the input device characteristics may be the information specifying the image information input apparatus.

Further, in the second image processing system in accordance with the present invention, as the standard characteristics of the system, predetermined standard characteristics are employed regardless of the kinds of the image input modalities. The standard characteristics may be fixed or may be set such that they can be altered to desired characteristics.

Third, fourth, fifth, and sixth image processing systems in accordance with the present invention are characterized by being provided with a standardization means for carrying out transform processing on image information, which is to be fed into an image information output device, such that an image which does not depend upon device characteristics of the image information output device and depends upon predetermined standard characteristics of the system, may be reproduced by the image information output device.

In a third image processing system in accordance with the present invention, image information is transformed into image information depending upon standard characteristics, which have been set uniformly within the range of a single kind of image information output device. In a fourth image processing system in accordance with the present invention, image information is transformed into image information depending upon standard characteristics, which have been set uniformly regardless of the kinds of image information output devices. In a fifth image processing system in accordance with the present invention, with respect to image information, which has been received from a single kind of image input modality and is to be fed into a single kind of image information output device, the image information is transformed into image information depending upon standard characteristics, which have been set uniformly within the range of the single kind of image input modality and the single kind of image information output device. In a sixth image processing system in accordance with the present invention, with respect to image information, which has been received from one kind of image input modality and is to be fed into one kind of image information output device, the image information is transformed into image information depending upon standard characteristics, which have been set uniformly regardless of the kinds of image input modalities and the kinds of image information output devices.

Specifically, the present invention further provides a third image processing system, to which at least one kind of image input modality and at least one kind of image information output device are connected, at least one kind of image information output device, which is among connected image information output devices, including a plurality of image information output devices, which have different output device characteristics, the image processing system comprising:
a standardization means for carrying out transform processing on image information, which is to be fed into an image information output device, the transform processing being carried out such that, in every case where the image information is to be fed into one image information output device, which is among the plurality of the image information output devices, the image information may be reproduced by the one image information output device to be fed with the image information and as a standard image, which does not depend upon the output device characteristics of the one image information output device to be fed with the image information and depends upon standard device characteristics having been set previously for the kind of the one image information output device to be fed with the image information.

The term "output device characteristics" as used herein means, for example, input-to-output conversion characteristics of each device, which affect the image quality, such as frequency characteristics, which are represented by response functions (CTF, MTF), and gradation characteristics, which are typically represented by γ values.

The term "standard device characteristics having been set previously for a kind of image information output device" as used herein means the standard characteristics, which have been set with respect to devices belonging to the kind referred to as CRT display devices, the standard characteristics, which have been set with respect to devices belonging to the kind referred to as LP's, or the like. The standard characteristics of the CRT display devices and the standard characteristics of the LP's are set as independent characteristics.

Specifically, for example, in cases where the output device characteristics of a CRT display device and the standard characteristics of the system with respect to the CRT display device are represented respectively by response functions $\text{MTF1}_{out}$ and $\text{MTF1}_{sys}$, frequency emphasis processing in accordance with a response correction term $\alpha$ ($=\text{MTF1}_{sys}/\text{MTF1}_{out}$) may be carried out on the image information.

In the third image processing system in accordance with the present invention, by way of example, the standardization means may comprise:

a) an output device characteristics detecting means for detecting the output device characteristics of the one image information output device to be fed with the image information, b) an output device characteristics cancel processing means for canceling the dependence of the image information, which is reproduced by the one image information output device, upon the output device characteristics of the one image information output device, and c) a standardization processing means for transforming the image information, whose dependence upon the output device characteristics has been canceled, into image information, which depends upon standard characteristics having been set uniformly for the kind of the one image information output device.

Also, in the third image processing system in accordance with the present invention, in order for the output device characteristics to be detected by the output device characteristics detecting means, for example, elements specifying the output device characteristics may be received from the image information output device, which is to be fed with the image information. In such cases, the elements specifying the output device characteristics may be profile information or parameter information, which directly defines the output device characteristics. Alternatively, in cases where profile information of each image information output device, or the like, is stored previously in the image processing system, the elements specifying the output device characteristics may be the information specifying the image information output device itself.

By way of example, the processing of the output device characteristics cancel processing means for canceling the dependence upon the output device characteristics may be carried out with the technique described below.

Specifically, in accordance with output device characteristics F having been detected by the output device characteristics detecting means, the output device characteristics cancel processing means calculates transform characteristics G such that the output device characteristics F may become inverse transform $G^{-1}$ of the predetermined transform characteristics G. Thereafter, the output device characteristics cancel processing means carries out transform processing with the transform characteristics G. (As an aid in facilitating the explanation, the transform processing will herein below be referred to as the "inverse transform processing.")

Thereafter, the standardization processing means carries out transform processing on the image information, which has been obtained from the inverse transform processing carried out with the transform characteristics G, and in accordance with predetermined standard characteristics.

The thus obtained image information is the information depending upon the standard characteristics and the transform characteristics G. However, since the image information has been subjected to the transform processing with the output device characteristics F ($=G^{-1}$) of the image information output device to be fed with the image information, the transform characteristics G of the aforesaid inverse transform processing and the output device characteristics F are canceled each other. Therefore, the image, which is reproduced by the image information output device, does not depend upon the output device characteristics F and depends upon the standard characteristics.

In order for the inverse transform processing to be carried out, each time the output device characteristics F are detected by the output device characteristics detecting means, a table (an inverse transform table), which defines a profile of the inverse transform G, or the like, may be formed in accordance with the detected output device characteristics F. Thereafter, the inverse transform processing may be carried out in accordance with the table. Alternatively, the table may be stored previously, and the inverse transform processing may be carried out in accordance with the stored table.

Also, the transform processing carried out by the standardization means need not necessarily pass through the aforesaid inverse transform processing, and direct transform into the standard characteristics may be carried out.

For example, in cases where the output device characteristics are the modulation transfer function, a difference $\alpha$ between output device characteristics $\text{MTF1}_{out}$ and $\text{MTF1}_{sys}$ may be calculated. Also, two-dimensional Fourier transform may be carried out on the image information to be processed, and the image information may thereby be transformed into the frequency domain. Frequency emphasis processing with the aforesaid difference $\alpha$ may then be carried out on the transformed image information. Thereafter, inverse Fourier transform may be carried out.

In lieu of the aforesaid emphasis processing in the frequency domain, emphasis processing in the spatial domain may be carried out by using a spatial-domain filter, such as an unsharp mask filter.

However, with the emphasis processing using the spatial-domain filter, it is substantially impossible to carry out the emphasis in every frequency band. Therefore, for example, in cases where the image information output device is a CRT display device, the visual characteristics of the image information (the image) displayed on the display device may be taken into consideration, and the emphasis may be carried out primarily for a frequency band, which is associated with the highest visual response under ordinary image viewing conditions (e.g., a viewing position spaced 50 cm apart from the displayed image). Therefore, information representing the visual characteristics, viewing characteristics, and the like, may be received from the image information output device. Alternatively, means for storing the information representing such characteristics, or the like, may be provided. However, since there is a difference in visual characteristics between persons who view the images, ordinary visual characteristics may be set as a representative value, or the visual characteristics may be set for each person who views the images.

In cases where the emphasis processing with the unsharp mask filter is employed, the image processing system or the image information output device may be provided with a reference table or a transform table, which represents filter factors that define the unsharp mask filter. Information representing the filter factors obtained from the table may be fed into the standardization processing means, and correction processing may thereby be carried out. Alternatively, the standardization processing means may be provided with the table as part of the constitution.

The standard characteristics of the system with respect to each kind of image information output device may be fixed or may be set such that they can be altered to desired characteristics.

In the third image processing system in accordance with the present invention, predetermined image processing, such as normalization processing [exposure data recognizer (EDR) processing], gradation processing, emphasis processing, image size enlargement or reduction processing (including interpolation processing), or abnormal pattern detection processing, may be carried out on the image information to be fed into the image information output device. In such cases, the predetermined image processing may be carried out on the image information before being processed by the output device characteristics cancel processing means. Alternatively, the predetermined image processing may be carried out on the image information after being processed by the output device characteristics cancel processing means. However, the predetermined image processing should preferably be carried out on the image information before being processed by the output device characteristics cancel processing means. In such cases, setting of image processing conditions can be prevented from becoming complicated.

The present invention still further provides a fourth image processing system, to which at least one kind of image input modality and at least two kinds of image information output devices are connected, the image processing system comprising:
a standardization means for carrying out transform processing on image information, which is to be fed into an image information output device, the transform processing being carried out such that, in every case where the image information is to be fed into one image information output device, which is among the plurality of image information output devices, the image information may be reproduced by the one image information output device to be fed with the image information and as a standard image, which does not depend upon output device characteristics of the one image information output device to be fed with the image information and depends upon standard device characteristics of the system that have been set previously.

In the fourth image processing system in accordance with the present invention, by way of example, the standardization means may comprise:
a) an output device characteristics detecting means for detecting the output device characteristics of the one image information output device to be fed with the image information,
b) an output device characteristics cancel processing means for canceling the dependence of the image information, which is reproduced by the one image information output device, upon the output device characteristics of the one image information output device, and
c) a standardization processing means for transforming the image information, whose dependence upon the output device characteristics has been canceled, into image information, which depends upon standard characteristics of the system that have been set previously and uniformly regardless of the kinds of the image information output devices.

The present invention also provides a fifth image processing system, to which at least one kind of image input modality and at least one kind of image information output device are connected,
at least one kind of image input modality, which is among connected image input modalities, including a plurality of image information input apparatuses, which have different input device characteristics,
at least one kind of image information output device, which is among connected image information output devices, including a plurality of image information output devices, which have different output device characteristics,
the image processing system comprising:
a standardization means for carrying out transform processing on image information, the transform processing being carried out such that, in every case where the image information has been received from one image information input apparatus, which is among the plurality of the image information input apparatuses, and the image information is to be fed into one image information output device, which is among the plurality of the image information output devices, the image information may be reproduced by the one image information output device to be fed with the image information and as a standard image, which does not depend upon the input device characteristics of the one image information input apparatus having fed the image information and the output device characteristics of the one image information output device to be fed with the image information and depends upon standard device characteristics having been set previously for the kind of the image input modality including the one image information input apparatus having fed the image information and for the kind of the one image information output device to be fed with the image information.

The term "input device characteristics" as used herein for the fifth image processing system in accordance with the present invention has the same meaning as that described above.

In the fifth image processing system in accordance with the present invention, by way of example, the standardization means may comprise:
a) a device characteristics detecting means for detecting the input device characteristics of the one image information input apparatus having fed the image information and the output device characteristics of the one image information output device to be fed with the image information,
b) a device characteristics cancel processing means for canceling the dependence of the image information, which has been received from the one image information input apparatus and is reproduced by the one image information output device, upon the input device characteristics of the one image information input apparatus and the output device characteristics of the one image information output device, and
c) a standardization processing means for transforming the image information, whose dependence upon the input device characteristics and the output device characteristics has been canceled, into image information, which depends upon standard characteristics having been set uniformly for the combination of the kind of the image input modality including the one image information input apparatus and the kind of the one image information output device.

Also, in the fifth image processing system in accordance with the present invention, in order for the input device characteristics to be detected by the device characteristics detecting means, for example, the aforesaid technique for detecting the input device characteristics, which is employed in the device characteristics detecting means in the first image processing system in accordance with the present invention, may be employed. In order for the output device characteristics to be detected by the device characteristics detecting means, for example, the aforesaid technique for detecting the output device characteristics, which is employed in the output device characteristics detecting means in the third image processing system in accordance with the present invention, may be employed.

As the processing of the device characteristics cancel processing means for canceling the dependence upon the input device characteristics, the aforesaid processing for canceling the dependence upon the input device characteristics, which is employed in the input device characteristics cancel processing means in the first image processing system in accordance with the present invention, may be employed.

The standard characteristics of the system with respect to each kind of modality may be fixed or may be set such that they can be altered to desired characteristics.

As the processing of the device characteristics cancel processing means for canceling the dependence upon the output device characteristics, the aforesaid processing for canceling the dependence upon the output device characteristics, which is employed in the output device characteristics cancel processing means in the third image processing system in accordance with the present invention, may be employed.

In the manner described above, with the device characteristics cancel processing means, the processing for canceling the dependence upon the input device characteristics and the processing for canceling the dependence upon the output device characteristics may be carried out separately. Alternatively, characteristics (hereinbelow referred to as the input-output device characteristics), which are obtained by combining the input device characteristics and the output device characteristics with each other, may be calculated, and processing for canceling the dependence upon the input-output device characteristics may be carried out.

The present invention further provides a sixth image processing system, to which at least two kinds of image input modalities and at least two kinds of image information output devices are connected, the image processing system comprising:

a standardization means for carrying out transform processing on image information, the transform processing being carried out such that, in every case where the image information has been received from an image information input apparatus belonging to one image input modality, which is among the connected image input modalities, and the image information is to be fed into one image information output device, which is among the plurality of the image information output devices, the image information may be reproduced by the one image information output device to be fed with the image information and as a standard image, which does not depend upon input device characteristics of the image information input apparatus having fed the image information and output device characteristics of the one image information output device to be fed with the image information and depends upon standard device characteristics that have been set previously.

In the sixth image processing system in accordance with the present invention, by way of example, the standardization means may comprise:

a) a device characteristics detecting means for detecting the input-device characteristics of the image information input apparatus having fed the image information and the output device characteristics of the one image information output device to be fed with the image information, b) a device characteristics cancel processing means for canceling the dependence of the image information, which has been received from the image information input apparatus and is reproduced by the one image information output device, upon the input device characteristics of the image information input apparatus and the output device characteristics of the one image information output device, and c) a standardization processing means for transforming the image information, whose dependence upon the input device characteristics and the output device characteristics has been canceled, into image information, which depends upon standard characteristics of the system that have been set previously.

Seventh, eighth, and ninth image processing systems in accordance with the present invention are characterized by carrying out frequency emphasis processing (including smoothing processing) on image information, or correcting the processing parameters (including those with filter factors, and the like) for transform processing carried out by a standardization means on the image information, or correcting the parameters (including those with filter factors, and the like) for interpolation processing accompanying image size enlargement or reduction processing carried out on the image information, such that variation in response characteristics due to image size enlargement or reduction processing may be compensated for.

Specifically, the present invention still further provides a seventh image processing system, to which at least one kind of image information input apparatus and at least one kind of image information output device are connected, the image processing system comprising:

i) a standardization means for carrying out transform processing on image information and in accordance with response characteristics of one image information output device, into which the image information is to be fed, such that the image information may be reproduced by the one image information output device to be fed with the image information and as an image, which does not depend upon the response characteristics of the one image information output device to be fed with the image information and depends upon standard response characteristics having been set previously, ii) a response characteristics variation calculating means for calculating a variation component of the image from the standard response characteristics in cases where the image reproduced by the one image information output device is subjected to image size enlargement processing with a desired scale of enlargement or image size reduction processing with a desired scale of reduction, and iii) a correction means for carrying out frequency emphasis processing on the image information such that the variation component may be compensated for.

The kinds of the image information input apparatuses include CR apparatuses, CT scanners, MRI apparatuses, radioisotope (RI) scanners, ultrasonic imaging apparatuses and the like.

The kinds of the image information output devices include CRT display devices, LP's, and the like.

The term "response characteristics" as used herein means the frequency response characteristics represented by response functions (CTF, MTF).

An image size enlargement or reduction processing means, which carries out the image size enlargement or reduction processing with a desired scale of enlargement or a desired scale of reduction, may be provided in the seventh image processing system (or each of the eighth and ninth image processing systems) in accordance with the present invention or in the image information output device. In cases where the image information output device is provided with the image size enlargement or reduction processing means, an image size enlargement or reduction processing information input means should preferably be provided such that the response characteristics variation calculating means can receive information, which defines the details of the image size enlargement or reduction processing carried out by the image size enlargement or reduction processing means, from the image information output device. In such cases, as the information, which defines the details of the image size enlargement or reduction processing, for example, parameters (including filter factors, and the like), which define the details of interpolation processing constituting the image size enlargement or reduction processing, may be employed. The details of the interpolation processing include the type of the interpolating operation (a first-order interpolating operation, a second-order Lagrangean interpolating operation, a third-order B spline interpolating operation, a third-order cubic spline interpolating operation, or the like), filter factors in the interpolating operation, and the like.

The term "standard response characteristics having been set previously" as used herein means the response characteristics having been set as a standard, instead of the response characteristics of the image information output device to be fed with the image information, such as a CRT display device.

Specifically, for example, in cases where the response characteristics of the image information output device to be fed with the image information and the standard characteristics are represented respectively by response functions $MTF_{out}$ and $MTF1_{sys}$, frequency emphasis processing in accordance with a response correction term $\alpha$ ($=MTF1_{sys}/MTF1_{out}$) may be carried out on the image information.

In the seventh image processing system (or each of the eighth and ninth image processing systems) in accordance with the present invention, by way of example, the standardization means may comprise:

a) a response characteristics detecting means for detecting the response characteristics of the one image information output device to be fed with the image information, b) a response characteristics cancel processing means for canceling the dependence of the image information, which is reproduced by the one image information output device, upon the response characteristics of the one image information output device, and c) a standardization processing means for transforming the image information, whose dependence upon the response characteristics has been canceled, into image information, which depends upon standard characteristics having been set uniformly for the kind of the one image information output device or for all kinds of image information output devices.

Also, in order for the response characteristics to be detected by the response characteristics detecting means, for example, elements specifying the response characteristics may be received from the image information output device, which is to be fed with the image information. In such cases, the elements specifying the response characteristics may be profile information or parameter information (the filter factors, or the like), which directly defines the response characteristics. Alternatively, in cases where profile information of each image information output device, or the like, is stored previously in the image processing system, the elements specifying the response characteristics may be the information specifying the image information output device itself.

By way of example, the processing of the response characteristics cancel processing means for canceling the dependence upon the response characteristics may be carried out with the technique described below.

Specifically, in accordance with response characteristics F having been detected by the response characteristics detecting means, the response characteristics cancel processing means calculates transform characteristics G such that the response characteristics F may become inverse transform $G^{-1}$ of the predetermined transform characteristics G. Thereafter, the response characteristics cancel processing means carries out transform processing with the transform characteristics G. (As an aid in facilitating the explanation, the transform processing will hereinbelow be referred to as the "inverse transform processing.")

Thereafter, the standardization processing means carries out transform processing on the image information, which has been obtained from the inverse transform processing carried out with the transform characteristics G, and in accordance with predetermined standard characteristics.

The thus obtained image information is the information depending upon the standard characteristics and the transform characteristics G. However, since the image information has been subjected to the transform processing with the response characteristics F ($=G^{-1}$) of the image information output device to be fed with the image information, the transform characteristics G of the aforesaid inverse transform processing and the response characteristics F are canceled each other. Therefore, the image, which is reproduced by the image information output device, does not depend upon the response characteristics F and depends upon the standard characteristics.

In order for the inverse transform processing to be carried out, each time the response characteristics F are detected by the response characteristics detecting means, a table (an inverse transform table), which defines a profile of the inverse transform G, or the like, may be formed in accordance with the detected response characteristics F. Thereafter, the inverse transform processing may be carried out in accordance with the table. Alternatively, the table may be stored previously, and the inverse transform processing may be carried out in accordance with the stored table.

Also, the transform processing carried out by the standardization means need not necessarily pass through the aforesaid inverse transform processing, and direct transform into the standard characteristics may be carried out. Specifically, a difference a between response characteristics $MTF1_{out}$ and $MTF1_{sys}$ may be calculated. Also, two-dimensional Fourier transform may be carried out on the image information to be processed, and the image information may thereby be transformed into the frequency domain. Frequency emphasis processing with the aforesaid difference a may then be carried out on the transformed image information. Thereafter, inverse Fourier transform may be carried out.

In lieu of the aforesaid emphasis processing in the frequency domain, emphasis processing (or smoothing processing) in the spatial domain may be carried out by using a spatial-domain filter, such as an unsharp mask filter.

However, with the emphasis processing using the spatial-domain filter, it is substantially impossible to carry out the correction (i.e., the emphasis or the smoothing) in every frequency band. Therefore, for example, in cases where the image information output device is a CRT display device, the visual characteristics of the image information (the image) displayed on the display device may be taken into consideration, and the correction may be carried out primarily for a frequency band, which is associated with the highest visual response under ordinary image viewing conditions (e.g., a viewing position spaced 50 cm apart from the displayed image). Therefore, information representing the visual characteristics, viewing characteristics, and the like, may be received from the image information output device. Alternatively, means for storing the information representing such characteristics, or the like, may be provided. However, since there is a difference in visual characteristics between persons who view the images, ordinary visual characteristics may be set as a representative value, or the visual characteristics may be set for each person who views the images.

In cases where the correction processing with the unsharp mask filter is employed, the image processing system or the image information output device may be provided with a reference table or a transform table, which represents filter factors that define the unsharp mask filter. Information representing the filter factors obtained from the table may be fed into the standardization processing means, and correction processing may thereby be carried out. Alternatively, the standardization processing means may be provided with the table as part of the constitution.

The standard characteristics described above may be fixed or may be set such that they can be altered to desired characteristics.

In the seventh image processing system in accordance with the present invention, as the techniques for the frequency emphasis processing carried out by the correction means, one of various techniques may be employed. Specifically, it is possible to employ the aforesaid technique utilized for the standardization in the standardization means, which technique comprises carrying out Fourier transform on the image information, making a correction in the frequency domain such that the aforesaid difference may be eliminated, and thereafter carrying out inverse Fourier transform into the image region. Alternatively, frequency processing, in which a spatial-domain filter, such as an unsharp mask filter, is utilized, may be employed (such frequency processing is described in, for example, U.S. Pat. No. 4,315,318).

In the aforesaid seventh image processing system in accordance with the present invention, the correction means directly carries out the frequency emphasis processing on the image information. Alternatively, as in the eighth image processing system in accordance with the present invention, a correction means may correct the processing parameters (including those with filter factors, and the like) for transform processing carried out by the standardization means.

Specifically, the present invention also provides an eighth image processing system, to which at least one kind of image information input apparatus and at least one kind of image information output device are connected, the image processing system comprising:
i) a standardization means for carrying out transform processing on image information and in accordance with response characteristics of one image information output device, into which the image information is to be fed, such that the image information may be reproduced by the one image information output device to be fed with the image information and as an image, which does not depend upon the response characteristics of the one image information output device to be fed with the image information and depends upon standard response characteristics having been set previously,
ii) a response characteristics variation calculating means for calculating a variation component of the image from the standard response characteristics in cases where the image reproduced by the one image information output device is subjected to image size enlargement processing with a desired scale of enlargement or image size reduction processing with a desired scale of reduction, and
iii) a correction means for correcting parameters, which define details of the transform processing carried out by the standardization means, such that the variation component may be compensated for.

As described above for the seventh image processing system in accordance with the present invention, in cases where the standardization means utilizes the Fourier transform and the inverse Fourier transform, the parameters, which define the details of the transform processing carried out by the standardization means, may be the profile information, which defines the aforesaid transform characteristics G, or the like. In cases where the standardization means utilizes the spatial-domain filter, the parameters, which define the details of the transform processing carried out by the standardization means, may be the filter factors, which define the unsharp mask filter, or the like.

As another alternative, as in the ninth image processing system in accordance with the present invention, a correction means may correct the parameters (including those with filter factors, and the like) for interpolation processing, which define details of the interpolation processing accompanying the image size enlargement or reduction processing.

Specifically, the present invention further provides a ninth image processing system, to which at least one kind of image information input apparatus and at least one kind of image information output device are connected, the image processing system comprising:
i) a standardization means for carrying out transform processing on image information and in accordance with response characteristics of one image information output device, into which the image information is to be fed, such that the image information may be reproduced by the one image information output device to be fed with the image information and as an image, which does not depend upon the response characteristics of the one image information output device to be fed with the image information and depends upon standard response characteristics having been set previously,
ii) a response characteristics variation calculating means for calculating a variation component of the image from the standard response characteristics in cases where the image reproduced by the one image information output device is subjected to image size enlargement processing with a desired scale of enlargement or image size reduction processing with a desired scale of reduction, and iii) a correction means for correcting parameters, which define details of interpolation processing accompanying the image size enlargement processing or accompanying the image size reduction processing, such that the variation component may be compensated for.

The parameters, which define the details of the interpolation processing accompanying the image size enlargement processing or accompanying the image size reduction processing, may be ones representing the type of the interpolating operation (a first-order interpolating operation, a second-order Lagrangean interpolating operation, a third-order B spline interpolating operation, a third-order cubic spline interpolating operation, a spline interpolating operation which enables adjustment of sharpness, or the like), filter factors for the interpolating operation, and the like.

The interpolation processing should preferably be carried out with an interpolating operation technique (i.e., a spline interpolating operation technique enabling adjustment of sharpness), which combines an interpolating operation process that yields a comparative high level of sharpness, such as athird-order cubic spline interpolating operation, and an interpolating operation process that yields a comparative low level of sharpness, such as a third-order B spline interpolating operation. The spline interpolating operation technique enabling adjustment of sharpness is described in, for example, U.S. patent application Ser. No. 08/679,8,30.

The spline interpolating operation technique enabling adjustment of sharpness comprises the steps of:

i) obtaining an original image signal (image information), which represents an original image and is made up of a series of original image signal components Yij, ii) linearly combining interpolation coefficients Bij and Cij, which correspond to each other and are set for each of the original image signal components Yij, in two different interpolating functions f and g for obtaining two interpolation images having different levels of sharpness, which functions are represented by Formulas (1) and (2), the linear combination being carried out with Formula (3), a new interpolation coefficient Aij being obtained from the linear combination, and iii) carrying out an interpolating operation on the original image signal components Yij by using an interpolating function h having the new interpolation coefficient Aij, which function is represented by Formula (4).

$$f = \Sigma Bij \cdot Yij \quad (1)$$
$$g = \Sigma Cij \cdot Yij \quad (2)$$
$$Aij = (1-\alpha)Bij + \alpha Cij \quad (3)$$
$$h = \Sigma Aij \cdot Yij \quad (4)$$

in which i=1, 2, . . . , and j=1, 2, . . . .

The coefficient a in Formula (3) is set to be one of all real numbers including a range smaller than 0 and/or a range larger than 1. The correction means may correct the coefficient a, which is the weight factor for the weighting of the interpolation coefficients Bij and Cij. As the two different interpolating functions f and g, the third-order cubic spline interpolating operation function and the third-order B spline interpolating operation function de scribed above should preferably be employed.

In tenth, eleventh, twelfth, and thirteenth image processing systems in accordance with the present invention, with respect to image information having been received from an image information input apparatus, processing for canceling the dependence upon input device characteristics of the image information input apparatus, normalization processing, image processing, and processing for canceling the dependence upon output device characteristics of an image information output device, into which the image information is to be fed, are carried out. Each of the tenth, eleventh, twelfth, and thirteenth image processing systems in accordance with the present invention is characterized by being provided with a filing means for appending profile information for each processing to the image information in a step prior to one of the aforesaid processings, the profile information being necessary for each of the subsequent processings.

In a tenth image processing system in accordance with the present invention, the filing is carried out in a step prior to the processing for canceling the dependence upon input device characteristics. In an eleventh image processing system in accordance with the present invention, the filing is carried out in a step prior to the normalization processing. In a twelfth image processing system in accordance with the present invention, the filing is carried out in a step prior to the image processing. In a thirteenth image processing system in accordance with the present invention, the filing is carried out in a step prior to the processing for canceling the dependence upon output device characteristics.

Specifically, the present invention still further provides a tenth image processing system, to which at least one image information input apparatus (e.g., a CR apparatus, a CT scanner, an MRI apparatus, an RI scanners, an ultrasonic imaging apparatus) having inherent input device characteristics and at least one image information output device (e.g., a CRT display device or an LP) having inherent output device characteristics are connected, the image processing system comprising:

i) an input standardization means for carrying out transform processing on image information, the transform processing being carried out such that, in every case where the image information has been received from one image information input apparatus, which is among connected image information input apparatuses, the received image information may be transformed into standard image information, which does not depend upon the input device characteristics of the one image information input apparatus having fed the image information and depends upon standard device characteristics having been set previously, ii) a normalization processing means for carrying out normalization processing for normalizing and extracting image information, which is contained in the standard image information and corresponds to a desired image portion, iii) an image processing means for carrying out desired image processing on the image information, which has been normalized by the normalization processing means, iv) an output standardization means for carrying out transform processing on the image information, which has been obtained from the image processing, the transform processing being carried out such that, in every case where the image information, which has been obtained from the image processing, is to be fed into and reproduced as a visible image by one image information output device, which is among connected image information output devices, the image may be reproduced by the one image information output device to be fed with the image information and as an image, which does not depend upon the output device characteristics of the one image information output device to be fed with the image information and depends upon standard device characteristics having been set previously, and v) a filing means for appending pieces of profile information to the image information, which is fed into the input standardization means, the pieces of profile information comprising first profile information, which is necessary for defining details of the transform processing carried out by the output standardization means, second profile information, which is necessary for defining details of the image processing carried out by the image processing means, third profile information, which is necessary for defining details of the normalization processing carried out by the normalization processing means, and fourth profile information, which is necessary for defining details of the transform processing carried out by the input standardization means.

The term "input device characteristics" as used herein for the tenth image processing system (and the eleventh, twelfth, and thirteenth image processing systems) in accordance with the present invention has the same meaning as that described above.

The term "output device characteristics" as used herein for the tenth image processing system (and the eleventh, twelfth, and thirteenth image processing systems) means, for example, the characteristics concerning response which are related to frequency characteristics, the characteristics concerning gradation that represent the correspondence relationship between input quantity, which may be represented by image signal values (image information), or the like, and output quantity, which may be represented by luminance, image density, or the like.

By way of example, the input standardization means may comprise:

a) an input device characteristics detecting means for detecting the input device characteristics, upon which the received image information depends, b) an input device characteristics cancel processing means for canceling the dependence of the received image information upon the input device characteristics (the canceling being carried out for each image input modality, i.e., for each kind of the image information input apparatus), and c) an input standardization processing means for transforming the received image information, whose dependence upon the input device characteristics has been canceled, into the standard image information (with respect to each image input modality).

Also, in order for the input device characteristics to be detected by the input device characteristics detecting means, for example, the kind of the modality of the image information input apparatus, which has fed the image information, and elements specifying the input device characteristics may be appended as subsidiary information to the image information. Alternatively, the information representing the kind of the modality of the image information input apparatus, which feeds the image information, and elements specifying the input device characteristics may be stored in a memory, or the like, of the input standardization means, and the input device characteristics detecting means may read the stored information. In such cases, the elements specifying the input device characteristics may be profile information or parameter information, which directly defines the input device characteristics. Alternatively, in cases where profile information of each image information input apparatus, or the like, is stored previously in the input standardization means, the elements specifying the input device characteristics may be the information specifying the image information input apparatus which feeds the image information.

As the processing of the input device characteristics cancel processing means for canceling the dependence upon the input device characteristics, the aforesaid processing for canceling the dependence upon the input device characteristics, which is employed in the input device characteristics cancel processing means in the first image processing system in accordance with the present invention, may be employed.

The standard characteristics of the system with respect to each modality may be fixed or may be set such that they can be altered to desired characteristics.

The normalization processing is the processing, which is carried out with respect to the image information having been received from the image information input apparatus (in particular, a CR apparatus) in order to adjust image processing conditions for appropriately processing an object image portion of interest in the image information. With the normalization processing, the object image portion is extracted appropriately. Such normalization processing is described in, for example, U.S. Pat. No. 5,272,339.

As the image processing, frequency emphasis processing (including smoothing processing), gradation processing, image size enlargement or reduction processing (including interpolation processing), abnormal pattern detection processing, or the like, may be employed.

By way of example, the output standardization means may comprise:

a) an output device characteristics detecting means for detecting the output device characteristics of the one image information output device to be fed with the image information, b) an output device characteristics cancel processing means for canceling the dependence of the image information, which is reproduced by the one image information output device, upon the output device characteristics of the one image information output device, and c) an output standardization processing means for transforming the image information, whose dependence upon the output device characteristics has been canceled, into image information, which depends upon standard characteristics having been set uniformly for the kind of the one image information output device.

Also, in order for the output device characteristics to be detected by the output device characteristics detecting means, for example, elements specifying the output device characteristics may be received from the image information output device, which is to be fed with the image information. Alternatively, the elements specifying the output device characteristics may be stored in a memory, or the like, of the output standardization means, and the output device characteristics detecting means may read the stored information. In such cases, the elements specifying the output device characteristics may be profile information or parameter information, which directly defines the output device characteristics. Alternatively, in cases where profile information of each image information output device, or the like, is stored previously in the output standardization means, the elements specifying the output device characteristics may be the information specifying the image information output device itself.

By way of example, the processing of the output device characteristics cancel processing means for canceling the dependence upon the output device characteristics may be carried out with the technique described below.

Specifically, in accordance with output device characteristics F having been detected by the output device characteristics detecting means, the output device characteristics cancel processing means calculates transform characteristics G such that the output device characteristics F may become inverse transform $G^{-1}$ of the predetermined transform characteristics G. Thereafter, the output device characteristics cancel processing means carries out transform processing with the transform characteristics G. (As an aid in facilitating the explanation, the transform processing will hereinbelow be referred to as the "inverse transform processing.")

Thereafter, the output standardization processing means carries out transform processing on the image information, which has been obtained from the inverse transform processing carried out with the transform characteristics G, and in accordance with predetermined standard characteristics.

The thus obtained image information is the information depending upon the standard characteristics and the transform characteristics G. However, since the image information has been subjected to the transform processing with the output device characteristics F ($=G^{-1}$) of the image information output device to be fed with the image information, the transform characteristics G of the aforesaid inverse transform processing and the output device characteristics F are canceled each other. Therefore, the image, which is reproduced by the image information output device, does not depend upon the output device characteristics F and depends upon the standard characteristics.

In order for the inverse transform processing to be carried out, each time the output device characteristics F are detected by the output device characteristics detecting means, a table (an inverse transform table), which defines a profile of the inverse transform G, or the like, may be formed in accordance with the detected output device characteristics F. Thereafter, the inverse transform processing may be carried out in accordance with the table. Alternatively, the table may be stored previously, and the inverse transform processing may be carried out in accordance with the stored table.

Also, the transform processing carried out by the output standardization means need not necessarily pass through the aforesaid inverse transform processing, and direct transform into the standard characteristics may be carried out.

The standard characteristics of the system with respect to each image information output device may be fixed or may be set such that they can be altered to desired characteristics.

The first profile information may be, for example, the information representing the output device characteristics of the image information output device, into which the image information is to be fed, or parameters, which define the output device characteristics. The first profile information may be other information, which enables the output standardization means to determine the details of the transform processing to be carried out on the image information.

The second profile information may be, for example, the information representing the gradation, the resolution, or the image size, which the visible image should have. The second profile information may be other information, which enables the image processing means to determine the details of the image processing to be carried out on the image information.

The third profile information may be, for example, index values (e.g., parameters corresponding to the read-out sensitivity and the latitude), which determine the range of the image information to be extracted. The third profile information may be other information, which enables the normalization processing means to determine the details of the normalization processing to be carried out on the image information.

The fourth profile information may be, for example, the information representing the input device characteristics of the image information input device, which feeds the image information, or parameters, which define the input device characteristics. The fourth profile information may be other information, which enables the input standardization means to determine the details of the standardization processing to be carried out on the image information.

The present invention also provides an eleventh image processing system, to which at least one image information input apparatus having inherent input device characteristics and at least one image information output device having inherent output device characteristics are connected, the image processing system comprising:

i) an input standardization means for carrying out transform processing on image information, the transform processing being carried out such that, in every case where the image information has been received from one image information input apparatus, which is among connected image information input apparatuses, the received image information may be transformed into input standard image information, which does not depend upon the input device characteristics of the one image information input apparatus having fed the image information and depends upon standard device characteristics having been set previously, ii) a normalization processing means for carrying out normalization processing for normalizing and extracting image information, which is contained in the input standard image information and corresponds to a desired image portion, iii) an image processing means for carrying out desired image processing on the image information, which has been normalized by the normalization processing means, iv) an output standardization means for carrying out transform processing on the image information, which has been obtained from the image processing, the transform processing being carried out such that, in every case where the image information, which has been obtained from the image processing, is to be fed into and reproduced as a visible image by one image information output device, which is among connected image information output devices, the image may be reproduced by the one image information output device to be fed with the image information and as an image, which does not depend upon the output device characteristics of the one image information output device to be fed with the image information and depends upon standard device characteristics having been set previously, and v) a filing means for appending pieces of profile information to the input standard image information, the pieces of profile information comprising first profile information, which is necessary for defining details of the transform processing carried out by the output standardization means, second profile information, which is necessary for defining details of the image processing carried out by the image processing means, and third profile information, which is necessary for defining details of the normalization processing carried out by the normalization processing means.

The present invention further provides a twelfth image processing system, to which at least one image information input apparatus having inherent input device characteristics and at least one image information output device having inherent output device characteristics are connected, the image processing system comprising:
i) an input standardization means for carrying out transform processing on image information, the transform processing being carried out such that, in every case where the image information has been received from one image information input apparatus, which is among connected image information input apparatuses, the received image information may be transformed into input standard image information, which does not depend upon the input device characteristics of the one image information input apparatus having fed the image information and depends upon standard device characteristics having been set previously,
ii) a normalization processing means for carrying out normalization processing for normalizing and extracting image information, which is contained in the input standard image information and corresponds to a desired image portion,
iii) an image processing means for carrying out desired image processing on the image information, which has been normalized by the normalization processing means,
iv) an output standardization means for carrying out transform processing on the image information, which has been obtained from the image processing, the transform processing being carried out such that, in every case where the image information, which has been obtained from the image processing, is to be fed into and reproduced as a visible image by one image information output device, which is among connected image information output devices, the image may be reproduced by the one image information output device to be fed with the image information and as an image which does not depend upon the output device characteristics of the one image information output device to be fed with the image information and depends upon standard device characteristics having been set previously, and
v) a filing means for appending pieces of profile information to the image information, which has been normalized, the pieces of profile information comprising first pro file information, which is necessary for defining details of the transform processing carried out by the output standardization means, and second profile information, which is necessary for defining details of the image processing carried out by the image processing means.

The present invention still further provides a thirteenth image processing system, to which at least one image information input apparatus having inherent input device characteristics and at least one image information output device having inherent output device characteristics are connected, the image processing system comprising:
i) an input standardization means for carrying out transform processing on image information, the transform processing being carried out such that, in every case where the image information has been received from one image information input apparatus, which is among connected image information input apparatuses, the received image information may be transformed into input standard image information, which does not depend upon the input device characteristics of the one image information input apparatus having fed the image information and depends upon standard device characteristics having been set previously,
ii) a normalization processing means for carrying out normalization processing for normalizing and extracting image information, which is contained in the input standard image information and corresponds to a desired image portion,
iii) an image processing means for carrying out desired image processing on the image information, which has been normalized by the normalization processing means,
iv) an output standardization means for carrying out transform processing on the image information, which has been obtained from the image processing, the transform processing being carried out such that, in every case where the image information, which has been obtained from the image processing, is to be fed into and reproduced as a visible image by one image information output device, which is among connected image information output devices, the image may be reproduced by the one image information output device to be fed with the image information and as an image which does not depend upon the output device characteristics of the one image information output device to be fed with the image information and depends upon standard device characteristics having been set previously, and
v) a filing means for appending profile information to the image information, which has been obtained from the image processing, the profile information being first profile information, which is necessary for defining details of the transform processing carried out by the output standardization means.

Further, the present invention provides image information filing methods for use in an image processing system wherein, with respect to image information having been received from an image information input apparatus, processing for canceling the dependence upon input device characteristics of the image information input apparatus, normalization processing, image processing, and processing for canceling the dependence upon output device characteristics of an image information output device, into which the image information is to be fed, are carried out. The image information filing methods in an image processing system in accordance with the present invention is characterized by appending profile information for each processing to the image information in a step prior to one of the afore said processings, the profile information being necessary for each of the subsequent processings.

In a first filing method in accordance with the present invention, the filing (i.e., the appending) is carried out in a step prior to the processing for canceling the dependence upon input device characteristics. In a second filing method in accordance with the present invention, the filing is carried out in a step prior to the normalization processing. In a third filing method in accordance with the present invention, the filing is carried out in a step prior to the image processing. In a fourth filing method in accordance with the present invention, the filing is carried out in a step prior to the processing for canceling the dependence upon output device characteristics.

Specifically, the present invention also provides a first image information filing method in an image processing system; to which at least one image information input apparatus having inherent input device characteristics and at least one image information output device having inherent output device characteristics are connected, the image processing system comprising:

i) an input standardization means for carrying out transform processing on image information, the transform processing being carried out such that, in every case where the image information has been received from one image information input apparatus, which is among connected image information input apparatuses, the received image information may be transformed into standard image information, which does not depend upon the input device characteristics of the one image information input apparatus having fed the image information and depends upon standard device characteristics having been set previously, ii) a normalization processing means for carrying out normalization processing for normalizing and extracting image information, which is contained in the standard image information and corresponds to a desired image portion, iii) an image processing means for carrying out desired image processing on the image information, which has been normalized by the normalization processing means, and iv) an output standardization means for carrying out transform processing on the image information, which has been obtained from the image processing, the transform processing being carried out such that, in every case where the image in formation, which has been obtained from the image processing, is to be fed into and reproduced as a visible image by one image information output device, which is among connected image information output devices, the image may be reproduced by the one image information output device to be fed with the image information and as an image, which does not depend upon the output device characteristics of the one image information output device to be fed with the image information and depends upon standard device characteristics having been set previously, the image information filing method comprising:
appending pieces of profile information to the image information, which is fed into the input standardization means, the pieces of profile information comprising first profile information, which is necessary for defining details of the transform processing carried out by the output standardization means, second profile information, which is necessary for defining details of the image processing carried out by the image processing means, third profile information, which is necessary for defining details of the normalization processing carried out by the normalization processing means, and fourth profile information, which is necessary for defining details of the transform processing carried out by the input standardization means.

The present invention further provides a second image information filing method in an image processing system, to which at least one image information input apparatus having inherent input device characteristics and at least one image information output device having inherent output device characteristics are connected, the image processing system comprising:

i) an input standardization means for carrying out transform processing on image information, the transform processing being carried out such that, in every case where the image information has been received from one image information input apparatus, which is among connected image information input apparatuses, the received image information may be transformed into input standard image information, which does not depend upon the input device characteristics of the one image information input apparatus having fed the image information and depends upon standard device characteristics having been set previously, ii) a normalization processing means for carrying out normalization processing for normalizing and extracting image information, which is contained in the input standard image information and corresponds to a desired image portion, iii) an image processing means for carrying out desired image processing on the image information, which has been normalized by the normalization processing means, and iv) an output standardization means for carrying out transform processing on the image information, which has been obtained from the image processing, the transform processing being carried out such that, in every case where the image information, which has been obtained from the image processing, is to be fed into and reproduced as a visible image by one image information output device, which is among connected image information output devices, the image may be reproduced by the one image information output device to be fed with the image information and as an image, which does not depend upon the output device characteristics of the one image information output device to be fed with the image information and depends upon standard device characteristics having been set previously, the image information filing method comprising:
appending pieces of profile information to the input standard image information, the pieces of profile information comprising first profile information, which is necessary for defining details of the transform processing carried out by the output standardization means, second profile information, which is necessary for defining details of the image processing carried out by the image processing means, and third profile information, which is necessary for defining details of the normalization processing carried out by the normalization processing means.

The present invention still further provides a third image information filing method in an image processing system, to which at least one image information input apparatus having inherent input device characteristics and at least one image information output device having inherent output device characteristics are connected, the image processing system comprising:

i) an input standardization means for carrying out transform processing on image information, the transform processing being carried out such that, in every case where the image information has been received from one image information input apparatus, which is among connected image information input apparatuses, the received image information may be transformed into input standard image information, which does not depend upon the input device characteristics of the one image information input apparatus having fed the image information and depends upon standard device characteristics having been set previously, ii) a normalization processing means for carrying out normalization processing for normalizing and extracting image information, which is contained in the input standard image information and corresponds to a desired image portion, iii) an image processing means for carrying out desired image processing on the image information, which has been normalized by the normalization processing means, and iv) an output standardization means for carrying out transform processing on the image information, which has been obtained from the image processing, the transform processing being carried out such that, in every case where the image information, which has been obtained from the image processing, is to be fed into and reproduced as a visible image by one image information output device, which is among connected image information output devices, the image may be reproduced by the one image information output device to be fed with the image information and as an image, which does not depend upon the output device characteristics of the one image information output device to be fed with the image information and depends upon standard device characteristics having been set previously, the image information filing method comprising:
appending pieces of profile information to the image information which has been normalized, the pieces of profile information comprising first profile information, which is necessary for defining details of the transform processing carried out by the output standardization means, and second profile information, which is necessary for defining details of the image processing carried out by the image processing means.

The present invention also provides a fourth image information filing method in an image processing system, to which at least one image information input apparatus having inherent input device characteristics and at least one image information output device having inherent output device characteristics are connected, the image processing system comprising:

i) an input standardization means for carrying out transform processing on image information, the transform processing being carried out such that, in every case where the image information has been received from one image information input apparatus, which is among connected image information input apparatuses, the received image information may be transformed into input standard image information, which does not depend upon the input device characteristics of the one image information input apparatus having fed the image information and depends upon standard device characteristics having been set previously, ii) a normalization processing means for carrying out normalization processing for normalizing and extracting image information, which is contained in the input standard image information and corresponds to a desired image portion, iii) an image processing means for carrying out desired image processing on the image information, which has been normalized by the normalization processing means, and iv) an output standardization means for carrying out transform processing on the image information, which has been obtained from the image processing, the transform processing being carried out such that, in every case where the image information, which has been obtained from the image processing, is to be fed into and reproduced as a visible image by one image information output device, which is among connected image information output devices, the image may be reproduced by the one image information output device to be fed with the image information and as an image, which does not depend upon the output device characteristics of the one image information output device to be fed with the image information and depends upon standard device characteristics having been set previously, the image information filing method comprising:
appending profile information to the image information, which has been obtained from the image processing, the profile information being first profile information, which is necessary for defining details of the transform processing carried out by the output standardization means.

The present invention further provides an image output device, comprising:

i) an image output means for reproducing a visible image from image information, which has been subjected to image processing carried out by assuming output gradation and is provided with subsidiary information representing the assumed output gradation, and ii) a gradation correcting means for correcting the gradation of the image information in accordance with the subsidiary information and output gradation characteristics of the image output means, the correction being made such that the gradation of the output image reproduced by the image output means may approximately coincide with the assumed output gradation.

In the image output device in accordance with the present invention, the gradation correcting means may be provided with a look-up table forming means for forming a gradation correction look-up table such that the gradation of the output image reproduced by the image output means may approximately coincide with the assumed output gradation, and the gradation correcting means may transform the gradation of the image information in accordance with the formed gradation correction look-up table.

Alternatively, the gradation correcting means may comprise:

a plurality of gradation correction look-up tables having different correction characteristics for correcting the gradation of the image information, and a selection means for selecting a gradation correction look-up table, which is among the plurality of the gradation correction look-up tables and has the correction characteristics such that the gradation of the output image reproduced by the image output means may become closest to the assumed output gradation.

In the image output device in accordance with the present invention, the subsidiary information is the information, which is outputted (or inputted) by being appended to the image information. The subsidiary information may take on any form, which can define the output gradation assumed at the time of the image processing. For example, the subsidiary information may be given as lattice point data of a look-up table (LUT) or as numerical information representing a γ value, which defines the gradation characteristics.

With the first image processing system in accordance with the present invention, the standardization means cancels the dependence of the received image information upon the input device characteristics, and carries out the transform processing such that the received image information may be transformed into the image information, which depends upon the standard characteristics having been set previously for each image input modality. Therefore, in every case where the image information has been received from one image information input apparatus, within the range of the same kind of image input modality, the same image processing can be carried out on the image information without a difference in image information input apparatus having fed the image information being taken into consideration. In this manner, approximately identical effects of the image processing can be obtained. Also, in cases where the image information having been obtained from the standardization means is fed into a single image information output device, an image with image quality giving an approximately identical impression can be obtained.

Accordingly, the person, who views the image, can view the image information, which has been obtained from each image information input apparatus, as an image having unified image quality without considering what manufacturer produced the image information input apparatus having fed the image information and without considering a difference in type or version between the image information input apparatuses in cases where they are of the same manufacturer. As a result, in particular, the efficiency and accuracy of diagnosis of an illness can be enhanced.

With the second image processing system in accordance with the present invention, the standardization means cancels the dependence of the received image information upon the input device characteristics, and carries out the transform processing such that the received image information may be transformed into the image information, which depends upon the standard characteristics of the system that have been set previously. Therefore, in every case where the image information has been received from one image information input apparatus, the same image processing can be carried out on the image information without a difference in image information input apparatus having fed the image information and a difference in image input modality being taken into consideration. In this manner, approximately identical effects of the image processing can be obtained. Also, in cases where the image information having been obtained from the standardization means is fed into a single image information output device, an image with image quality giving an approximately identical impression can be obtained.

Accordingly, the person, who views the image, can view the image information, which has been obtained from each image information input apparatus, as an image, which has image quality conforming to a unified criterion, without considering what manufacturer produced the image information input apparatus having fed the image information and without considering whether the image input modality is or is not the same. As a result, with diverse viewing, in particular, the efficiency and accuracy of diagnosis of an illness can be enhanced.

With the third image processing system in accordance with the present invention, before the image information is fed into one of the image information output devices having inherent output device characteristics, the standardization means carries out the processing for canceling the output device characteristics of the image information output device to be fed with the image information. Also, the standardization means carries out the transform processing on the image information such that the image information may be transformed into the image information, which depends upon the standard characteristics having been set previously for each kind of the image information output device. Therefore, in every case where the image information (the image) is to be reproduced by one image information output device, within the range of the same kind of image information output device, an image having identical image quality can be reproduced by the image information output device to be fed with the image information.

Accordingly, the same image processing can be carried out on the image information without a difference in image information output device to be fed with the image information being taken into consideration. In this manner, approximately identical effects of the image processing can be obtained. Also, the person, who views the image, can view the image, which is reproduced by each image information output device, as an image, which has image quality conforming to a unified criterion, without considering what manufacturer produced the image information output device to be fed with the image information and without considering a difference in type or version between the image information output devices in cases where they are of the same manufacturer. As a result, in particular, the efficiency and accuracy of diagnosis of an illness can be enhanced.

With the fourth image processing system in accordance with the present invention, before the image information is fed into one image information output device, the standardization means cancels the output device characteristics of the image information output device to be fed with the image information. Also, the standardization means carries out the transform processing on the image information such that the image information may be transformed into the image information, which depends upon the standard characteristics of the system that have been set previously. Therefore, in every case where the image information (the image) is to be reproduced by one image information output device, the same image processing can be carried out on the image information without a difference in image information output device to be fed with the image information and a difference in kind of the image information output device being taken into consideration. In this manner, approximately identical effects of the image processing can be obtained, and an image with image quality giving an approximately identical impression can be obtained.

Accordingly, the person, who views the image, can obtain an image, which has image quality conforming to a unified criterion, from each image information output device without considering what manufacturer produced the image information output device to be fed with the image information and without considering whether the kind of the image information output device is or is not the same. As a result, with diverse viewing, in particular, the efficiency and accuracy of diagnosis of an illness can be enhanced.

With the fifth image processing system in accordance with the present invention, with respect to the image information, which has been received from one of image information input apparatuses having inherent input device characteristics and is to be fed into one of the image information output devices having inherent output device characteristics, before the image information is fed into the one image information output device, the standardization means carries out the processing for canceling the input device characteristics of the image information input apparatus having fed the image information and the output device characteristics of the image information output device to be fed with the image information. Also, the standardization means carries out the transform processing on the image information such that the image information may be transformed into the image information, which depends upon the standard characteristics of the system that have been set previously for each combination of the kind of the image input modality and the kind of the image information output device. Therefore, in every case where the image information has been received from one image input modality and is to be reproduced as an image by one image information output device, within the range of the same combination of the kind of the image input modality and the kind of the image information output device, an image having image quality conforming to a unified criterion can be reproduced by the image information output device to be fed with the image information.

Accordingly, the same image processing can be carried out on the image information without a difference in image information input apparatus having fed the image information and a difference in image information output device to be fed with the image information being taken into consideration. In this manner, approximately identical effects of the image processing can be obtained. Also, the person, who views the image, can view the image, which is reproduced by each image information output device, as an image, which has image quality conforming to a unified criterion, without considering a difference in manufacturer, type, or version of the image information input apparatus having fed the image information and a difference in manufacturer, type, or version of the image information output device to be fed with the image information. As a result, in particular, the efficiency and accuracy of diagnosis of an illness can be enhanced.

With the sixth image processing system in accordance with the present invention, with respect to the image information, which has been received from one of image information input apparatuses having inherent input device characteristics and is to be fed into one of the image information output devices having inherent output device characteristics, before the image information is fed into the one image information output device, the standardization means carries out the processing for canceling the input device characteristics of the image information input apparatus having fed the image information and the output device characteristics of the image information output device to be fed with the image information. Also, the standardization means carries out the transform processing on the image information such that the image information may be transformed into the image information, which depends upon the standard characteristics of the system that have been set uniformly regardless of the combination of the kind of the image input modality and the kind of the image information output device. Therefore, in every case where the image information has been received from one image input modality and is to be reproduced as an image by one image information output device, regardless of the combination of the kind of the image input modality and the kind of the image information output device, an image having image quality conforming to a unified criterion can be reproduced by the image information output device to be fed with the image information.

Accordingly, the same image processing can be carried out on the image information without a difference in image information input apparatus having fed the image information and a difference in image information output device to be fed with the image information being taken into consideration. In this manner, approximately identical effects of the image processing can be obtained. Also, the person, who views the image, can view the image, which is reproduced by each image information output device, as an image, which has image quality conforming to a unified criterion, without considering a difference in kind of image input modality, manufacturer, type, or version of the image information input apparatus having fed the image information and a difference in kind, manufacturer, type, or version of the image information output device to be fed with the image information. As a result, in particular, the efficiency and accuracy of diagnosis of an illness can be enhanced.

With the seventh image processing system in accordance with the present invention, the response characteristics variation calculating means calculates variation in response characteristics, which occurs due to the image size enlargement or reduction processing, in accordance with the details of the image size enlargement or reduction processing. Also, the correction means carries out the frequency emphasis processing (including the smoothing processing) on the image information and in accordance with the variation in response characteristics. Therefore, an image, which has been compensated for the variation in response characteristics due to the image size enlargement or reduction processing, can be reproduced by the image information output device.

With the eighth image processing system in accordance with the present invention, the response characteristics variation calculating means calculates variation in response characteristics, which occurs due to the image size enlargement or reduction processing, in accordance with the details of the image size enlargement or reduction processing. Also, the correction means corrects the processing parameters (including those with the filter factors, or the like) for the transform processing, which is carried out on the image information by the standardization-means, in accordance with the variation in response characteristics. Therefore, an image, which has been compensated for the variation in response characteristics due to the image size enlargement or reduction processing, can be reproduced by the image information output device.

With the ninth image processing system in accordance with the present invention, the response characteristics variation calculating means calculates variation in response characteristics, which occurs due to the image size enlargement or reduction processing, in accordance with the details of the image size enlargement or reduction processing. Also, the correction means corrects the parameters (including those with the filter factors, or the like.), which are utilized for the interpolation processing accompanying the image size enlargement or reduction processing carried out on the image information, in accordance with the variation in response characteristics. Therefore, an image, which has been compensated for the variation in response characteristics due to the image size enlargement or reduction processing, can be reproduced by the image information output device.

Also, with each of the seventh, eighth, and ninth image processing systems in accordance with the present invention, the standardization means carries out the transform processing on the image information, such that the image information may be reproduced by one image information output device to be fed with the image information and as a visible image, which does not depend upon the response characteristics of the one image information output device to be fed with the image information and depends upon the standard characteristics having been set uniformly for the system. Therefore, the image quality of the reproduced image can be determined uniformly. Accordingly, in particular, the efficiency and accuracy of diagnosis of an illness can be prevented from becoming low due to the occurrence of a difference in image quality between reproduced images.

With the tenth, eleventh, twelfth, and thirteenth image processing systems and the first, second, third, and fourth image information filing methods in an image processing system in accordance with the present invention, in the image processing system wherein, with respect to the image information having been received from an image information input apparatus, the processing for canceling the dependence upon the input device characteristics of the image information input apparatus, the normalization processing, the image processing, and the processing for canceling the dependence upon the output device characteristics of an image information output device, into which the image information is to be fed, are carried out, the profile information, which is necessary for each of subsequent processings, is appended to the image information in a step prior to one of the aforesaid processings. Therefore, in a subsequent processing means or a subsequent processing step, the profile information appended to the image information can be read, and the details of the processing to be carried out can be determined from the profile information.

With the image output device in accordance with the present invention, the gradation of the image information is corrected in accordance with the gradation information, which represents the output gradation assumed at the time of image processing, and the output gradation characteristics of the image output means, which constitutes the image output device. The correction is made such that the gradation of the output image, which is ultimately reproduced by the image output device, may approximately coincide with the output gradation, which was intended at the time of the image processing. Therefore, regardless of the inherent gradation characteristics of the image output device, the gradation, which was intended at the time of the image processing, can be obtained. Specifically, in cases where the assumed output gradation varies for different images, an appropriate correction of gradation can be made with respect to each image, and therefore each image can be reproduced with the assumed output gradation.

BRIEF DESCRIPTION OF THE DRAWINGS

FIG. 1 is a conceptual view showing an open network 100, in which an embodiment of the image processing system in accordance with the present invention is employed, FIG. 2 is a block diagram showing an embodiment of the first image processing system in accordance with the present invention, FIG. 3A is a graph showing gradation characteristics of a first CR apparatus, FIG. 3B is a graph showing gradation characteristics of a second CR apparatus, FIGS. 6A and 6B are explanatory graphs showing how frequency emphasis processing is carried out, FIGS. 17A, 17B, 17C, and 17D are explanatory graphs showing how processing for correcting a modulation transfer function is carried out by a standardization means, FIGS. 22A and 22B are graphs showing a difference in output device characteristics, FIG. 30A, 30B, and 30C are explanatory graphs showing how transform processing is carried out by an input standardization means.

DESCRIPTION OF THE PREFERRED EMBODIMENTS

Figure 4A:
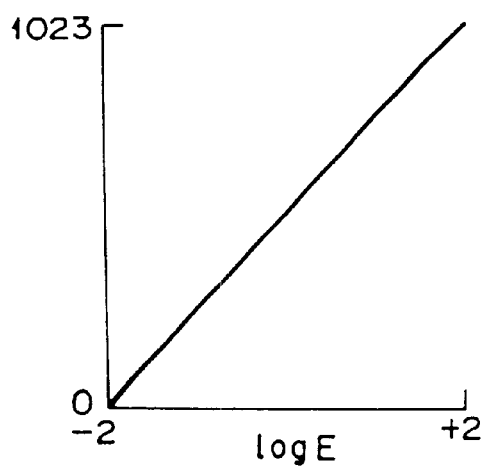
FIGS. 4A, 4B, and 4C are explanatory graphs showing how transform processing for gradation characteristics is carried out by a standardization means on image information which has been received from the first CR apparatus.

The present invention will hereinbelow be described in further detail with reference to the accompanying drawings.

FIG. 1 is a conceptual view showing an open network 100, in which an embodiment of the image processing system in accordance with the present invention is employed.

In the open network 100, a group of image information input apparatuses 10 and a group of image information output devices 20 are connected to an embodiment 30 of the first image processing system in accordance with the present invention. The group of image information input apparatuses 10 comprises a plurality of kinds of image input modalities (i.e., CR apparatuses 11, CT scanners 12, an MRI apparatus 13, an RI scanner 14, and the other image input modality 15). The group of image information output devices 20 comprises a plurality of kinds of image output devices (i.e., CRT display devices 21, LP's 22, and the other image output device 23).

The open network 100 shown in FIG. 1 takes on the bus form. However, the network may take on one of various other forms, such as a star form and a ring form.

The CR apparatuses 11 include a first CR apparatus 11a, a second CR apparatus 11b, and a third CR apparatus 11c. The CT scanners 12 include a first CT scanner 12a and a second CT scanner 12b.

The CRT display devices 21 include a first CRT display device 21a and a second CRT display device 21b. LP's 22 include a first LP 22a and a second LP 22b.

The first CR apparatus 11a, the second CR apparatus 11b, and the third CR apparatus 11c have different gradation characteristics due to, for example, a difference in manufacturer. Therefore, in cases where the same image information (representing a radiation dose, or the like) is presented to the first CR apparatus 11a, the second CR apparatus 11b, and the third CR apparatus 11c, pieces of image information, which are obtained from the CR apparatuses 11a, 11b, and 11c and fed into the open network 100, depend upon device characteristics of the CR apparatuses 11a, 11b, and 11c. As a result, the pieces of image information, which are thus fed into the open network 100, have different gradation characteristics.

The difference in input device characteristics, such as the gradation characteristics, occurs due to a difference in manufacturer of the image information input apparatus and due to various other factors, such as a difference in type of apparatus. The same problems as those encountered with the CR apparatuses 11a, 11b, and 11c also occur with the CT devices 12a and 12b, which belong to another image input modality. Further, output device characteristics vary between the CRT display devices 21a and 21b and between the LP's 22a and 22b due to various factors, such as a difference in manufacturer of device and a difference in type of device.

The embodiment of the image processing system 30 will be described hereinbelow. The image processing system 30 shown in FIG. 1 has a constitution shown in FIG. 2. As illustrated in FIG. 2, the image processing system 30 is provided with a standardization means 31 for carrying out transform processing on the image information, which has been fed from one image information input apparatus among the image information input apparatuses 10 into the open network 100 and is to be fed into one image information output device among the image information output devices 20, such that the image information may be transformed into image information, which does not depend upon the gradation characteristics of the one image information input apparatus 10 having fed the image information and depends upon gradation characteristics of the system that have been set previously.

The standardization means 31 comprises a device characteristics detecting means 32, an input device characteristics cancel processing means 33, and a standardization processing means 34. The device characteristics detecting means 32 detects the gradation characteristics of the image information input apparatus having fed the image information. The input device characteristics cancel processing means 33 cancels the dependence of the received image information upon the gradation characteristics of the image information input apparatus having fed the image information. The canceling is carried out with respect to each image input modality. The standardization processing means 34 transforms the image information, whose dependence upon the gradation characteristics has been canceled, into standard image information with respect to each image input modality.

Profile information, which directly defines the gradation characteristics of the image information input apparatus, is appended as subsidiary information to the image information, which is fed from the image information input apparatus into the open network 100. Therefore, the gradation characteristics may be detected in accordance with the appended information. Accordingly, the detection of the gradation characteristics of the image information input apparatus having fed the image information, which detection is carried out by the device characteristics detecting means 32, is carried out by analyzing the profile information, which is appended to the received image information.

The device characteristics detecting means 32 may have a constitution such that the information for identifying all of the image information input apparatuses connected to the open network 100 and profile information, which defines the gradation characteristics of each identified image information input apparatus, may be specified in a table, and such that the information representing the table may be stored in a memory, or the like. In such cases, instead of the profile information being appended as the subsidiary information, the information, which specifies the image information input apparatus that feeds the image information, may be appended to the image information.

The processing for canceling the dependence of the image information upon the gradation characteristics of the image information input apparatus having fed the image information is carried out by the input device characteristics cancel processing means 33 in the manner described below.

The image information, which is fed from the image information input apparatus 10 into the image processing system 30, is the one, which has been obtained from transform processing for defining the gradation characteristics that is carried out by the image information input apparatus 10 on image information presented to the image information input apparatus 10. (The image information presented to the image information input apparatus 10 is the raw data before being detected by the image information input apparatus 10 and does not yet depend upon the input device characteristics of the image information input apparatus 10.) Therefore, inverse transform processing is carried out for restoring the image information before being detected by the image information input apparatus 10. The image information, which has been obtained from the inverse transform processing, is the raw image information and does not depend upon the input device characteristics of the image information input apparatus 10. Accordingly, the image information, which has been obtained from the inverse transform processing, is the one whose dependence upon the input device characteristics has been canceled.

In order for the inverse transform processing to be carried out, each time the gradation characteristics are detected by the device characteristics detecting means 32, a table (i.e., an inverse transform table), which defines the profile of the inverse transform processing, is formed in accordance with the detected gradation characteristics. As in the case of the aforesaid profile information, the inverse transform table, which corresponds to each image information input apparatus, may be prepared as a data base and stored previously.

How the image processing system 30 operates will be described hereinbelow.

Firstly, for example, first image information, which has the gradation characteristics shown in FIG. 3A, is fed from the first CR apparatus 11a into the open network 100. The first image information, which has been fed into the open network 100, is fed into the image processing system 30.

The first image information, which has been fed into the image processing system 30, is fed into the standardization means 31 of the image processing system 30. In accordance with the subsidiary information appended to the first image information, the device characteristics detecting means 32 analyzes the gradation characteristics of the image information input apparatus (i.e., the first CR apparatus 11a), which has fed the first image information.

As a result of the analysis, the device characteristics detecting means 32 detects the gradation characteristics of the first CR apparatus 11a as the gradation characteristics having a profile shown in FIG. 4A.

Figure 4B:
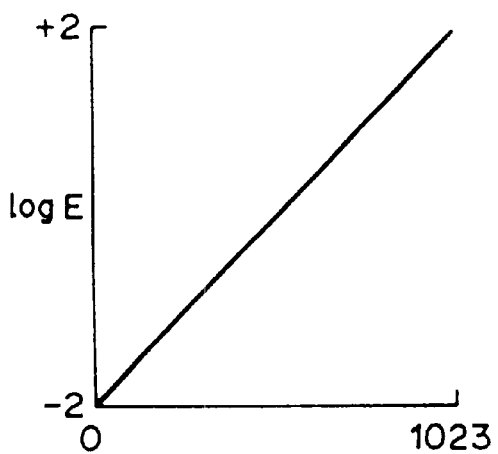

Thereafter, in accordance with the gradation characteristics of the first CR apparatus 11a having been detected by the device characteristics detecting means 32, the input device characteristics cancel processing means 33 forms an inverse transform table, which defines the inverse transform processing (as illustrated in FIG. 4B) such that the dependence of the first image information having fed into the open network 100 upon the gradation characteristics of the first CR apparatus 11a may be canceled. Also, the input device characteristics cancel processing means 33 carries out the inverse transform processing on the first image information and in accordance with the inverse transform table. As a result of the inverse transform processing, the first image information is returned to the image information logE before being detected by the first CR apparatus 11a.

Thereafter, the standardization processing means 34 transforms the image information logE, which has been returned to the state before being detected by the first CR apparatus 11a, into the standard image information, which depends upon the standard gradation characteristics of the system that have been set previously for the CR apparatuses 11. Specifically, the correspondence relationship between the input quantity, which is represented by the image information logE, and the output quantity, which is represented by digital signal values of 0 to 4,095, is set in accordance with the profile shown in FIG. 4C, which defines the standard gradation characteristics of the system and has been stored previously as the table representing the standard gradation characteristics. As the standard gradation characteristics of the system, different optimum characteristics have been set for different image input modalities, i.e., for the CR apparatuses 11, for the CT scanners 12, for the MRI apparatus 13, for the RI scanner 14, and for the other image input modality 15. Therefore, with respect to pieces of image information, which have been received from the first CR apparatus 11a, the second CR apparatus 11b, and the third CR apparatus 11c, the standard gradation characteristics of the system, which have been set for the CR apparatuses 11, are employed. With respect to pieces of image information, which have been received from the first CT scanner 12a and the second CT scanner 12b, the standard gradation characteristics of the system, which have been set for the CT scanners 12, are employed. With respect to the image information, which has been received from the MRI apparatus 13, the standard gradation characteristics of the system, which have been set for the MRI apparatus 13, are employed. With respect to the image information, which has been received from the RI scanner 14, the standard gradation characteristics of the system, which have been set for the RI scanner 14, are employed. With respect to the image information, which has been received from the other image input modality 15, the standard gradation characteristics of the system, which have been set for the other image input modality 15, are employed.

In the manner described above, the dependence of the first image information, which has been received from the first CR apparatus 11a, upon the gradation characteristics of the first CR apparatus 11a is canceled. The image information, which depends upon the standard gradation characteristics having been set for the image input modality of the CR apparatuses 11, is thereby obtained.

With respect to second image information, which is received from the second CR apparatus 11b and has the gradation characteristics shown in FIG. 3B, processing is carried out in the manner described below.

Figure 5A:
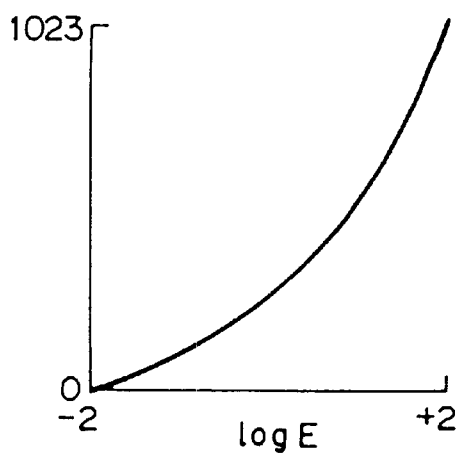
FIGS. 5A, 5B, and 5C are explanatory graphs showing how gradation characteristics transform processing is carried out by a standardization means on image information, which has been received from the second CR apparatus.

Specifically, the second image information, which has been fed into the image processing system 30, is fed into the standardization means 31 of the image processing system 30. In accordance with the subsidiary information appended to the second image information, the device characteristics detecting means 32 analyzes the gradation characteristics of the image information input apparatus (i.e., the second CR apparatus 11b), which has fed the second image information. As a result of the analysis, the device characteristics detecting means 32 detects the gradation characteristics of the second CR apparatus 11b as the gradation characteristics having a profile shown in FIG. 5A.

Figure 5B:
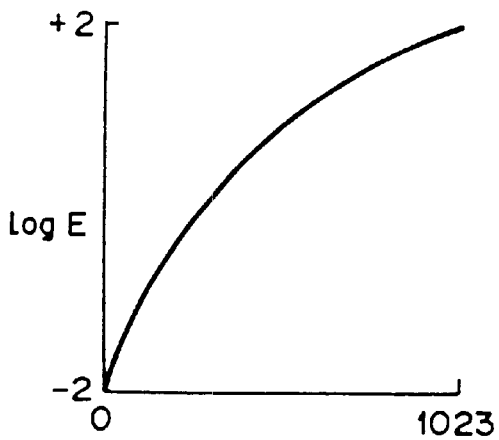

Thereafter, the input device characteristics cancel processing means 33 forms an inverse transform table, which defines the inverse transform processing (as illustrated in FIG. 5B) such that the dependence of the second image information upon the gradation characteristics of the second CR apparatus 11b may be canceled. Also, the input device characteristics cancel processing means 33 carries out the inverse transform processing on the second image information and in accordance with the inverse transform table. The second image information is thereby returned to the image information logE before being detected by the second CR apparatus 11b.

Figure 5C:
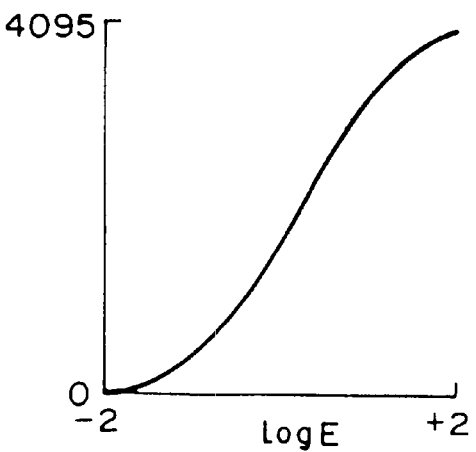

Thereafter, the standardization processing means 34 sets the correspondence relationship between the input quantity, which is represented by the image information logE having been returned to the state before being detected by the second CR apparatus 11b, and the output quantity, which is represented by digital signal values of 0 to 4,095, in accordance with the profile shown in FIG. 5C.

In the manner described above, the dependence of the second image information, which has been received from the second CR apparatus 11b, upon the gradation characteristics of the second CR apparatus 11b is canceled. The image information, which depends upon the standard gradation characteristics having been set for the image input modality of the CR apparatuses 11, is thereby obtained.

The first image information, which has been received from the first CR apparatus 11a, and the second image information, which has been received from the second CR apparatus 11b, are thus transformed into the image information, which does not depend upon the gradation characteristics of the corresponding CR apparatus and depends upon the standard gradation characteristics that are common to the CR apparatuses 11. Therefore, in cases where the same image processing [predetermined normalization processing (EDR processing), gradation processing, emphasis processing, abnormal pattern detection processing, or the like] is carried out on the image information, approximately identical effects of the image processing can be obtained. Also, in cases where the image information is fed into a single image information output device, e.g. the first CRT display device 21a, and reproduced as a visible image, the image can be viewed as an image having unified image quality.

The image processing may be carried out on the image information after being processed at least by the input device characteristics cancel processing means 33. Alternatively, the image processing may be carried out on the standard image information after being processed by the standardization processing means 34.

The operations described above can also be applied to the image information received from other image input modalities (for example, the image input modality including the first CT scanner 12a and the second CT scanner 12b). Therefore, the person, who views the image, can view the image information, which has been obtained from each of the image information input apparatuses 10, as an image having approximately identical image quality without considering, for example, what manufacturer produced the image information input apparatus having fed the image information. As a result, in particular, the efficiency and accuracy of diagnosis of an illness can be enhanced.

Figure 4C:
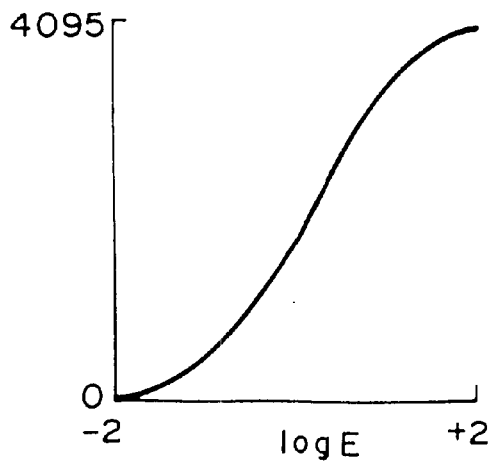

In this embodiment of the image processing system 30, the input device characteristics cancel processing means 33 and the standardization processing means 34 are formed as two independent constitution elements. However, the first image processing system in accordance with the present invention is not limited to the constitution described above, and the input device characteristics cancel processing means 33 and the standardization processing means 34 may be combined into a single standardization means. In such cases, a standardization table maybe formed by combining the inverse transform table, which is shown in FIG. 4B (or FIG. 5B), and the table representing the standard gradation characteristics, which is shown in FIG. 4C (or FIG. 5C), with each other. Alternatively, the single combined standardization means described above maybe provided with the standardization table previously. The standard characteristics of the system, which have been set for each image input modality, need not necessarily be fixed and may be set such that they can be altered into desired characteristics in accordance with a request made from the image information output devices 20 or by using an input means provided in the image processing system 30.

In the embodiment described above, the gradation characteristics are employed as the input device characteristics. Alternatively, characteristics concerning response related to frequency characteristics may be employed as the input device characteristics.

Specifically, for example, the frequency characteristics of the first CR apparatus 11a having fed the image information may be defined by a response function $MTF_{in}$, which is shown in FIG. 6A. Also, the standard frequency characteristics having been set for the CR apparatuses 11 may b e defined by a response function $MTF_{sys}$, which is indicated by the solid line in FIG. 6B. In such cases, a table representing the standard frequency characteristics defined by the response function $MTF_{sys}$ is stored in the standardization means 31. The standardization means 31 calculates a difference a between the response function $MTF_{sys}$ and the response function $MTF_{in}$ (i.e., the difference between the solid line and the broken line shown in FIG. 6B).

The difference α represents the amount of deterioration of the response function $MTF_{in}$, which represents the frequency characteristics of the first CR apparatus 11a, with respect to the target response function $MTF_{sys}$.

Therefore, the standardization means 31 carries out Fourier transform on the received image information and carries out frequency emphasis processing in the frequency domain such that a modulation transfer function MTFα, which supplements the amount of deterioration α, may be obtained with $MTF_{in}$ being taken as a reference (=1.0). The image information having been obtained from the emphasis processing is then subjected to inverse Fourier transform and thereby returned to the image domain.

By the operations described above, the received image information, which depends upon the frequency characteristics $MTF_{in}$ of the first CR apparatus 11a, is transformed into the image information, which depends upon the standard frequency characteristics $MTF_{sys}$ having been set for the CR apparatuses 11.

In the manner described above, the frequency emphasis processing is carried out in the frequency domain with the Fourier transform. Alternatively, the frequency emphasis processing may be carried out in the spatial domain by using a spatial-domain filter, such as an unsharp mask filter.

With the correction processing using the spatial-domain filter, it is substantially impossible to carry out the emphasis in every frequency band. Therefore, for example, the visual characteristics may be taken into consideration, and the emphasis may be carried out primarily for a frequency band, which is associated with the highest visual response under ordinary image viewing conditions.

However, since there is a difference in visual characteristics between persons who view the images, ordinary visual characteristics may be set as a representative value, or the visual characteristics may be set for each person who views the images.

In cases where the emphasis processing with the unsharp mask filter is employed, the image processing system may be provided with a reference table or a transform table, which represents filter factors that define the unsharp mask filter. Information representing the filter factors obtained from the table may be fed into the standardization means, and the standardization processing may thereby be carried out. Alternatively, the standardization means may be provided with the table as part of the constitution.

The table described above is composed of discrete data, which represents the correspondence relationship between the input quantity and the output quantity or represents parameters. For example, when the response function is taken as an example, data with respect to a frequency other than the correspondence data may be calculated by carrying out an interpolating operation on the data points, which are present as the discrete data, and with an equation of the first order or a higher order as indicated by the broken line in FIG. 7. Alternatively, in lieu of the table, transform may be carried out with a function form. In such cases, for example, approximation may be made with a Gaussian function [$MTF = \exp(-aS)^2$, wherein S represents the frequency, and a represents the parameter representing the width of the Gaussian function], and the parameter a of the function may be transmitted.

In the embodiment described above, a plurality of kinds of the image input modalities and a plurality of the image information output devices are connected to the image processing system through the network. However, the first image processing system in accordance with the present invention is not limited to the aforesaid embodiment. For example, as illustrated in FIGS. 8A, 8B, 8C, and 8D, at least two image information input apparatuses (e.g., the first CR apparatus 11a and the second CR apparatus 11b), which belong to a single kind of image input modality (in the cases illustrated, the image input modality of the CR apparatuses) and have different input device characteristics, and at least one image information output device may be connected to the image processing system. Alternatively, as illustrated in FIGS. 9A, 9B, 9C, and 9D, a plurality of image input modalities (in the cases illustrated, the image input modality of the CR apparatuses and the image input modality of the CT scanners), in which one image input modality (in the cases illustrated, the image input modality of the CR apparatuses) includes at least two image information input apparatuses (e.g., the first CR apparatus 11a and the second CR apparatus 11b) having different input device characteristics, and at least one image information output device may be connected to the image processing system.

Figure 10A:
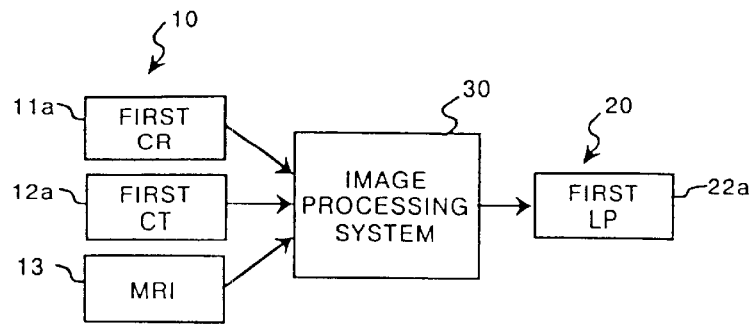
FIGS. 10A, 10B, 10C, and 10D are block diagrams showing embodiments of the second image processing system in accordance with the present invention.
Figure 10B:
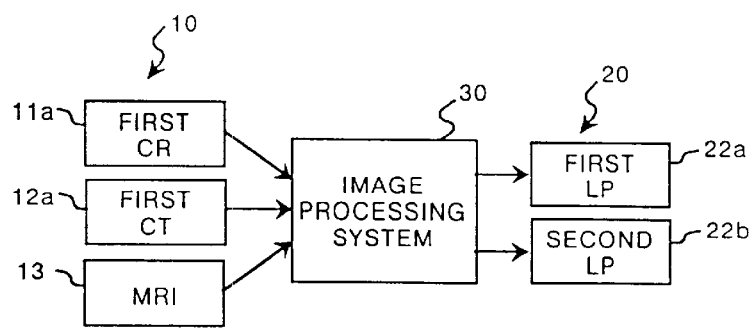
Figure 10C:
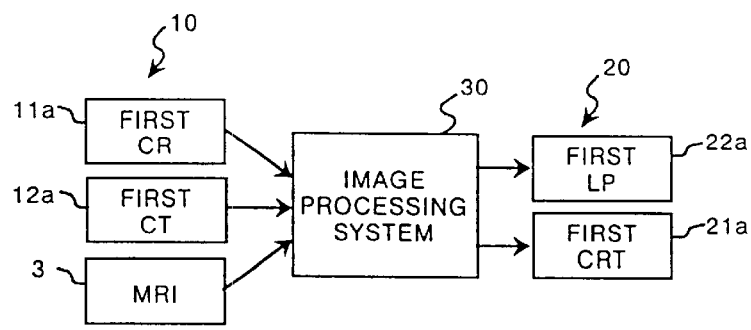
Figure 10D:
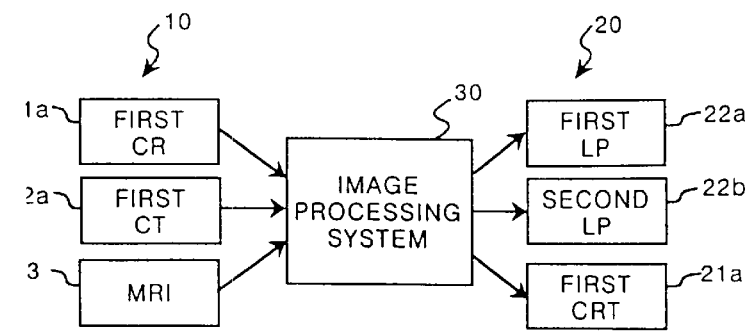

Also, as illustrated in FIGS. 10A, 10B, 10C, an 10D, a plurality of image input modalities (in the cases illustrated, the image input modality of the CR apparatuses, the image input modality of the CT scanners, and the image input modality of the MRI apparatus), each of which includes only one image information input apparatus, and at least one image information output device may be connected to the image processing system. Such an embodiment is not included in the scope of the first image processing system in accordance with the present invention and is included in the scope of the; second image processing system in accordance with the present invention. In the second image processing system in accordance with the present invention, a plurality of image input modalities and at least one image information output device may be connected to the image processing system, and no limitation is imposed upon the number of the image information input apparatuses included in each of the image input modalities.

As described above, the image processing systems 30 illustrated in FIGS. 10A, 10B, 10C, and 10D constitute the embodiments of the second image processing system in accordance with the present invention. Basically, the image processing systems 30 are similar to the aforesaid embodiment of the first image processing system in accordance with the present invention. In the embodiments of the second image processing system in accordance with the present invention, the standardization means comprises (a) a device characteristics detecting means for detecting the input device characteristics, upon which the received image information depends, (b) an input device characteristics cancel processing means for canceling the dependence of the received image information upon the input device characteristics (the canceling being carried out for each image input modality), and (c) a standardization processing means for transforming the received image information, whose dependence upon the input device characteristics has been canceled, into the standard image information, which depends upon predetermined standard characteristics of the system that have been set regardless of the kinds of the image input modalities. The standardization means cancels the dependence of the received image information upon the input device characteristics and carries out the transform processing such that the image information may be obtained, which depends upon the standard characteristics of the system that have been set previously regardless of whether the image input modalities are or are not the same. Therefore, in every case where the image information has been received from one image information input apparatus, the same image processing can be carried out on the image information without a difference in image information input apparatus having fed the image information and a difference in image input modality being taken into consideration. In this manner, approximately identical effects of the image processing can be obtained. Also, in cases where the image information having been obtained from the standardization means is fed into a single image information output device, an image with image quality giving an approximately identical impression can be obtained.

An embodiment of the third image processing system in accordance with the present invention will be described hereinbelow. As in the aforesaid image processing system 30, an image processing system 130 illustrated in FIG. 11 (and each of image processing systems which will be described later) is connected to the open network 100 shown in FIG. 1.

The first CRT display device 21a and the second CRT display device 21b have different inherent modulation transfer functions, which are represented by response functions $MTF_{out}$, due to a difference in manufacturer, and the like.

Therefore, in cases where the same image information is fed into the first CRT display device 21a and the second CRT display device 21b, the pieces of image information (images), which are reproduced by (displayed on) the CRT display devices 21a and 21b respectively depend upon the modulation transfer functions of the CRT display devices 21a and 21b, Therefore, the two displayed images have different image quality. The difference in image quality appears as a difference in impression given by the images.

Besides the difference in manufacturer, the difference in modulation transfer function also occurs due to various other factors, such as a difference in type or version of the image information output device and a difference in display size. The same problems as those with the CRT display devices 21a and 21b are also encountered between the first LP 22a and the second LP 22b.

Figure 11:
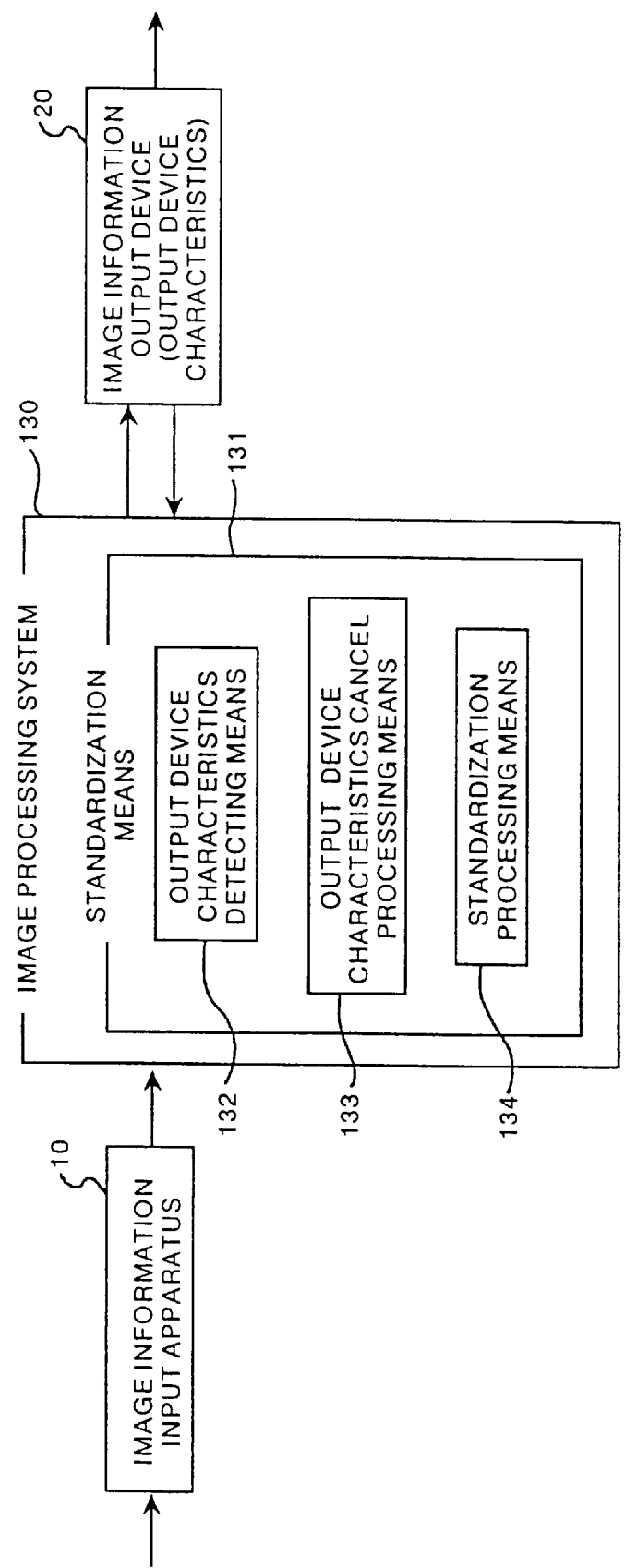
FIG. 11 is a block diagram showing an embodiment of the third image processing system in accordance with the present invention.

The image processing system 130, which is an embodiment of the third image processing system in accordance with the present invention, will be described hereinbelow. As illustrated in FIG. 11, the image processing system 130 is provided with a standardization means 131. In cases where the image information, which has been fed from one of the image information input apparatuses 10 into the open network 100, is to be fed into a specified image information output device, which is among the image information output devices 20, the standardization means 131 carries out transform processing on the image information and in accordance with the modulation transfer function $MTF_{out}$ of the image information output device 20, into which the image information is to be fed, and standard characteristics $MTF_{sys}$ of the system. The transform processing is carried out such that the image information may be reproduced by the image information output device 20 as an image, which does not depend upon the modulation transfer function $MTF_{out}$ of the image information output device 20 to be fed with the image information and depends upon the standard characteristics $MTF_{sys}$ of the system that have been set uniformly for each kind of the image information output device to be fed with the image information.

How the standardization means 131 operates will hereinbelow be described in detail.

In the aforesaid open network 100, a request for the output of the image information, which has been fed from one of the image information input apparatuses 10 into the open network 100, may be made from one of the image information output devices 20 to the open network 100. How the processing is carried out in such cases will be described hereinbelow with reference to FIGS. 12A and 12B.

Figure 12A:
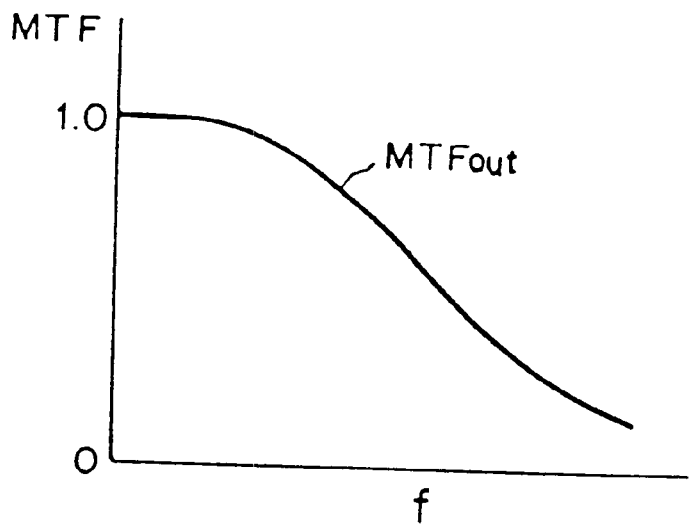
FIGS. 12A and 12B are explanatory graphs showing how transform processing for a modulation transfer function is carried out by a standardization means on image information, which has been received from a first CR apparatus.

FIG. 12A shows the modulation transfer function $MTF_{out}$ of, for example, the first CRT display device 21a. For example, a request for the output of the image information, which has been fed from one of the CR apparatuses 11 into the open network 100, is made from the first CRT display device 21a to the open network 100. In accordance with the request, the image information is fed into the first CRT display device 21a. A visible image representing the image information is reproduced and displayed on the first CRT display device 21a. At this time, the visible image displayed on the first CRT display device 21a depends upon the modulation transfer function $MTF_{out}$ of the first CRT display device 21a, into which the image information is fed from the open network 100.

Also, a request for the output of the image information, which has been fed from the CR apparatus 11 into the open network 100, is made from the second CRT display device 21b to the open network 100. In accordance with the request, the image information is fed into the second CRT display device 21b. A visible image representing the image information is reproduced and displayed on the second CRT display device 21b. At this time, the visible image displayed on the second CRT display device 21b depends upon the modulation transfer function $MTF_{out}$ of the second CRT display device 21b, into which the image information is fed from the open network 100.

When the visible image displayed on the first CRT display device 21a and the visible image displayed on the second CRT display device 21b are compared with each other, they give different impressions due to the difference in the modulation transfer function $MTF_{out}$. Therefore, in cases where the same image information, which has been received from a single image information input apparatus 10 (in the example described above, the CR apparatus 11), is fed into the image information output devices of the same kind (in this example, the CRT display devices 21), the images giving different impressions are obtained for different output device characteristics of the image information output devices 20 fed with the image information (in this example, the first CRT display device 21a and the second CRT display device 21b). In such cases, there is the risk that the results of diagnosis made by viewing the image displayed on the first CRT display device 21a and the results of diagnosis made by viewing the image displayed on the second CRT display device 21b will become different from each other.

The standardization means 131 carries out the transform processing such that the image information may be reproduced as the image, which depends upon the standard characteristics having been set uniformly for each kind of the image information output devices 20. Specifically, it will often occur that the standard characteristics with respect to the CRT display devices 21 and the standard characteristics with respect to the LP's 22 are set as different characteristics. However, the standard characteristics with respect to the first CRT display device 21a and the standard characteristics with respect to the second CRT display device 21b are set as the same characteristics. Also, the standard characteristics with respect to the first LP 22a and the standard characteristics with respect to the second LP 22b are set as the same characteristics.

The information representing the standard characteristics $MTF_{sys}$, which have been set as the target modulation transfer function for the image to be ultimately reproduced by the image information output device 20, is stored for each kind of the output devices in a storage region of the image processing system 130. The output device characteristics detecting means 132 of the standardization means 131 receives the information, which represents the modulation transfer function $MTF_{out}$, (shown in FIG. 12A) of the first CRT display device 21a to be fed with the image information, from the image information output device 20 to be fed with the image information (i.e., the first CRT display device 21a).

Thereafter, in accordance with the output device characteristics $MTF_{out}$, the output device characteristics cancel processing means 133 of the standardization means 131 calculates transform characteristics G such that the output device characteristics $MTF_{out}$ may become inverse transform $G^{-1}$ of the predetermined transform characteristics G. Thereafter, the output device characteristics cancel processing means 133 carries out transform processing with the transform characteristics G. (As an aid in facilitating the explanation, the transform processing will hereinbelow be referred to as the "inverse transform processing.")

Thereafter, the standardization processing means 134 carries out transform processing on the image information, which has been obtained from the inverse transform processing carried out with the transform characteristics G, and in accordance with predetermined standard characteristics.

The thus obtained image information is the information depending upon the standard characteristics and the transform characteristics G. However, since the image information has been subjected to the transform processing with the output device characteristics $MTF_{out}$ ($=G^{-1}$) of the first CRT display device 21a to be fed with the image information, the transform characteristics G of the aforesaid inverse transform processing and the output device characteristics $MTF_{out}$ are canceled each other. Therefore, the image, which is reproduced by the first CRT display device 21a, does not depend upon the output device characteristics $MTF_{out}$ and depends upon the standard characteristics.

Figure 12B:
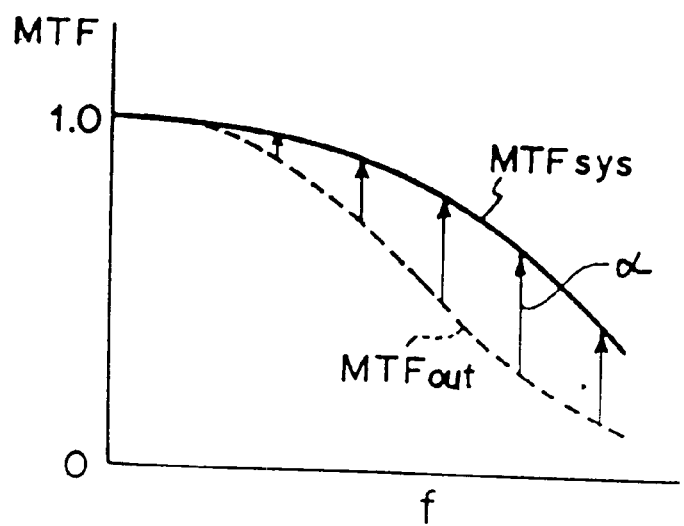
Figure 13A:
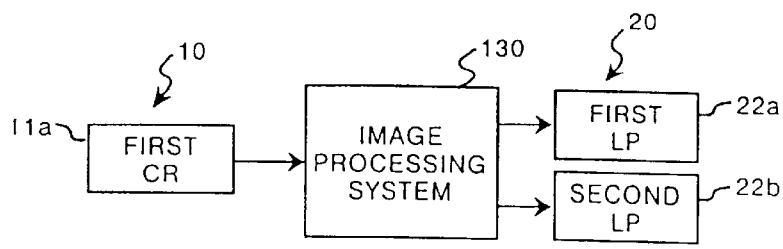
FIGS. 13A, 13B, 13C, and 13D are block diagrams showing different embodiments of the third image processing system in accordance with the present invention.
Figure 13B:
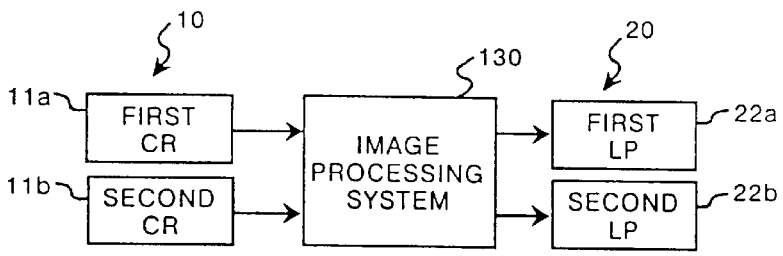
Figure 13C:
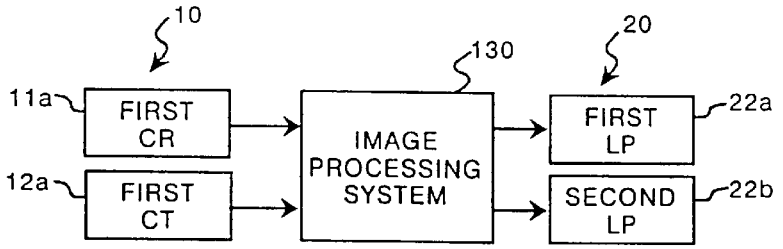
Figure 13D:
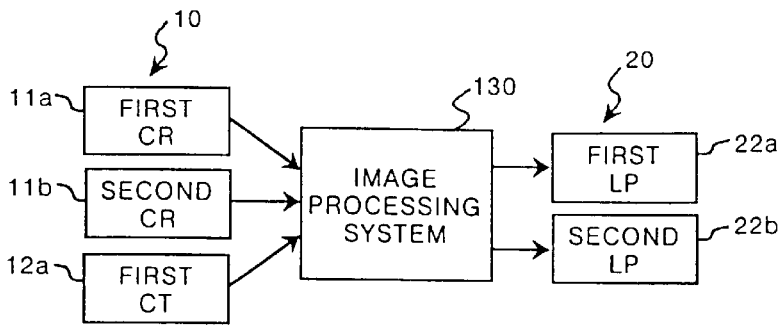
Figure 14A:
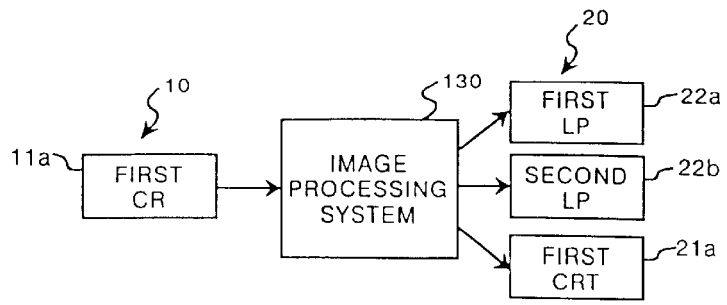
FIGS. 14A, 14B, 14C, and 14D are block diagrams showing further different embodiments of the third image processing system in accordance with the present invention.
Figure 14B:
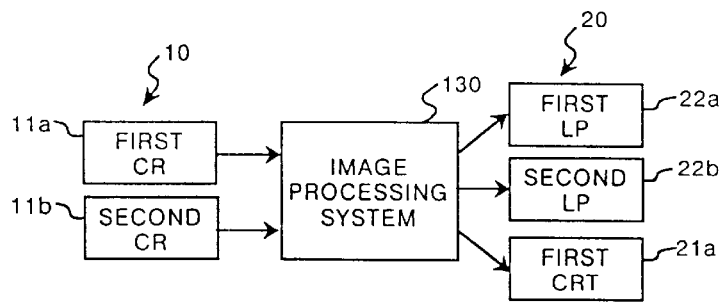
Figure 14C:
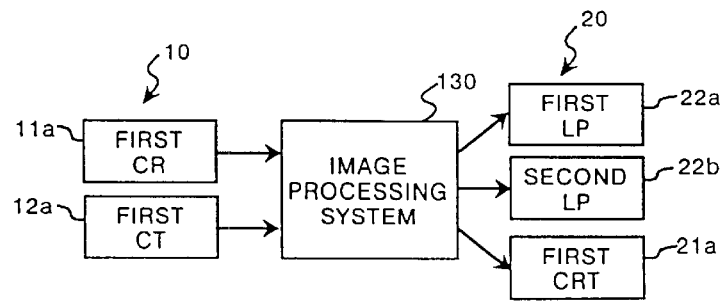
Figure 14D:
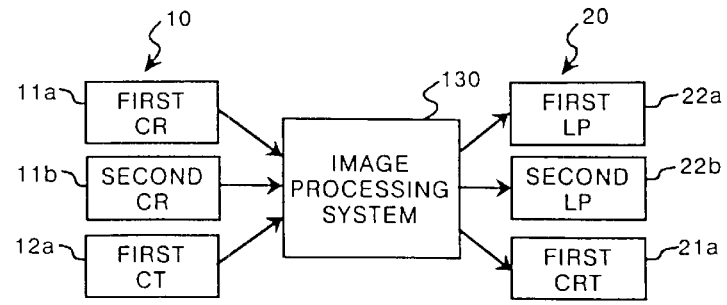
Figure 15A:
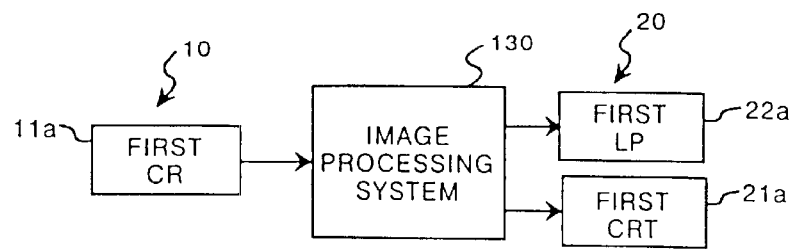
FIGS. 15A, 15B, 15C, and 15D are block diagrams showing embodiments of the fourth image processing system in accordance with the present invention.
Figure 15B:
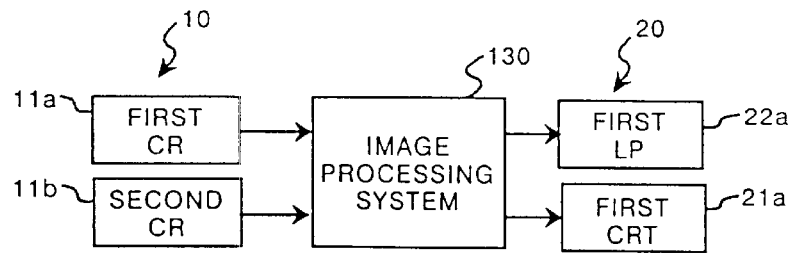
Figure 15C:
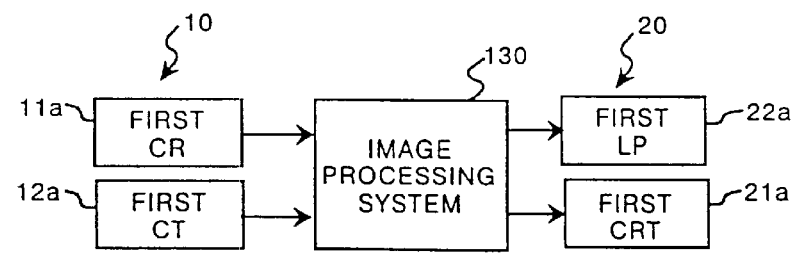
Figure 15D:
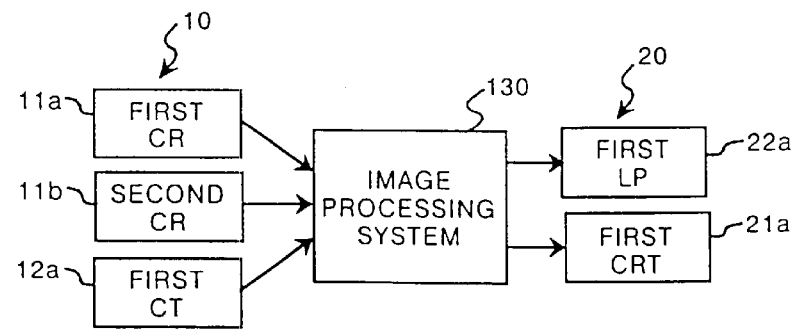

In the embodiment described above, the processing for canceling the dependence of the image information upon the output device characteristics of the image information output device is firstly carried out by the output device characteristics cancel processing means 133, and thereafter the transform processing in accordance with the standard characteristics is carried out by the standardization processing means 134. However, the third image processing system in accordance with the present invention is not limited to the aforesaid embodiment. For example, as illustrated in FIG. 12B, the standardization means 131 may calculate a difference α between the standard characteristics $MTF_{sys}$ and the output device characteristics $MTF_{out}$.

The difference a represents the amount of deterioration with respect to the target modulation transfer function (i.e., the standard characteristics $MTF_{sys}$).

Therefore, the standardization means 131 carries out Fourier transform on the image information and carries out emphasis processing in the frequency domain such that a modulation transfer function MTFα, which supplements the amount of deterioration α, may be obtained with the output device characteristics $MTF_{out}$ being taken as a reference (=1.0). The image information having been obtained from the emphasis processing is then subjected to inverse Fourier transform and thereby returned to the image domain. The image information at this stage has been compensated for the output device characteristics $MTF_{out}$ of the first CRT display device 21a to be fed with the image information and depends upon the standard characteristics $MTF_{sys}$.

Accordingly, when the standardized image information is fed into the first CRT display device 21a and reproduced as a visible image by the first CRT display device 21a, a visible image can be obtained, in which the dependence upon the characteristics $MTF_{out}$ has been canceled through the combination of the modulation transfer function $MTF_{out}$ and which depends upon the standard characteristics $MTF_{sys}$.

In this manner, with the image processing system 130, in every case where the image information is fed into one of the image information output devices 20, the image ultimately reproduced by the image information output device 20 can be viewed as the image, which does not depend upon the modulation transfer function $MTF_{out}$ of each image information output device 20 and depends upon the standard characteristics having been set uniformly for each kind of the image information output devices.

In the image processing system 130, the emphasis processing corresponding to the modulation transfer function MTFα, which supplements the amount of deterioration α with respect to the standard characteristics $MTF_{sys}$, is carried out in the frequency domain with Fourier transform. However, the third image processing system in accordance with the present invention is not limited to the aforesaid embodiment, and emphasis processing with a spatial-domain filter may also be employed.

Also, in this embodiment, the modulation transfer function is employed as the output device characteristics. Alternatively, the other characteristics concerning the image quality, such as gradation characteristics, may be employed as the output device characteristics.

Further, in this embodiment, a plurality of kinds of the image information output devices and a plurality of kinds of the image input modalities are connected to the image processing system through the network. However, the third image processing system in accordance with the present invention is not limited to the aforesaid embodiment. For example, as illustrated in FIGS. 13A, 13B, 13C, and 13D, at least two image information output devices (e.g., the first LP 22a and the second LP 22b), which belong to a single kind of image information output devices (in the cases illustrated, the LP's) and have different output device characteristics, and at least one image information input apparatus may be connected to the image processing system. Alternatively, as illustrated in FIGS. 14A, 14B, 14C, and 14D, a plurality of kinds of image information output devices (in the cases illustrated, the LP and the CRT display device), in which one kind of the image information output device (in the cases illustrated, the LP) includes at least two image information output devices (e.g., the first LP 22a and the second LP 22b) having different output device characteristics, and at least one image information input apparatus may be connected to the image processing system.

In cases where the third image processing system in accordance with the present invention has the functions for a file server as will be described later, it need not be connected to the image information input apparatus.

The embodiment illustrated in FIG. 11 may be modified such that the information representing standard characteristics $MTF_{sys}$ of the system, which have been set uniformly regardless of the kinds of the image information output devices 20, may be stored in the storage region of the image processing system 130. Also, the standardization means 131 may carry out the transform processing on the image information such that a difference α' between the output device characteristics $MTF_{out}$ of the image information output device to be fed with the image information and the standard characteristics $MTF_{sys}'$ of the system may be supplemented. Such a constitution constitutes an embodiment of the fourth image processing system in accordance with the present invention. The embodiment of the fourth image; processing system in accordance with the present invention can be applied to the cases where, as illustrated in FIGS. 15A, 15B, 15C, and 15D, a plurality of kinds of image information output devices (in the cases illustrated, the LP and the CRT display device) and at least one kind of image information input apparatus are connected to the image processing system, and each kind of image information output device includes only one output device. With this embodiment, the images, which are reproduced by the LP 22a and the CRT display device 21a, can be obtained as the images, which depend upon the standard characteristics $MTF_{sys}'$ of the system that have been set uniformly. Therefore, the same image processing can be carried out on the image information without a difference in image information output device to be fed with the image information and a difference in kind of the image information output device being taken into consideration. In this manner, approximately identical effects of the image processing can be obtained, and an image with image quality giving an approximately identical impression can be obtained.

Figure 16:
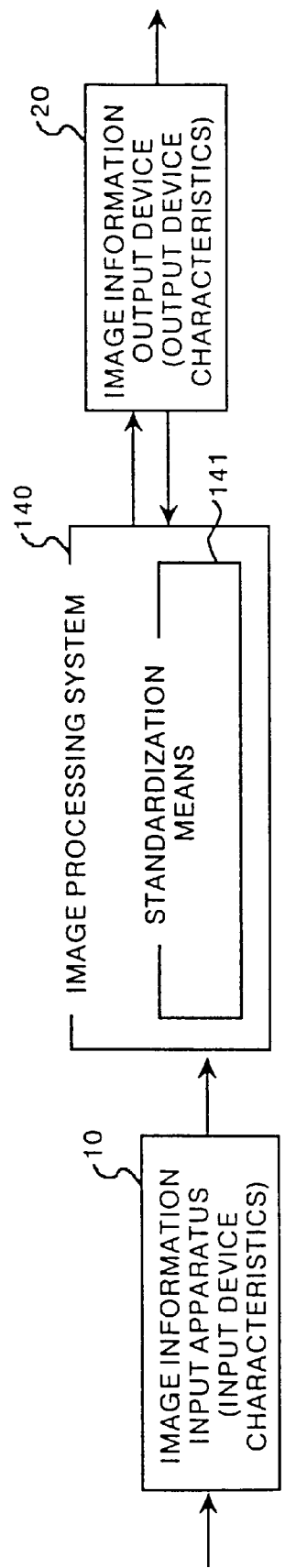
FIG. 16 is a block diagram showing an embodiment of the fifth image processing system in accordance with the present invention.

FIG. 16 is a block diagram showing an embodiment of the fifth image processing system in accordance with the present invention.

With reference to FIG. 16, an image processing system 140 is provided with a standardization means 141. The standardization means 141 carries out transform processing on image information such that, in every case where the image information has been received from one image information input apparatus, which is among the plurality of the image information input apparatuses 10, and the image information is to be fed into one image information output device, which is among the plurality of the image information output devices 20, the image information may be reproduced by the one image information output device 20 to be fed with the image information and as a standard image, which does not depend upon the input device characteristics $MTF_{in}$ of the one image information input apparatus 10 having fed the image information and the output device characteristics $MTF_{out}$ of the one image information output device 20 to be fed with the image information and depends upon standard device characteristics $MTF_{sys}$ having been set previously for the kind of the image input modality including the one image information input apparatus having fed the image information and for the kind of the one image information output device to be fed with the image information.

How the image processing system 140 operates will hereinbelow be described in detail.

As the target modulation transfer functions for the images ultimately reproduced by the image information output devices 20, information representing a plurality of sets of standard characteristics $MTF_{sys}$, each of which sets has been set previously for one combination of the kind of the image input modality and the kind of the image information output device, is stored in the storage region of the image processing system 140. The standardization means 141 receives the information, which represents the modulation transfer function $MTF_{in}$ (shown in FIG. 17A) of the image information input apparatus 10 having fed the image information into the open network 100, from the image information input apparatus 10. Also, the standardization means 141 receives the information, which represents the modulation transfer function $MTF_{out}$ (shown in FIG. 17B) of the image information output device 20 to be fed with the image information, from the image information output device 20. The standardization means 141 calculates a combined modulation transfer function $MTF_{all}$ (=$MTF_{in} \times MTF_{out}$), which is shown in FIG. 17C. Also, the standardization means 141 selects the standard characteristics $MTF_{sys}$, which specify the kind of the modality of the image information input apparatus having fed the image information and the kind of the image information output device to be fed with the image information and which is adapted to the combination of the kinds of them.

Further, as illustrated in FIG. 17C, the standardization means 141 calculates a difference a between the selected standard characteristics $MTF_{sys}$ and the combined modulation transfer function $MTF_{all}$.

The difference α represents the amount of deterioration with respect to the target modulation transfer function (i.e., the standard characteristics $MTF_{sys}$).

Therefore, the standardization means 141 carries out Fourier transform on the image information having been fed from the image information input apparatus 10 into the open network 100. Also, as illustrated in FIG. 17D, the standardization means 141 carries out emphasis processing in the frequency domain such that a modulation transfer function MTFα, which supplements the amount of deterioration α, may be obtained with the combined modulation transfer function $MTF_{all}$ being taken as a reference (=1.0). The image information having been obtained from the emphasis processing is then subjected to inverse Fourier transform and thereby returned to the image domain. The image information at this stage has been compensated for the modulation transfer function $MTF_{in}$ of the image information input apparatus 10 and the modulation transfer function $MTF_{out}$ of the image information output device 20 to be fed with the image information.

Accordingly, when the image information is fed into the image information output device 20 and reproduced as a visible image by the image information output device 20, a visible image can be obtained, in which the modulation transfer function $MTF_{out}$ has been combined and which depends upon the standard characteristics $MTF_{sys}$.

Figure 20A:
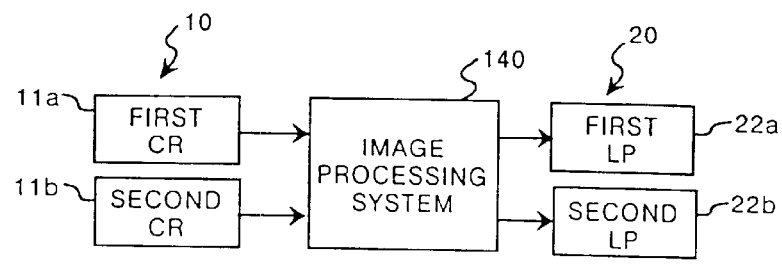
FIGS. 20A and 20B are block diagrams showing different embodiments of the fifth image processing system in accordance with the present invention.

In this manner, with the image processing system 140, in every case where the image information has been received from one of the image information input apparatuses 10 in the open network 100 and is fed into one of the image information output devices 20, an image can be reproduced ultimately by the image information output device 20 fed with the image information, which image does not depend upon the modulation transfer function $MTF_{in}$ of the image information input apparatus 10 having fed the image information and the modulation transfer function $MTF_{out}$ of the image information output device 20 and depends upon the standard characteristics having been set in accordance with the combination of the kind of the image input modality having fed the image information and the kind of the image information output device fed with the image information. Therefore, the image quality of the images reproduced by the image information output devices 20 can be determined uniquely under the uniform criterion. As a result, in particular, the efficiency and accuracy of diagnosis of an illness can be prevented from becoming low. Accordingly, for example, in the constitution illustrated in FIG. 20A, in every case where the image information, which has been received from one of the CR apparatuses 11a and 11b, is fed into one of the LP's 22a and 22b, the image ultimately reproduced by the LP 22a or the LP 22b has the image quality having been set under the uniform criterion.

Figure 18:
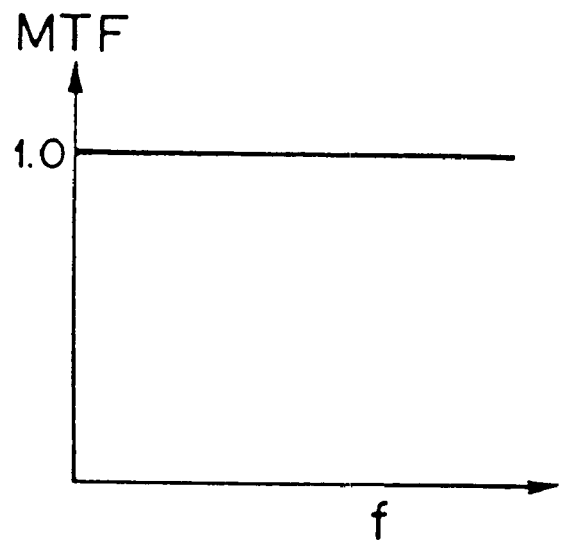
FIG. 18 is a graph showing a response function $MTF_{in}=1.0$ (constant)

In cases where the input device characteristics are not clear or the dependence upon the input device characteristics is allowed, with respect to the input device characteristics, for example, the response function may be set such that $MTF_{in}$=1.0 (constant) as illustrated in FIG. 18. Also, the gradation characteristics may be set such that $\gamma_{in}$=1.0 (constant) (such setting means, for example, transform processing with a look-up table, in which the correspondence relationship between the output and the input is set such that the output may be equal to the input).

In the image processing system 140, the emphasis processing corresponding to the modulation transfer function MTFα, which supplements the amount of deterioration α with respect to the standard characteristics $MTF_{sys}$, is carried out in the frequency domain with Fourier transform. However, the fifth image processing system in accordance with the present invention is not limited to the aforesaid embodiment, and emphasis processing with a spatial-domain filter may also be employed.

Figure 19:
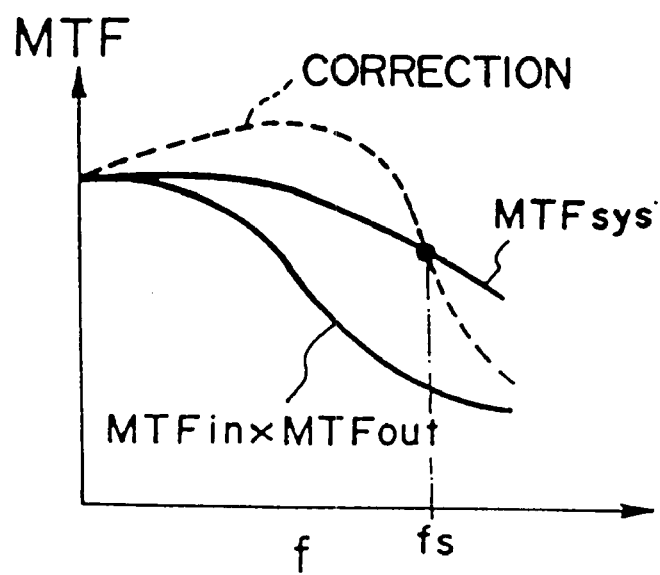
FIG. 19 is a graph showing a frequency band, which is employed for frequency emphasis processing with a spatial-domain filter.

However, with the emphasis processing using the spatial-domain filter, it is substantially impossible to carry out an appropriate correction in every frequency band in every case. Therefore, for example, in cases where the image information output device is a CRT display device, a spatial-domain filter should preferably be selected by considering the visual characteristics of the visible image displayed on the display device. Specifically, as in, for example, a spatial-domain filter having the modulation transfer function indicated by the broken line in FIG. 19, a spatial-domain filter should preferably be set such that the standard characteristics $MTF_{sys}$ may be obtained with respect to a frequency band (in FIG. 19, a frequency fs), which is associated with the highest visual response under ordinary image viewing conditions (e.g., a viewing position spaced 50 cm apart from the displayed image). An example of the frequency emphasis processing with the spatial-domain filter will be described hereinbelow.

In cases where the frequency band for correction, which is set in accordance with the visual characteristics, is 1.0 cycle/mm and the resolution of the image information output device is 0.23 mm/pixel, it can be found from a calculation that, as for the image information output device, frequency fs=0.23 mm/pixel at the frequency band fs.

By way of example, $MTF_{sys}$ at the frequency fs may be 0.9, $MTF_{in}$ may be 1.0 (in cases where a correction in accordance with the image information input apparatus is not made), and $MTF_{out}$ may be 0.45. Also, the spatial-domain filter may be a filter having a size of three picture elements×three picture elements and having filter factors (1, 2, 1). Further, filter characteristics Sus of the spatial-domain filter at the frequency fs may be 0.6, and high-pass characteristics (Sorg-Sus) may be 0.4. In such cases, the formulas shown below obtain.

$\alpha = MTF_{sys}/MTF_{out} = 2.0$ $\alpha' = (\alpha-1)/\text{high-pass characteristics} = 2.5$ $S \text{ correction} = \text{Sorg} + \alpha' \times (\text{Sorg-Sus})$ in which $\text{Sorg} = MTF_{in}$ The aforesaid difference α can be calculated with the formula shown below.

$\alpha = S \text{ correction} = 2.0$

Therefore, the formula shown below obtains.

$MTF_{out} \times \alpha = 0.9 \ (= MTF_{sys})$

Accordingly, ultimately, the image depending upon the standard characteristics $MTF_{sys}$ can be reproduced by the image information output device.

The image processing system may be provided with a reference table or a transform table, which represents the filter factors that define the spatial-domain filter. Alternatively, in cases where the dependence upon the input device characteristics of the image information input apparatus is not compensated for, the image information output device may be provided with the table. In such cases, when a request for the output of the image information is made from the image information output device, the information representing the filter factors may be fed into the standardization means 141.

The modulation transfer function $MTF_{in}$ and the modulation transfer function $MTF_{out}$, which are fed into the standardization means 141, may be transmitted in the form of the functions. Alternatively, data, which represents the correspondence relationship between the frequency (cycle/pixel) and the response, and information, which represents the resolution [dot(pixel)/inch, pixel/mm, or a pixel size], may be transmitted.

Figure 7:
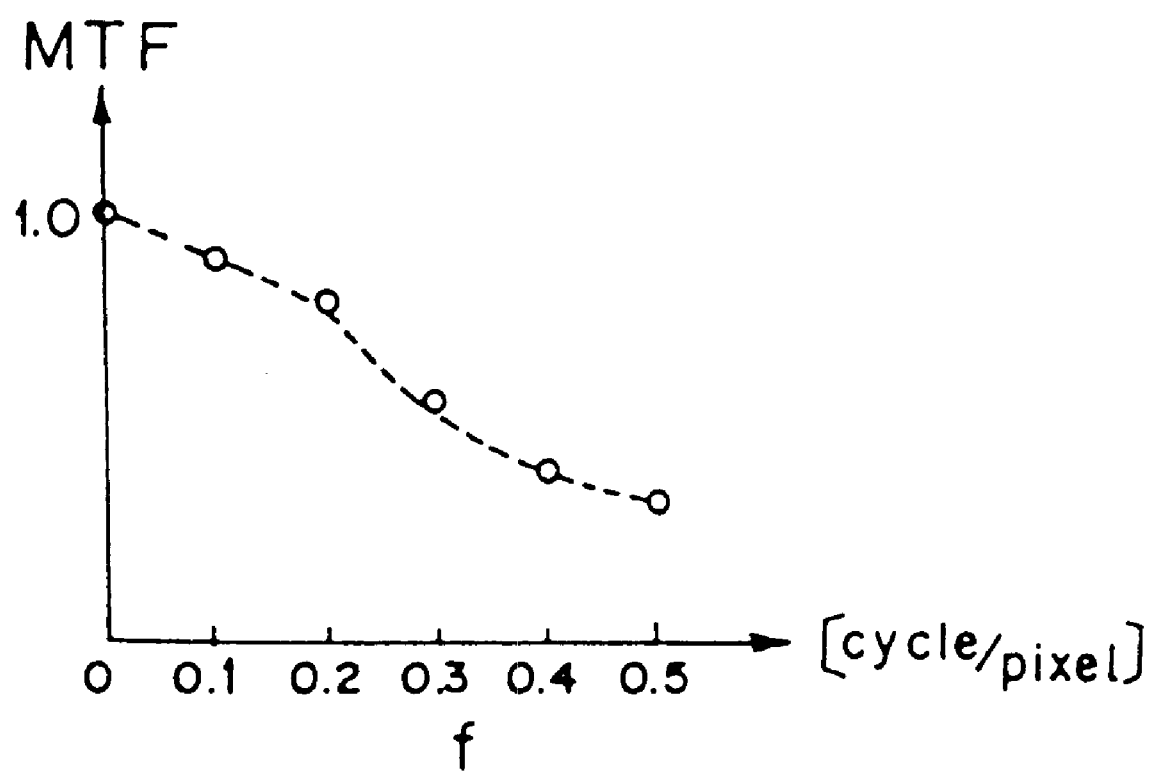
FIG. 7 is an explanatory graph showing how a modulation transfer function is obtained from data having been obtained discretely.
Figure 8A:
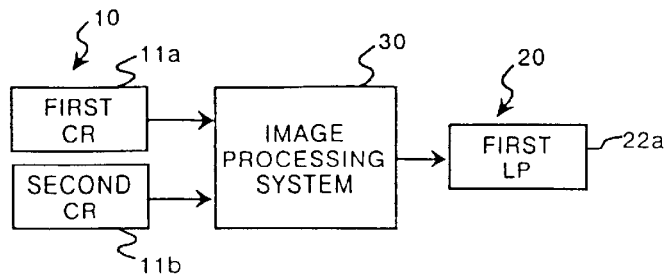
FIGS. 8A, 8B, 8C, and 8D are block diagrams showing different embodiments of the first image processing system in accordance with the present invention.
Figure 8B:
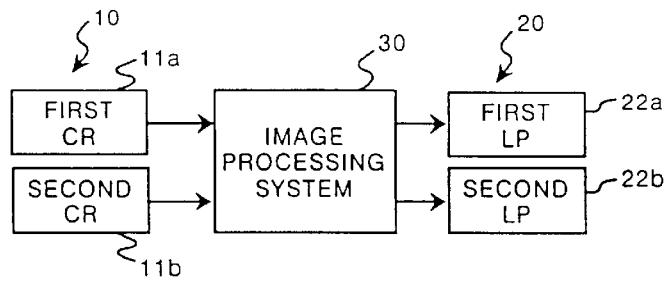
Figure 8C:
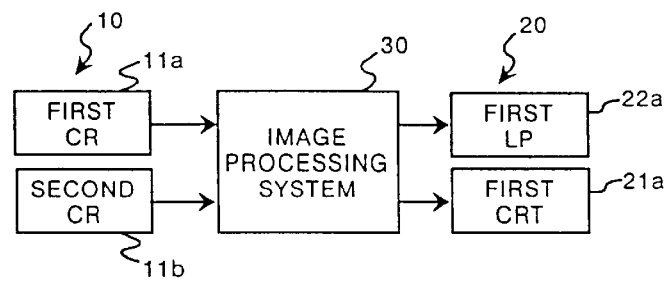
Figure 8D:
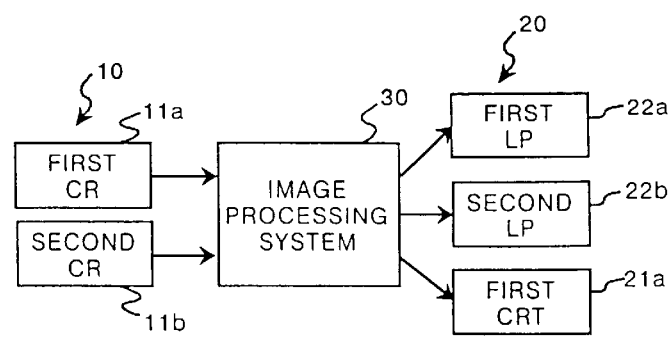
Figure 9A:
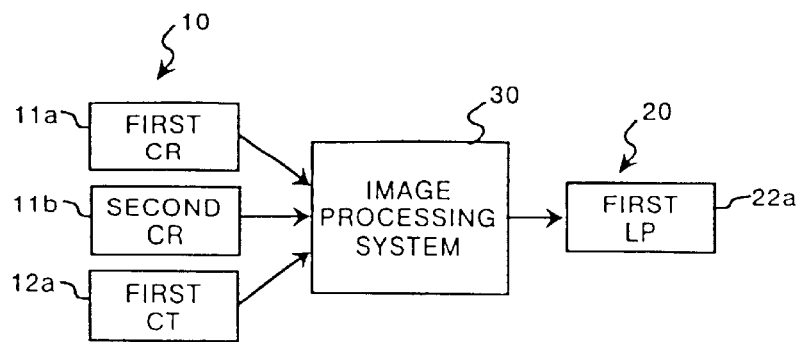
FIGS. 9A, 9B, 9C, and 9D are block diagrams showing further different embodiments of the first image processing system in accordance with the present invention.
Figure 9B:
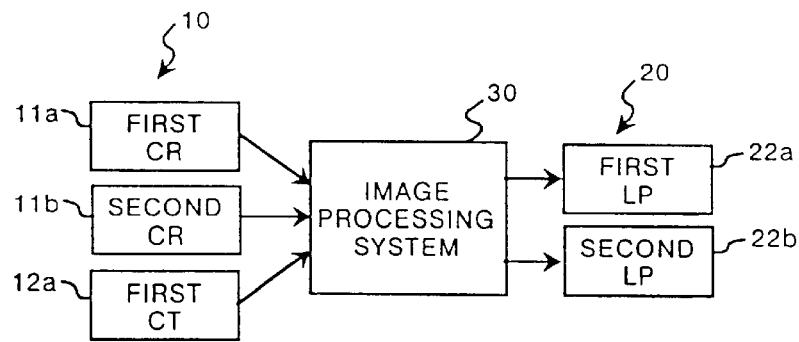
Figure 9C:
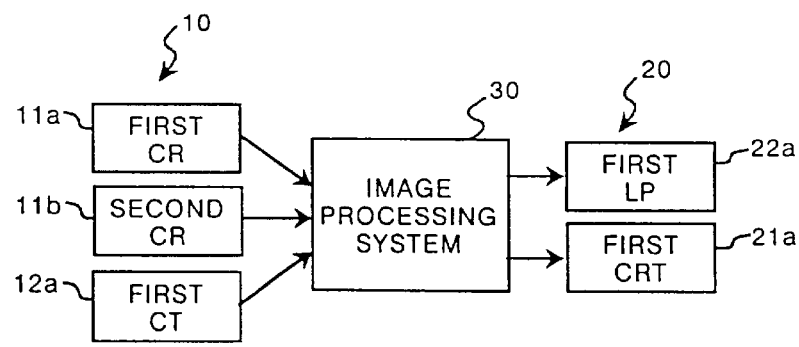
Figure 9D:
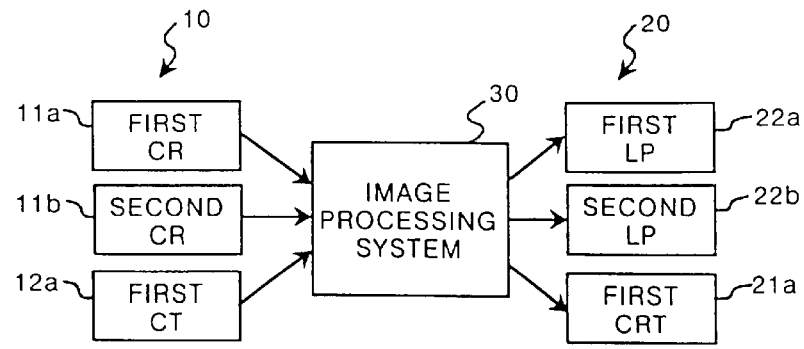

In cases where discrete data is to be transmitted, data with respect to a frequency other than the correspondence data may be calculated by carrying out an interpolating operation on the data points, which are present as the discrete data, and with an equation of the first order or a higher order as indicated by the broken line in FIG. 7. In cases where the function form is transmitted, for example, approximation may be made with a Gaussian function [$MTF = \exp(-aS)^2$, wherein S represents the frequency, and a represents the parameter representing the width of the Gaussian function], and the parameter a of the function may be transmitted.

In this embodiment, the modulation transfer functions are employed as the input device characteristics of the image information input apparatus and the output device characteristics of the image information output device. Alternatively, for example, the gradation characteristics may be employed as the input and output device characteristics.

Specifically, in the cases of the image information input apparatuses, as for the CR apparatuses 11, the correspondence relationship between the logarithmic value of the radiation dose and the image information (the detected image signal) corresponds to the gradation characteristics. As for the CT scanners 12, the correspondence relationship between the CT values and the image information (the detected image signal) corresponds to the gradation characteristics. As for the MRI apparatus 13, the correspondence relationship between the T1 emphasized image, the T2 emphasized image, or the hydrogen density image and the image information (the detected image signal) corresponds to the gradation characteristics.

In the cases of the image information output devices, as for the CRT display devices 21, the correspondence relationship between the image information (the given image signal) and the displayed luminance corresponds to the gradation characteristics. As for the LP's 22, the correspondence relationship between the image information (the given image signal) and the output image density c;corresponds to the gradation characteristics. As the gradation characteristics of the image information input apparatuses, $\gamma_{in}$ may be employed. As the gradation characteristics of the image information output devices, $\gamma_{out}$ may be employed.

In cases where the standard characteristics are represented by $\gamma_{sys}$, $\gamma\alpha$ satisfying the condition shown below may be calculated.

$\gamma_{in} \times \gamma_{out} \times \gamma\alpha = \gamma_{sys}$

Transform processing with $\gamma\alpha$ may be carried out on the image information having been fed into the open network 100, and the image information having been obtained from the transform processing may be fed into the image information output device.

Therefore, as in the cases of the modulation transfer function, the image processing system may set the target standard gradation characteristics for the entire system. Also, the standardization means may carry out the signal transform processing on the image information, which has been received from the image information input apparatus, such that the gradation characteristics of the image, which is ultimately reproduced by the image information output device, may depend upon the standard gradation characteristics. The image information, which has been obtained from the transform processing, may be fed into the image information output device.

Figure 20B:
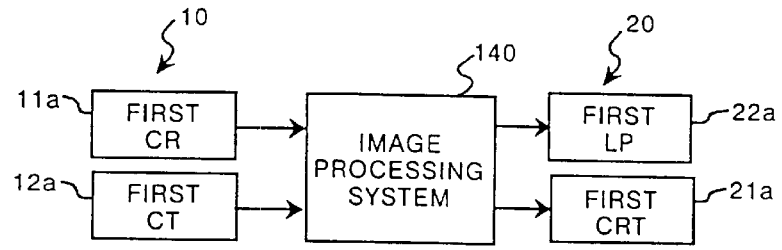

The embodiment illustrated in FIG. 16 may be modified such that the information representing standard characteristics MTF$_{sys}$' of the system, which have been set uniformly regardless of the kinds of the image information input apparatuses 10 and the kinds of the image information output devices 20, may be stored in the storage region of the image processing system 140. Also, the standardization means 141 may carry out the transform processing on the image information such that a difference α' between the modulation transfer function MTF$_{all}$, which is obtained by combining the input device characteristics MTF$_{in}$ of the image information input apparatus having fed the image information and the output device characteristics MTF$_{out}$ of the image information output device to be fed with the image information, and the standard characteristics MTF$_{sys}$' of the system may be supplemented. Such a constitution constitutes an embodiment of the sixth image processing system in accordance with the present invention. The embodiment of the sixth image processing system in accordance with the present invention can be applied to the cases where, as illustrated in FIG. 20B, a plurality of kinds of image information input apparatuses and a plurality of kinds of image information output devices are connected to the image processing system, each kind of image information input apparatus includes only one input apparatus, and each kind of image information output device includes only one output device. With this embodiment, for example, the image, which is reproduced by the CRT display device 21a from the image information having been received from the CR apparatus 11a, and the image, which is reproduced by the LP 22a from the image information having been received from the CT, scanner 12a, can be obtained as the images, which depend upon the standard characteristics MTF$_{sys}$' of the system that have been set uniformly. Therefore, the same image processing can be carried out on the image information without a difference in image input modality having fed the image information and a difference in image information output device to be fed with the image information being taken into consideration. In this manner, approximately identical effects of the image processing can be obtained, and an image with image quality giving an approximately identical impression can be obtained.

Figure 21A:
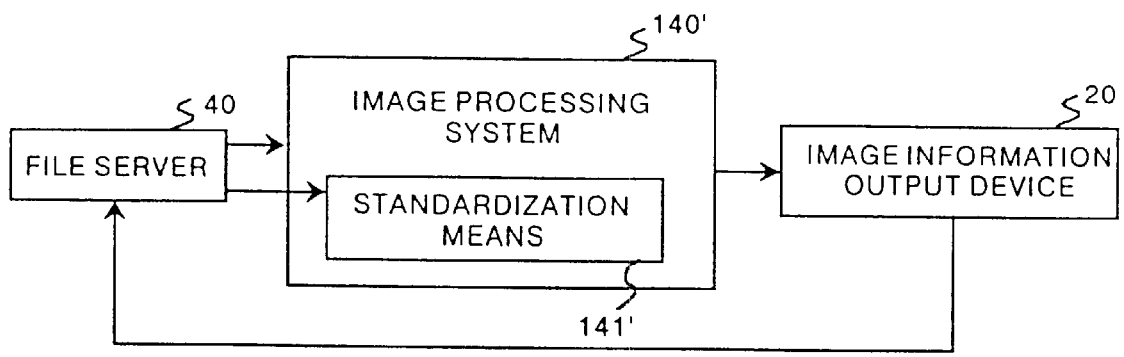
FIGS. 21A and 21B are block diagrams showing a further different embodiment of the fifth image processing system in accordance with the present invention.
Figure 21B:
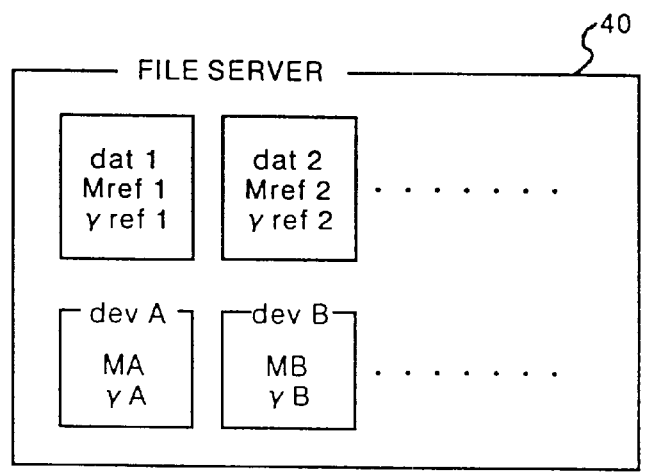

FIGS. 21A and 21B are block diagrams showing a further different embodiment of the fifth image processing system in accordance with the present invention. As in the cases of the image processing system 130 shown in FIG. 11, an image processing system 140' illustrated in FIG. 21A is connected to the open network 100 shown in FIG. 1. As illustrated in FIG. 21A, the image processing system 140' receives the image information from a file server 40, which constitutes a form of the image information input apparatuses 10 and files a plurality of pieces of image information having been fed into the open network 100.

For each of the pieces of image information (dat1, dat2, . . . ) having been received from the image information input apparatuses 10, the file server 40 stores the image information dat, information representing standard characteristics M$_{ref}$ as the target modulation transfer function for a visible image, which is reproduced by one of the image information output devices 20 from the image information dat, and information representing a gamma value γ$_{ref}$ as the target gradation characteristics. Also, in the file server 40, modulation transfer functions M$_A$, M$_B$, . . . and gradation characteristics γ$_A$, γ$_B$ . . . of the image information output devices 20 are filed for the respective image information output devices 20.

As in the aforesaid image processing system 140 provided with the standardization means 141, the image processing system 140' is provided with a standardization means 141'.

The standardization means 141' carries out correction processing on the filed image information dat (shown in FIG. 21B) and in accordance with the output device characteristics of the image information output device to be fed with the image information and the standard characteristics such that, in every case where one piece of image information dat, which is among the pieces of image information dat filed in the file server 40, is to be fed into one image information output device, which is among the image information output devices 20, an image may be reproduced by the one image information output device, which image does not depend upon the output device characteristics (modulation transfer function M$_A$, M$_B$, . . . and gradation characteristics γ$_A$, γ$_B$, . . . ) of the one image information output device fed with the image information and depends upon the target standard characteristics having been set previously, e.g. standard characteristics M$_{ref1}$ and/or γ$_{ref1}$.

Specifically, when a request for the output of predetermined image information, which is among the pieces of image information having been filed, is made from one image information output device 20 to the file server 40, a signal, which specifies the image information output device (devA, devB, . . . ) that makes the request for the output, is, fed into the file server 40 together with the request for the output. The file server 40 specifies the image information output device, which has made the request, in accordance with the signal. Also, in cases where the specified output device is, for example, devB, the file server 40 retrieves the output device characteristics (the modulation transfer function M$_B$, the gradation characteristics γ$_B$) of the specified output device from the filing data.

Further, the file server 40 retrieves the requested image information (e.g., dat1), reads the image information dat1 and the standard characteristics M$_{ref1}$, γ$_{ref1}$, and feeds them into the standardization means 141'.

The standardization means 141' carries out transform processing on the received image information in accordance with the same transform processing technique as that in the aforesaid standardization means 141 such that, when a visible image is reproduced from the requested image information by the image in formation output device 20 having made the request, the visible image may be reproduced in accordance with the standard characteristics M$_{ref1}$ and γ$_{ref1}$.

In cases where the input device characteristics are not clear or the dependence upon the input device characteristics is allowed, with respect to the modulation transfer function, it may be set such that MTF$_{in}$=1.0 (constant) as illustrated in FIG. 18 (such setting means, for example, transform processing with a look-up table, in which the correspondence relationship between the output and the input is set such that the output may be equal to the input) Also, the gradation characteristics may be set such that γ$_{in}$=1.0 (constant) in the formula γ$_{in}$×γ$_{out}$×γα=γ$_{sys}$ described above for the aforesaid embodiment (such setting means, for example, transform processing with a look-up table, in which the correspondence relationship between the output and the input is set such that the output may be equal to the input). In this manner, the same correction processing as in the aforesaid standardization means 141 may be carried out.

As described above, with the embodiment of the image processing system shown in FIG. 21A, in every case where one piece of image information, which is among the pieces of image information having been filed in the network, is fed into one of the image information output devices, a reproduced image can be obtained, which does not depend upon the output device characteristics of the one image information output device. The image quality of the reproduced image does not vary for different image information output devices. Therefore, in particular, the efficiency and accuracy of diagnosis of an illness can be prevented from becoming low.

In this embodiment, the file server is provided as the one separate from the image processing system. Alternatively, the file server may constitute part of the image processing system.

Also, in this embodiment, both of the modulation transfer function and the gradation characteristics are employed as the input and output device characteristics. Alternatively, at least either one of the modulation transfer function and the gradation characteristics may be employed as the input and output device characteristics.

In the embodiments described above with reference to FIGS. 11 through FIGS. 21A, 21B, the information representing the input device characteristics of the image information input apparatuses and the information representing the output device characteristics of the image information output devices may be stored previously in the storage region, or the like, of the image processing system. Alternatively, the information representing the input device characteristics of each image information input apparatus may be fed into the image processing system together with the image information. Also, the information representing the output device characteristics of each image information output device may be fed into the image processing system together with the request for the output of the image information.

As for the standard characteristics which are set previously, information representing fixed values may be stored in the image processing system or the file server. Alternatively, the information representing the standard characteristics may be fed from the image processing system or the image information output devices such that the standard characteristics may be altered.

An embodiment of the seventh image processing system in accordance with the present invention will be described hereinbelow.

Figure 23:
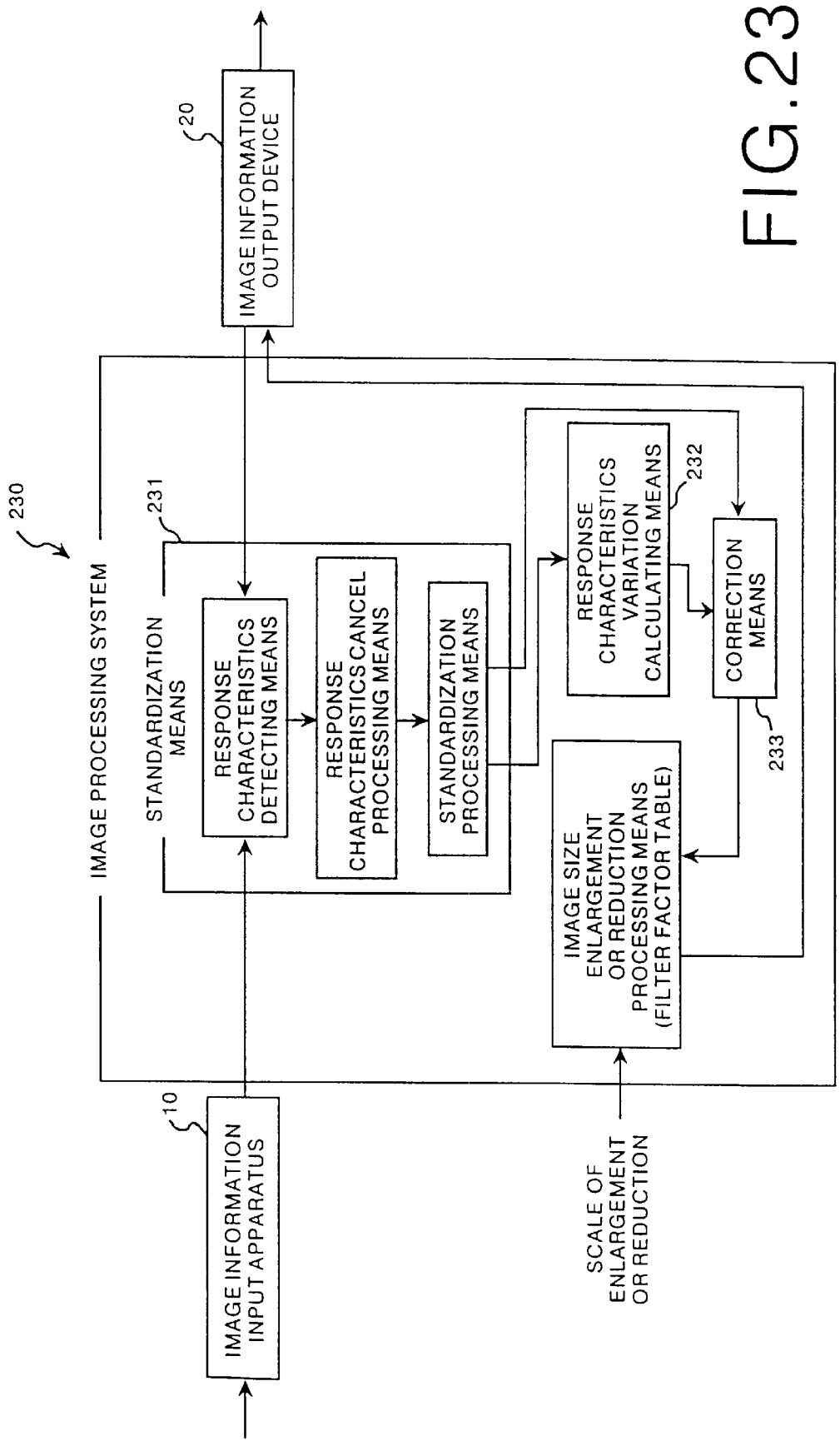
FIG. 23 is a block diagram showing an embodiment of the seventh image processing system in accordance with the present invention.

FIG. 23 is a block diagram showing an embodiment of the seventh image processing system in accordance with the present invention. An image processing system 230, which is an embodiment of the seventh image processing system in accordance with the present invention, is provided with a standardization means 231, a response characteristics variation calculating means 232, and a correction means 233. In cases where the image information, which has been fed from one of the image information input apparatuses 10 into the open network 100, is to be fed into a specified image information output device, which is among the image information output devices 20, the standardization means 231 carries out transform processing on the image information and in accordance with the modulation transfer function (the response characteristics) $MTF_{out}$ of the image information output device 20, into which the image information is to be fed, and standard characteristics $MTF_{sys}$ of the system. The transform processing is carried out such that the image information may be reproduced by the image information output device 20 as an image, which does not depend upon the modulation transfer function $MTF_{out}$ of the image information output device 20 to be fed with the image information and depends upon the standard characteristics $MTF_{sys}$ of the system that have been set uniformly for each kind of the image information output device to be fed with the image information. The response characteristics variation calculating means 232 calculates a variation component $\Delta M$ of a reproduced image from the standard characteristics $MTF_{sys}$ in cases where the image reproduced by the image information output device 20 is subjected to image size enlargement processing with a desired scale of enlargement or image size reduction processing with a desired scale of reduction. The correction means 233 carries out frequency emphasis processing on the image information such that the variation component $\Delta M$ may be compensated for.

With respect to the modulation transfer function (response characteristics) as the output device characteristics, the standardization means 231 operates in the same manner as that described above with reference to FIGS. 12A and 12B for the standardization means 131 shown in FIG. 11. A response characteristics detecting means, which is a constitution element of the standardization means 231, corresponds to the output device characteristics detecting means 132 of the standardization means 131. A response characteristics cancel processing means, which is a constitution element of the standardization means 231, corresponds to the output device characteristics cancel processing means 133 of the standardization means 131. Also, a standardization processing means, which is a constitution element of the standardization means 231, corresponds to the standardization processing means 134 of the standardization means 131.

How the response characteristics variation calculating means 232 operates will hereinbelow be described in detail. In this embodiment, the image processing system 230 itself is provided with an image size enlargement or reduction processing means for carrying out the image size enlargement or reduction processing and the interpolation processing, which accompanies the image size enlargement or reduction processing, on the image information.

Information representing the desired scale of enlargement or reduction with respect to the image, which is to be reproduced by the image information output device 20 fed with the image information, is fed directly into the image size enlargement or reduction processing means of the image processing system 230 or is fed from the image information output device 20. The image size enlargement or reduction processing means of the image processing system 230 is provided with a filter factor table, in which the information representing the filter factors for the interpolation processing in accordance with the scale of enlargement or reduction has been stored previously. The information, which represents the filter factors for the interpolation processing in accordance with a specified scale of enlargement, is fed into the response characteristics variation calculating means 232. In accordance with the received filter factors, the response characteristics variation calculating means 232 calculates response characteristics MTF', which occur in cases where the image information depending upon the standard characteristics $MTF_{sys}$ is subjected to the image size enlargement processing with the scale of enlargement. The interpolation processing may be carried out with one of various interpolating operation techniques, such as a first-order interpolating operation, a second-order Lagrangean interpolating operation, a third-order B spline interpolating operation, a third-order cubic spline interpolating operation, and a spline interpolating operation which enables adjustment of sharpness. The interpolation processing should preferably be carried out with an interpolating operation technique (i.e., a spline interpolating operation technique enabling adjustment of sharpness), which combines an interpolating operation process that yields a comparative high level of sharpness, such as a third-order cubic spline interpolating operation, and an interpolating operation process that yields a comparative low level of sharpness, such as a third-order B spline interpolating operation.

Figure 24A:
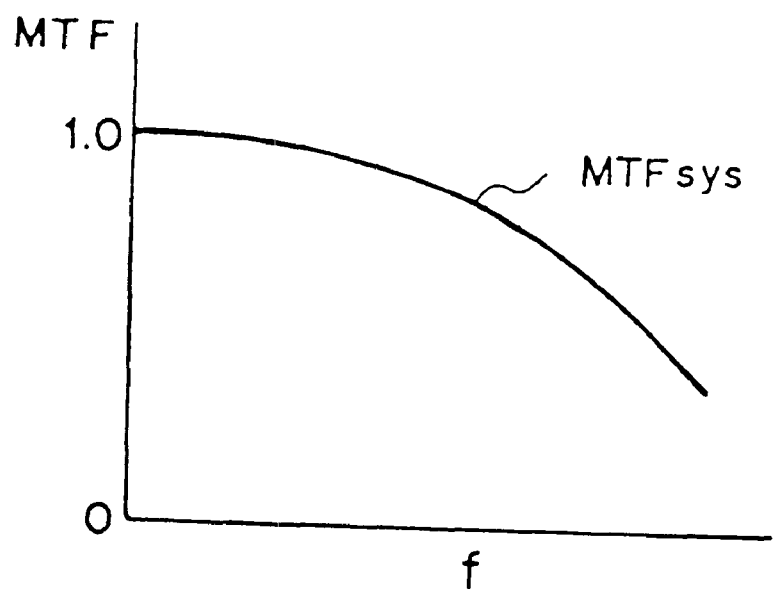
FIGS. 24A and 24B are explanatory graphs showing how variation in response characteristics, which occurs due to image size enlargement or reduction processing carried out on image information having been transformed into image information depending upon standard characteristics, is compensated for, FIG. 25 is a block diagram showing an embodiment of the seventh image processing system in accordance with the present invention, in which an image information output device is provided with an image size enlargement or reduction processing means.
Figure 24B:
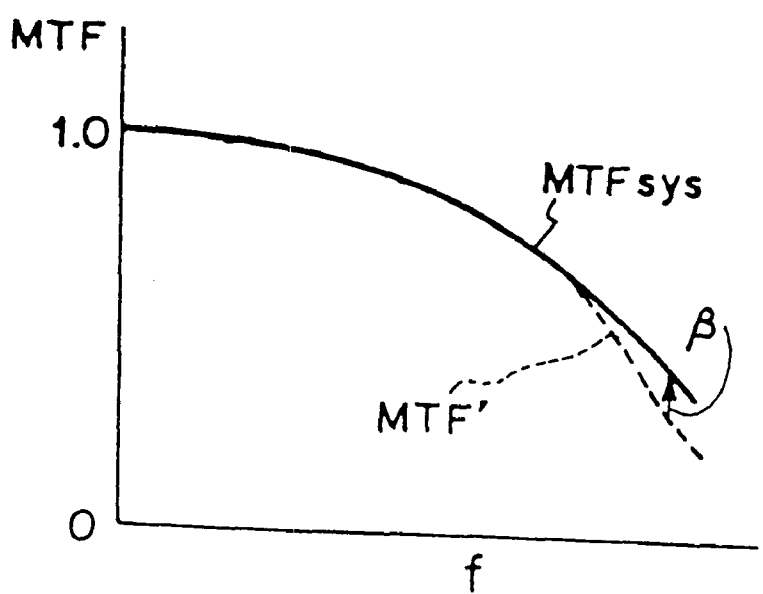

Ordinarily, as illustrated in FIG. 24B, the response characteristics MTF' of the image information, which has been obtained from the image size enlargement processing, deteriorates from the original standard characteristics $MTF_{sys}$ shown in FIG. 24A.

The response characteristics variation calculating means 232 calculates the variation component ΔM (=β) of the response characteristics MTF' from the standard characteristics $MTF_{sys}$ and feeds the information, which represents the variation component ΔM, into the correction means 233.

In accordance with the received variation component ΔM of the response characteristics MTF', the correction means 233 carries out the frequency emphasis processing on the image information, which has been obtained from the transform processing and as the image information depending upon the standard characteristics, such that variation component ΔM may be compensated for.

In the manner described above, the image information is obtained, which has been transformed so as not to depend upon the response characteristics of the image information output device to be fed with the image information and has then been compensated previously for the variation in response due to the image size enlargement or reduction processing. The image information, which has thus been corrected previously, is subjected to the image size enlargement or reduction processing carried out by the image size enlargement or reduction processing means. The image information having been obtained from the image size enlargement or reduction processing is fed into the image information output device 20.

Therefore, with the image processing system 230, in cases where the image information to be reproduced by the image information output device is subjected to the image size enlargement or reduction processing carried out with a scale of enlargement or reduction desired by the user, a visible image can be obtained such that it may be of the standard characteristics, which do not depend upon the response characteristics of the image information output device and are approximately identical with the response characteristics obtained when no image size enlargement or reduction processing is carried out.

Figure 25:
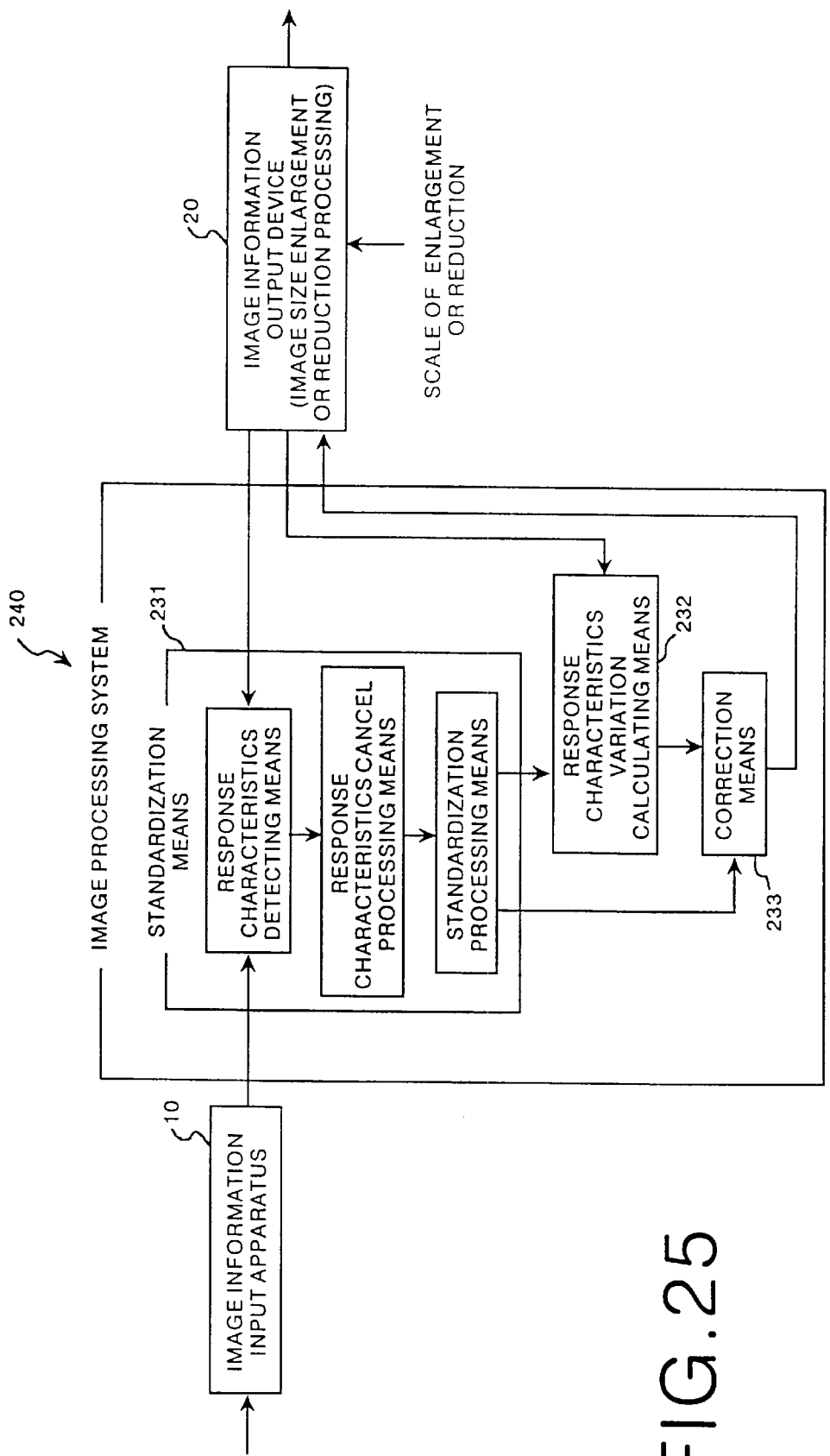

In the embodiment described above, the image processing system is provided with the image size enlargement or reduction processing means. However, the seventh image processing system in accordance with the present invention is not limited to the aforesaid embodiment. For example, as in an image processing system 240 illustrated in FIG. 25, the image information output device 20, may be provided with the image size enlargement or reduction processing means. In cases where the seventh image processing system in accordance with the present invention is constituted in the manner shown in FIG. 25, the response characteristics variation calculating means 232 may receive the information, which represents the filter factors that define the details of the interpolation processing, from the image information output device 20.

Figure 26:
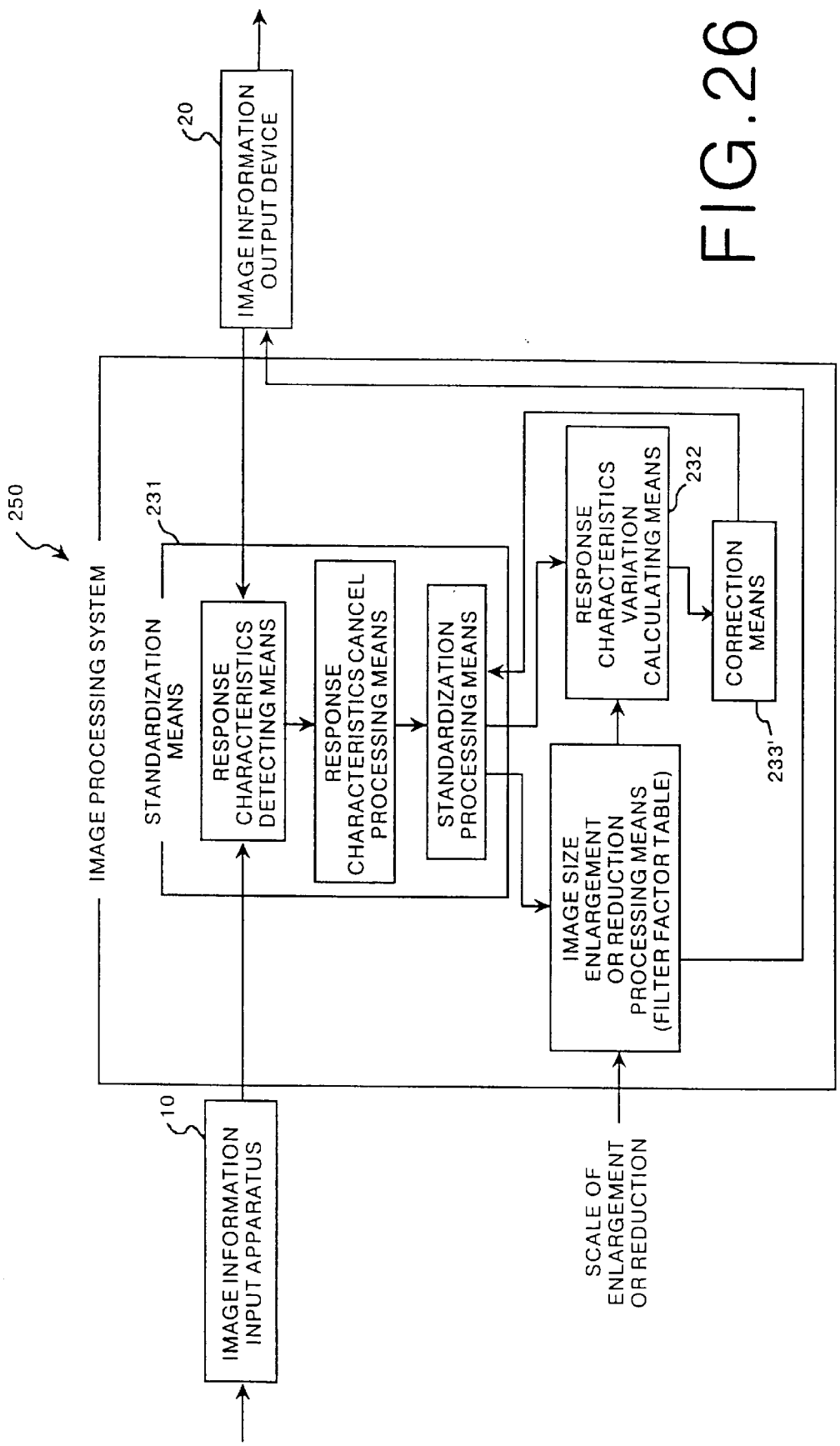
FIG. 26 is a block diagram showing an embodiment of the eighth image processing system in accordance with the present invention.

In the aforesaid embodiments of the seventh image processing system in accordance with the present invention, the correct ion means 233 carries out the frequency emphasis processing on the image information depending upon the standard response characteristics, such that the variation component from the standard response characteristics may be compensated for. Alternatively, as in an image processing system 250 illustrated in FIG. 26, in lieu of the correction means 233, a correction means 233' may be provided. The correction means 233' corrects the parameters, which define the details of the aforesaid transform processing carried out by the standardization means 231, such that the variation component may be compensated for. With the image processing system 250 shown in FIG. 26, the same effects as those with the aforesaid embodiments can be obtained. The image processing system 250 shown in FIG. 26 constitutes an embodiment of the eighth image processing system in accordance with the present invention.

Figure 27:
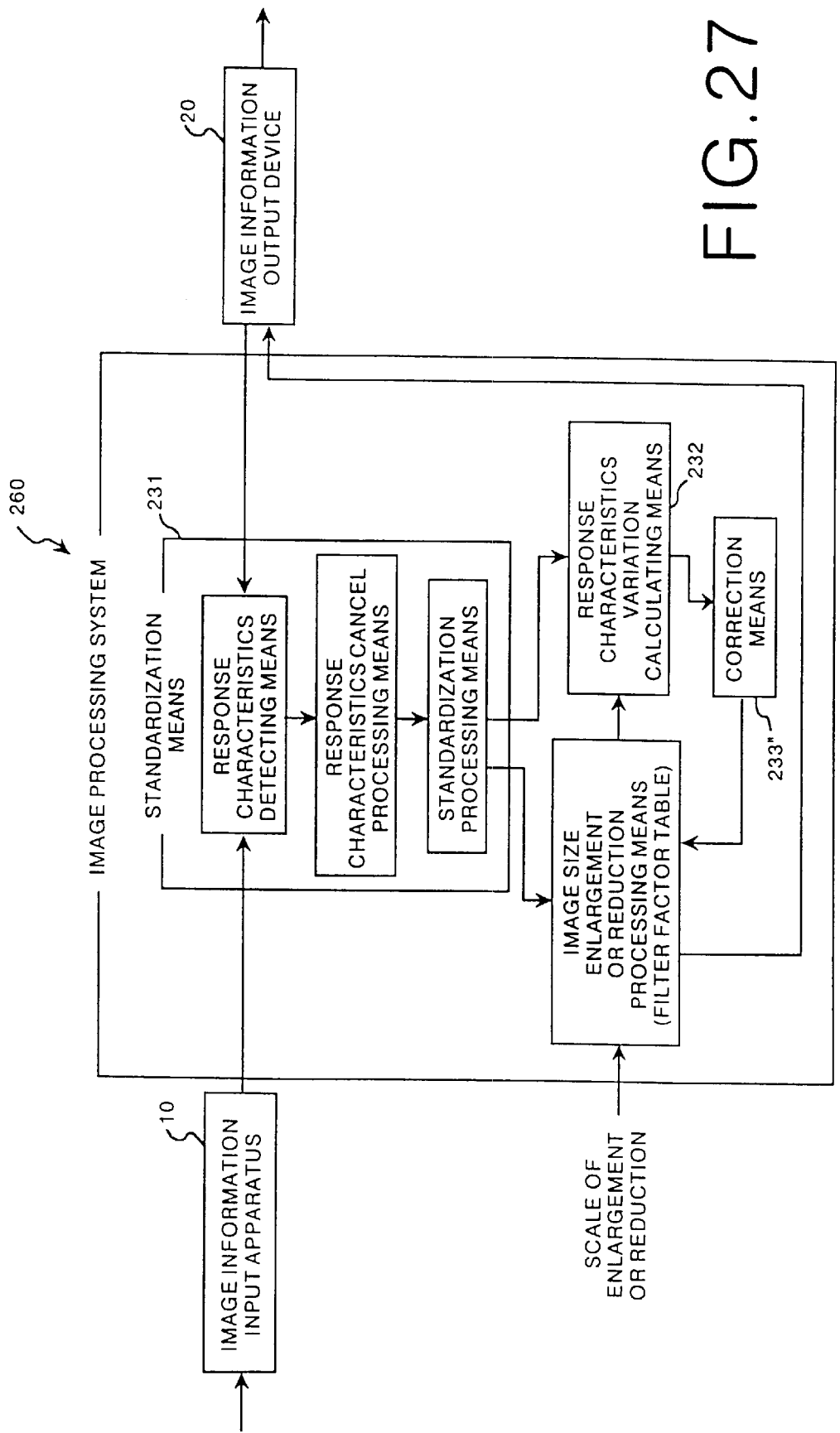
FIG. 27 is a block diagram showing an embodiment of the ninth image processing system in accordance with the present invention.

As another alternative, as in an image processing system 260 illustrated in FIG. 27, in lieu of the correction means 233 or 233', a correction means 233" may be provided. The correction means 233" corrects the filter factors, which define the details of the interpolation processing that accompanies the image size enlargement or reduction processing carried out by the image size enlargement or reduction processing means of the image processing system or of the image information output device, such that the variation component may be compensated for. With the image processing system 260 shown in FIG. 27, the same effects as those with the aforesaid embodiments can be obtained. The image processing system 260 shown in FIG. 27 constitutes an embodiment of the ninth image processing system in accordance with the present invention.

An embodiment of the tenth image processing system in accordance with the present invention will be described hereinbelow.

Figure 29A:
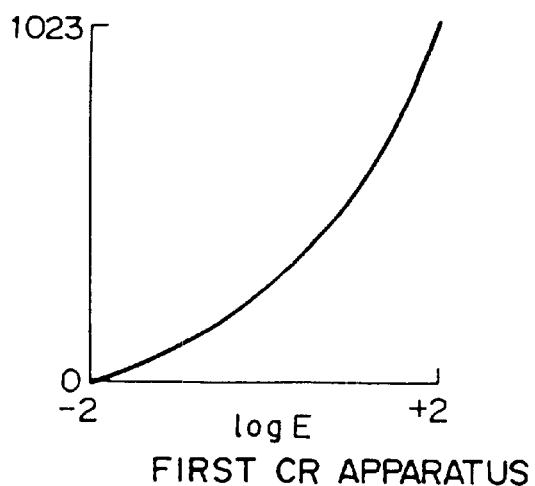
FIGS. 29A, 29B, and 29C are graphs showing gradation characteristics of a first CR apparatus, a second CR apparatus, and a third CR apparatus.
Figure 29B:
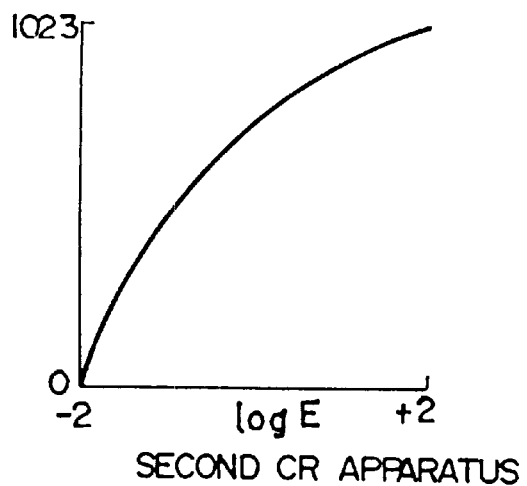
Figure 29C:
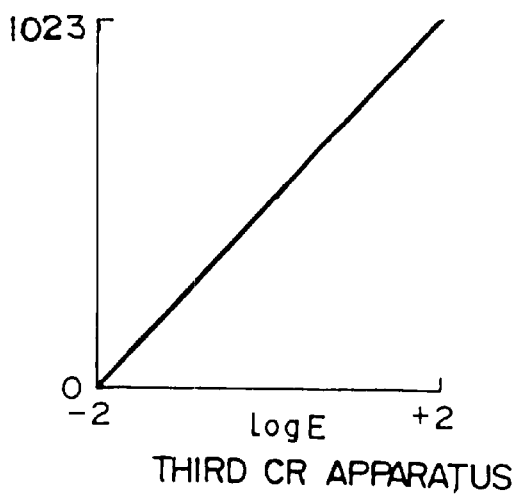

As illustrated in FIGS. 29A, 29B, and 29C, the first CR apparatus 11a, the second CR apparatus 11b, and the third. CR apparatus 11c have different gradation characteristics (one kind of the input device characteristics) due to, for example, a difference in manufacturer. The gradation characteristics shown in each of FIGS. 29A, 29B, and 29C constitute the profile information that defines the correspondence relationship between the logarithmic value logE (plotted on the horizontal axis) of the amount of emitted light, which corresponds to the radiation dose and is detected by the CR apparatus, and the digital signal values S (plotted on the vertical axis), which are obtained as the output of the CR apparatus.

Figure 28:
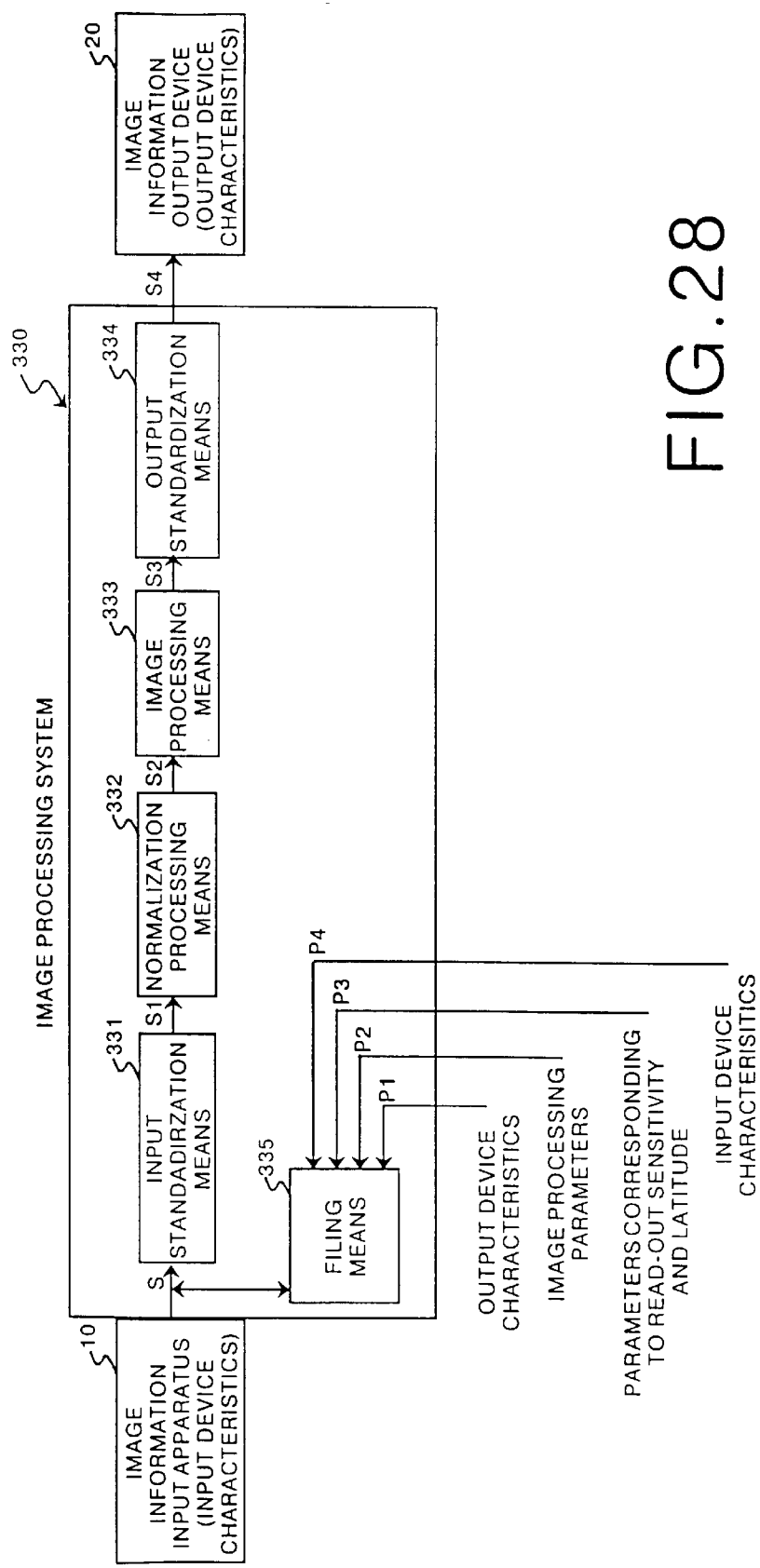
FIG. 28 is a block diagram showing an embodiment of the tenth image processing system in accordance with the present invention.

FIG. 28 is a block diagram showing an embodiment of the tenth image processing system in accordance with the present invention. An image processing system 330 illustrated in FIG. 28 comprises an input standardization means 331, a normalization processing means 332, an image processing means 333, an output standardization means 334, and a filing means 335. The input standardization means 331 carries out transform processing on image information such that, in every case where the image information has been received from one image information input apparatus 10 (e.g., one of the CR apparatuses 11a, 11b, and 11c), which is among the connected image information input apparatuses, the received image information may be transformed into standard image information, which does not depend upon the gradation characteristics of the CR apparatus having fed the image information and depends upon standard gradation characteristics having been set previously. The normalization processing means 332 carries out normalization processing for normalizing and extracting image information, which is contained in the standard image information and corresponds to a desired image portion to be used. The image processing means 333 carries out desired image processing, such as frequency processing or gradation processing, on the normalized image information. The output standardization means 334 carries out transform processing on the image information, which has been obtained from the image processing, such that, in every case where the image information, which has been obtained from the image processing, is to be fed into and reproduced as a visible image by one image information output device 20, which is among the connected image information output devices, the visible image may be reproduced by the one image information output device 20 to be fed with the image information and as an image, which does not depend upon the modulation transfer function of the one image information output device 20 to be fed with the image information and depends upon a standard modulation transfer function having been set previously. The filing means 335 appends (i.e., files) pieces of profile information to the image information S, which is fed into the input standardization means 331. The pieces of profile information comprises first profile information P1, which is necessary for defining details of the transform processing carried out by the output standardization means 334, second profile information P2, which is necessary for defining details of the image processing carried out by the image processing means 333, third profile information P3, which is necessary for defining details of the normalization processing carried out by the normalization processing means 332, and fourth profile information P4, which is necessary for defining details of the transform processing carried out by the input standardization means 331.

Specifically, the first profile information P1 may be the information (the output device characteristics) representing the modulation transfer function $MTF_{out}$ (shown in FIG. 12A) of the image information output device 20 (e.g., the first CRT display device 21a), into which the image information is to be fed. In this example, the first profile information P1 is fed from the first CRT display device 21a into the filing means 335.

The second profile information P2 may be, for example, the information representing image processing parameters, such as the gradation, the resolution, or the image size, which the visible image represented by the image information subjected to the processing should have. The second profile information P2 is fed by the operator, or the like, into the filing means 335.

The third profile information P3 may be, for example, the information representing index values (e.g., parameters corresponding to the read-out sensitivity and the latitude), which determine the range of the image information to be extracted. The third profile information P3 is fed by the operator, or the like, into the filing means 335 in accordance with an image recording menu (the portion of the object the image of which was recorded, the orientation in which the object lay when the image of the object was recorded, and the like), which was set when the image information was recorded by the CR apparatus 11 (e.g., the first CR apparatus 11a).

The fourth profile information P4 may be, for example, the information representing parameters defining the gradation characteristics (the input device characteristics; shown in FIG. 29A) of the first CR apparatus 11a, which is the image information input apparatus 10 that feeds the image information. The fourth profile information P4 is fed from the first CR apparatus 11a into the filing means 335.

How the image processing system 330 operates will be described hereinbelow.

Firstly, the operator, or the like, feeds an instruction into the image processing system 330 such that predetermined image information having been detected by the first CR apparatus 11a may be displayed on the first CRT display device 21a. Also, the operator, or the like, feeds the information (the second profile information P2), which represents the image processing parameters concerning the image quality to be obtained, and the information (the third profile information P3), which represents the parameters corresponding to the read-out sensitivity and the latitude in accordance with the image recording menu, into the image processing system 330.

In accordance with the instruction for the displaying on the first CRT display device 21a, the image processing system 330 receives the information (the first profile information P1), which represents the output device characteristics of the first CRT display device 21a, from the first CRT display device 21a. The received first profile information P1 is fed into the filing means 335. Also, in accordance with the instruction for the receiving of the image information having been detected by the first CR apparatus 11a, the image processing system 330 receives the information (the fourth profile information P4), which represents the input device characteristics of the first CR apparatus 11a, from the first CR apparatus 11a. The received fourth profile information P4 is fed into the filing means 335.

Also, in accordance with the aforesaid instruction, the image information S, which has been detected by the first CR apparatus 11a, is fed through the open network 100 into the image processing system 330.

The filing means 335 appends (files) the first profile information P1, the second profile information P2, the third profile information P3, and the fourth profile information P4 to the received image information S.

The image information S, which has been appended with the first, second, third, and fourth pieces of profile information P1, P2, P3, and P4, is fed into the input standardization means 331.

In order for the image information S to be transformed into standard image information, which does not depend upon the gradation characteristics (shown in FIG. 30A) of the first CR apparatus 11a having fed the image information S and depends upon standard gradation characteristics (shown in FIG. 30C) having been set previously., the input standardization means 331 firstly forms a transform processing table (shown in FIG. 30B) in accordance with the fourth profile information P4, which has been appended to the image information S. The transform processing table serves to cancel the dependence of the image information S upon the gradation characteristics of the first CR apparatus 11a. The input standardization means 331 carries out the transform processing on the image information S and in accordance with the formed transform processing table. Also, the input standardization means 331 carries out the transform processing in accordance with the standard gradation characteristics shown in FIG. 30C, and image information Si is thereby obtained. The image information S1, which is obtained from the input standardization means 331, does not depend upon the gradation characteristics of the first CR apparatus la and depends upon the standard gradation characteristics.

Thereafter, the image information S1, which depends upon the standard gradation characteristics, is fed into the normalization processing means 332.

In accordance with the third profile information P3, which is appended to the image information S1, the normalization processing means 332 carries out the normalization processing for appropriately extracting image information S2, which corresponds to an image portion to be used. Therefore, the image information S2, which is obtained from the normalization processing means 332, is the information having been normalized in a predetermined manner.

The image information S2, which has been normalized, and depends upon the standard gradation characteristics, is fed into the image processing means 333.

In accordance with the second profile information P2, which is appended to the image information S2, the image processing means 333 carries out the image processing, which is related to the image quality to be obtained. Therefore, image information S3, which is obtained from the image processing means 333, is the information having been subjected to the predetermined image processing.

The image information S3 is then fed into the output standardization means 334.

The output standardization means 334 forms a processing table (not shown) for the transform processing (emphasis processing) in accordance with the first profile information P1, which is appended to the image information S3. The processing table is utilized for carrying out the transform processing such that a visible image, which does not depend upon the modulation transfer function $MTF_{out}$ (shown in FIG. 12A) of the first CRT display device 21a to be fed with the image information and depends upon the standard characteristics $MTF_{sys}$ (shown in FIG. 12B) having been set previously, may be displayed on the first CRT display device 21a. The output standardization means 334 carries out the transform processing on the image information S3 and in accordance with the formed transform processing table, and image information S4 is thereby obtained. The image information S4, which is obtained from the output standardization means 334, is the information having been transformed such that, when it is fed into the first CRT display device 21a and reproduced as a visible image, the visible image may not depend upon the modulation transfer function $MTF_{out}$ of the first CRT display device 21a and may depend upon the standard characteristics $MTF_{sys}$.

Therefore, when the image information S4 is fed into the first CRT display device 21a and reproduced thereby as the visible image, the image information S4 is subjected to transform processing in accordance with the modulation transfer function of the first CRT display device 21a, and the modulation transfer function of the first CRT display device 21a; is thereby canceled.

The displayed visible image is the image, which does not depend upon the gradation characteristics of the first CR apparatus 11a having fed the image information and the frequency characteristics of the first CRT display device 21a fed with the image information. Also, the image has been subjected to the normalization processing appropriate a for the viewing of the image portion to be used and has been subjected to the image processing desired by the operator, such as a medical doctor. Accordingly, an image can be obtained, which has good image quality and can serve as an effective tool in, particularly, the efficient and accurate diagnosis of an illness.

Further, images, which are reproduced from the image information detected by the other CR apparatuses 11b, 11c, and images, which are displayed on the other CRT display device 21b, can also have the image quality in accordance with the uniformly set criterion. Therefore, the comparison of the images can be made easily. The feature also contributes to the enhancement of, particularly, the efficiency and the accuracy of diagnosis of an illness.

The embodiment of FIG. 28 is the embodiment of the tenth image processing system in accordance with the present invention, in which the filing means 335 appends the first, second, third, and fourth pieces of profile information P1, P2, P3, and P4 to the image information S before being fed into the input standardization means 331. Alternatively, as in an image processing system 340 illustrated in FIG. 31, the filing means 335 may append the first, second, and third pieces of profile information P1, P2, and P3 to the image information S1 before being fed into the normalization processing means 332 (i.e., the image information having already been subjected to the transform processing carried out by the input standardization means 331). With the image processing system 340, the same effects as those with the embodiment of FIG. 28 can be obtained. The image processing system 340 illustrated in FIG. 31 constitutes an embodiment of the eleventh image processing system in accordance with the present invention. In this embodiment, the input standardization means 331 carries out the transform processing on the image information S in accordance with the fourth profile information P4, which is fed through a route different from that of the image information S.

Figure 31:
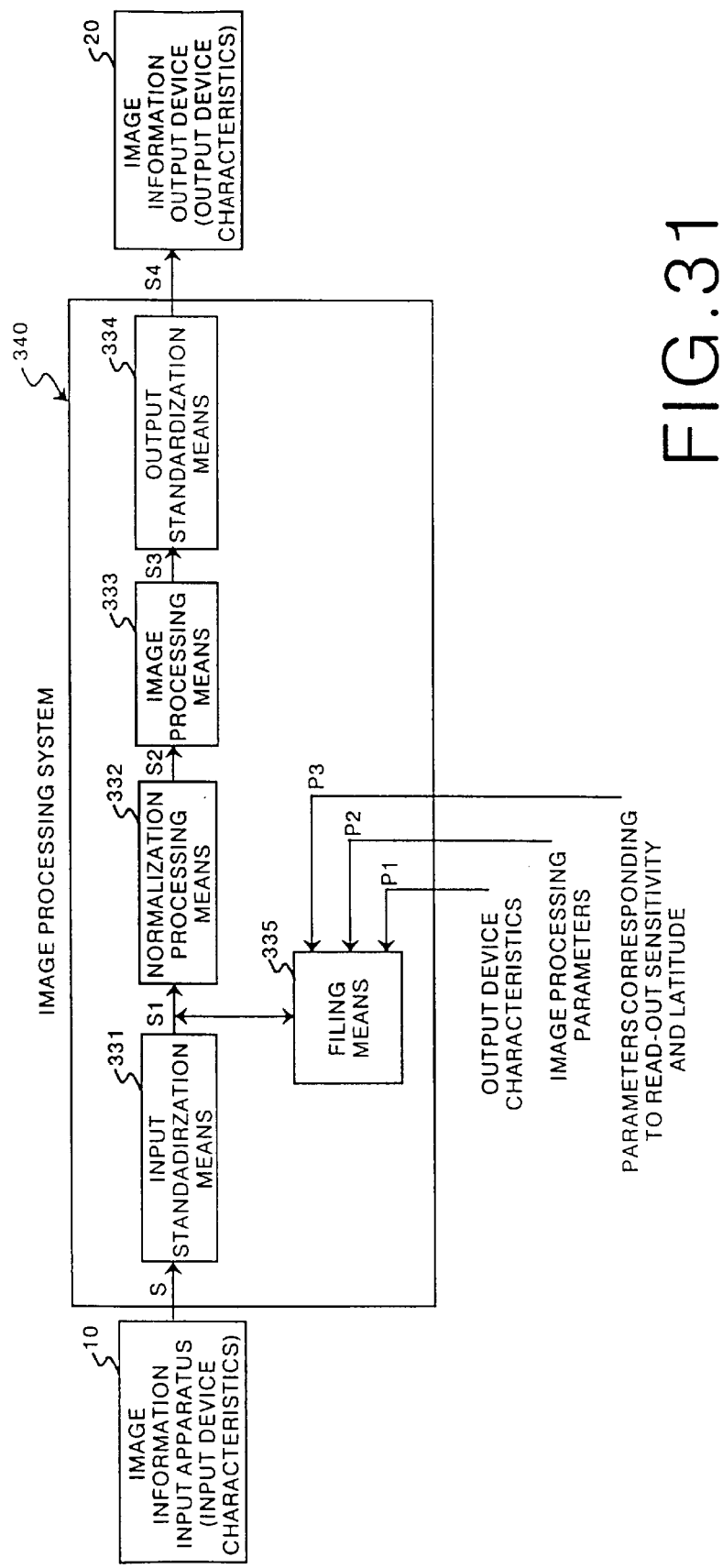
FIG. 31 is a block diagram showing an embodiment of the eleventh image processing system in accordance with the present invention.
Figure 32:
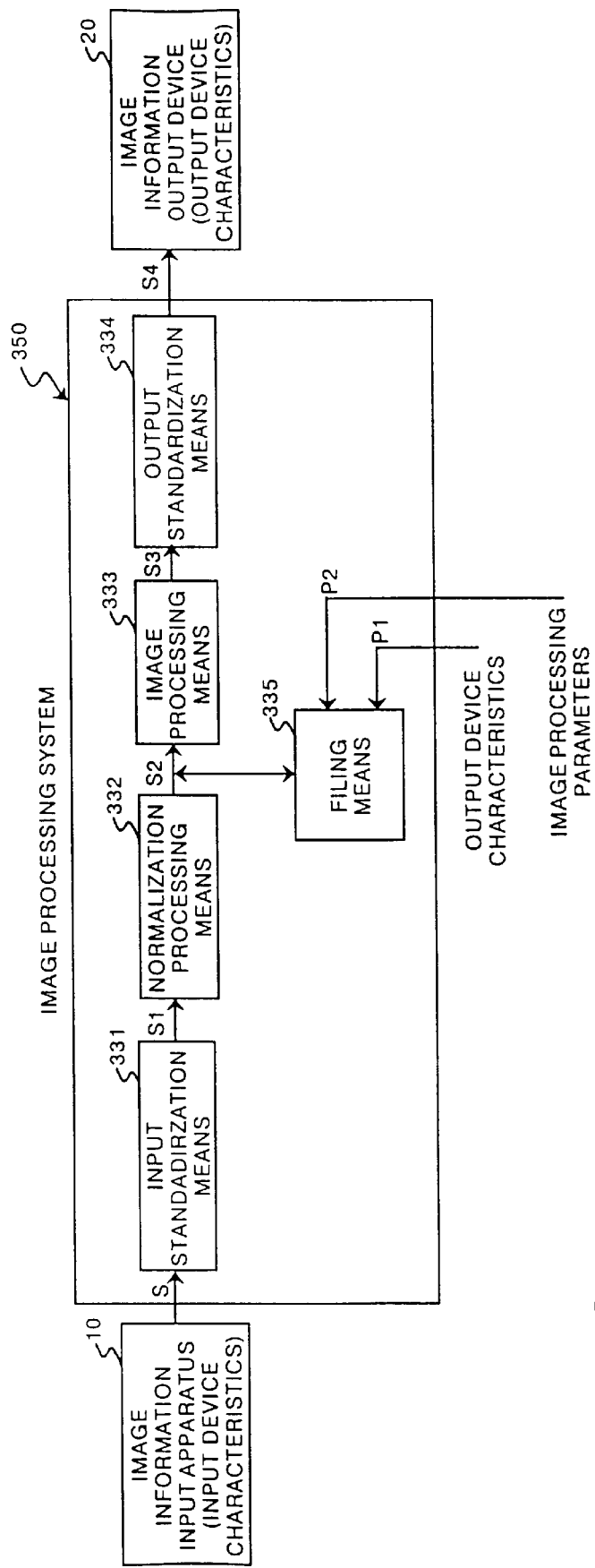
FIG. 32 is a block diagram showing an embodiment of the twelfth image processing system in accordance with the present invention.
Figure 33:
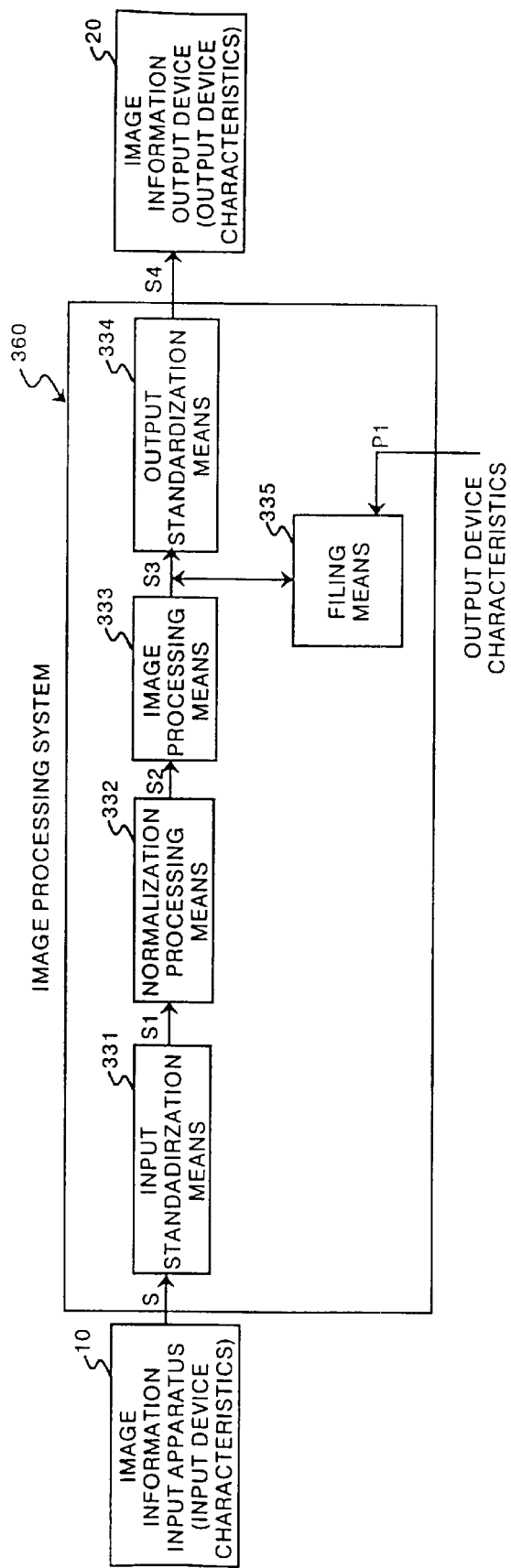
FIG. 33 is a block diagram showing an embodiment of the thirteenth image processing system in accordance with the present invention.

Also, with each of an image processing system 350 illustrated in FIG. 32 and an image processing system 360 illustrated in FIG. 33, the same effects as those with the embodiments of FIGS. 28 and 31 can be obtained.

Specifically, in the image processing system 350 illustrated in FIG. 32, the filing means 335 appends the first and second pieces of profile information P1 and P2 to the image information S2 before being fed into the image processing means 333 (i.e., the image information having already been subjected to the transform processing carried out by the input standardization means 331 and the transform processing carried out by the normalization processing means 332). The image processing system 350 illustrated in FIG. 32 constitutes an embodiment of the twelfth image processing system in accordance with the present invention. In this embodiment, the input standardization means 331 carries out the, transform processing on the image information S in accordance with the fourth profile information P4, which is fed through a route different from that of the image information S. Also, the normalization processing means 332 carries out the transform processing on the image information Si in accordance with the third profile information P3, which is fed through a route different from that of the image information S1.

In the image processing system 360 illustrated in FIG. 33, the filing means 335 appends the first profile information P1 to the image information S3 before being fed into the output standardization means 334 (i.e., the image information having already been subjected to the transform processing carried out by the input standardization means 331, the transform processing carried out by the normalization processing means 332, and the image processing carried out by the image processing means 333). The image processing system 360 illustrated in FIG. 33 constitutes an embodiment of the thirteenth image processing system in accordance with the present invention. In this embodiment, the input standardization means 331 carries out the transform processing on the image information S in accordance with the fourth profile information P4, which is fed through a route different from that of the image information S. Also, the normalization processing means 332 carries out the transform processing on the image information S1 in accordance with the third profile information P3, which is fed through a route different from that of the image information S1. Further, the image processing means 333 carries out the image processing on the image information S2 in accordance with the second profile information P2, which is fed through a route different from that of the image information S2.

Figure 34:
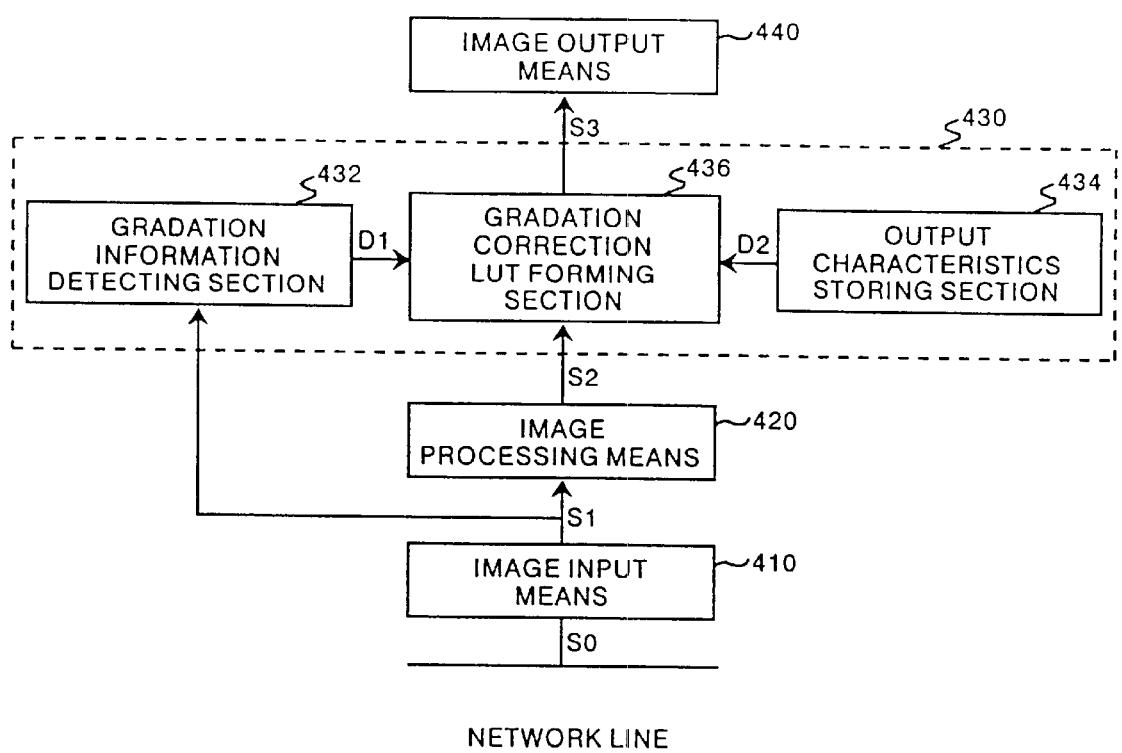
FIG. 34 is a block diagram showing an embodiment of the image output; device in accordance with the present invention.

An embodiment of the image output device in accordance with the present invention will be described hereinbelow. FIG. 34 is a block diagram showing an embodiment of the image output device in accordance with the present invention.

With reference to FIG. 34, the image output device comprises an image input means 410 for obtaining image information (an image signal) S0 from one of various apparatuses, such as CR apparatuses, CT scanners, and MRI apparatuses, which are connected to a network line. The image output device also comprises an image processing means 420 for carrying out predetermined image processing on an image signal S1, which is obtained from the image input means 410. The image output device further comprises a gradation correcting means 430 for correcting the gradation of an image signal S2, which is obtained from the image processing means 420. The image output device still further comprises an image output means 440 for reproducing a visible image from an image signal S3, whose gradation has been corrected by the gradation correcting means 430. The image information S0 which is fed into the image input means 410, is not limited to the medical image information detected by the CR apparatuses, CT scanners, MRI apparatuses, or the like, and may be various other kinds of image information.

The image processing means 420 carries out predetermined image processing on the image signal S1, which has been received from the image input means 410. In cases where the image processing need not be carried out, the image processing means 420 may be omitted. In such cases, the image signal S1 may be fed directly from the image input means 410 into the gradation correcting means 430.

The gradation correcting means 430 comprises a gradation information detecting section 432 for detecting gradation information, which is appended to the image signal S1 received from the image input means 410, and an output characteristics storing section 434 for storing information, which represents the gradation characteristics of the image output means 440. The gradation correcting means 430 also comprises a gradation correction LUT forming section 436. The gradation correction LUT forming section 436 forms a gradation correction look-up table (gradation correction LUT) in accordance with the output gradation information, which has been detected by, the gradation information detecting section 432, and the gradation characteristics of the image output means 440, which are stored in the output characteristics storing section 434. The gradation correction LUT forming section 436 also corrects the gradation of the image signal S2, which is received from the image processing means 420, in accordance with the gradation correction LUT.

How the image output device operates will be described hereinbelow. The image signal S0, which is obtained from one of various apparatuses (such as CR apparatuses, CT scanners, and MRI apparatuses) connected to the network line, is appended with subsidiary information representing the output gradation, which was assumed when image processing was carried out in the apparatus. (The subsidiary information will hereinbelow be referred to as the "assumed output gradation information.") The assumed output gradation information may take on any form, which can define the output gradation assumed at the time of the image processing. For example, the assumed output gradation information may be given as lattice point data of a look-up table (LUT) or as a γ value.

Figure 35A:
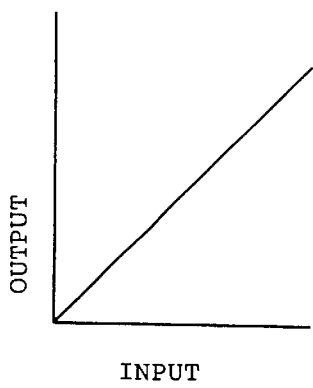
FIGS. 35A, 35B, and 35C are explanatory graphs showing how a gradation correction look-up table is formed in the embodiment of the image output device shown in FIG. 34.
Figure 35B:
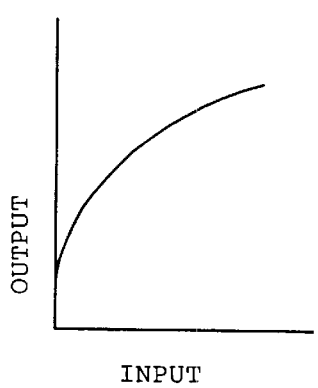
Figure 35C:
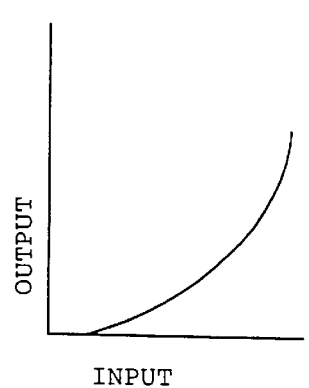

The image input means 410 receives the image signal S0 from one of the various kinds of apparatuses connected to the network line and feeds the image signal S1 into the image processing means 420 and the gradation information detecting section 432 of the gradation correcting means 430. The assumed output gradation information D1, which is appended to the image signal S1, is detected by the gradation information detecting section 432, and the assumed output gradation information D1 having been detected is fed into the gradation correction LUT forming section 436. The output characteristics storing section 434 stores the gradation characteristics information D2, which represents the gradation characteristics of the image output means 440. The gradation characteristics information D2 is fed into the gradation correction LUT forming section 436. The gradation correction LUT forming section 436 makes reference to the assumed output gradation information D1 and the gradation characteristics information D2 and forms the gradation correction LUT such that the gradation of the output image, which is ultimately reproduced by the image output device (i.e., by the image output means 440), may become identical with the gradation, which is represented by the assumed output gradation information D1. For example, the assumed output gradation information D1 may represent the straight-line gradation characteristics as illustrated in FIG. 35A, and the gradation characteristics information D2 may represent the curved-line gradation characteristics as illustrated in FIG. 35B. In such cases, a gradation correction LUT, which represents the curved-line gradation characteristics illustrated in FIG. 35C, is formed such that, when the gradation characteristics shown in FIG. 35B and the gradation characteristics shown in FIG. 35C are combined together, the gradation characteristics shown in FIG. 35A may be obtained.

In accordance with the thus formed gradation correction LUT, the gradation correction LUT forming section 436 corrects the gradation of the image signal S2, which has been fed into the gradation correction LUT forming section 436. The corrected image signal S3 is fed into the image output means 440. The image signal S3, which has been fed into the image output means 440, is reproduced as a visible image by the image output means 440.

The image signal S3, which is fed into the image output means 440 in the manner described above, is the one whose gradation has been corrected by the gradation correction LUT forming section 436 such that the output gradation may coincide with the assumed output gradation information D1. Therefore, the image reproduced by the image output means 440 is reproduced with the output gradation identical with the assumed output gradation information D1.

Accordingly, with the image output device having the constitution described above, in every case, the gradation intended at the time of the image processing can be obtained. Specifically, in cases where the assumed output gradation varies for different images, an appropriate correction of gradation can be made with respect to each image, and therefore each image can be reproduced with the assumed output gradation.

In the embodiment of the image output device in accordance with the present invention, the gradation correction LUT forming section 436 of the gradation correcting means 430 makes reference to the assumed output gradation information D1 and the gradation characteristics information D2, which have been fed into the gradation correction LUT forming section 436, and forms the gradation correction LUT such that the gradation of the ultimately reproduced image may become identical with the assumed output gradation. However, the image output device in accordance with the present invention is not limited to the aforesaid embodiment.

For example, instead of the gradation correction LUT forming section 436 being provided, the gradation correcting means 430 may be provided with a plurality of gradation correction look-up tables, which have different correction characteristics for correcting the gradation of the image signal S2 fed into the gradation correcting means 430, and a selection means for selecting a gradation correction look-up table from the plurality of the gradation correction look-up tables. In such cases, a gradation correction look-up table may be selected, which is among the plurality of the gradation correction look-up tables and has the correction characteristics such that the gradation of the output image reproduced by the image output means 440 may become closest to the assumed output gradation represented by the assumed output gradation information D1. Also, the gradation of the image signal, which has been fed into the gradation correcting means 430, may be corrected in accordance with the selected gradation correction look-up table. The image signal S3 having thus been corrected may be fed into the image output means 440 and reproduced as a visible image by the image output means 440. In such cases, approximately the same effects as those with the embodiment shown in FIG. 34 can be obtained.

What is claimed is:

1. An image processing system, to which at least one kind of image input modality and at least one kind of image information output device are connected, at least one kind of image input modality, which is among connected image input modalities, including a plurality of image information input apparatuses, which have different input device characteristics, the image processing system comprising:

a standardization means for carrying out transform processing on image information, said transform processing being carried out such that, in every case where said image information has been received from one image information input apparatus, which is among the plurality of the image information input apparatuses, said received image information may be transformed into standard image information, which does not depend upon the input device characteristics of said one image information input apparatus having fed said image information and depends upon standard device characteristics having been set previously for the image input modality including said one image information input apparatus having fed said image information, wherein said image input modality comprises a medical radiation image input modality.

2. A system as defined in claim 1 wherein said input device characteristics are characteristics concerning gradation of said image information.

3. A system as defined in claim 1 wherein said input device characteristics are characteristics concerning response of said image information.

4. A system as defined in claim 1 wherein said standardization means comprises:

a) a device characteristics detecting means for detecting said input device characteristics, upon which said received image information depends, b) an input device characteristics cancel processing means for canceling the dependence of said received image information upon said input device characteristics, and c) a standardization processing means for transforming said received image information, whose dependence upon said input device characteristics has been canceled, into said standard image information.

5. The image processing system according to claim 1 wherein said input apparatus imparts a first transformation to input image data to provide said image information, and said standardization means transforms the image information provided by the input apparatus using an inverse relationship of the first transformation to provide transformed data having a format of the input image data.

6. The image processing system according to claim 5, wherein said modality comprises at least one of computed radiography, computed tomography, magnetic resonance imaging, and radioisotope data.

7. An image processing system, to which at least two kinds of image input modalities and at least one kind of image information output device are connected, the image processing system comprising:

a standardization means for carrying out transform processing in image information, said transform processing being carried out such that, in every case where said image information has been received from an image information input apparatus belonging to one image input modality, which is among the connected image input modalities, said received image information may be transformed into standard image information, which does not depend upon input device characteristics of said image information input apparatus having fed said image information and depends upon standard device characteristics of the system that have been set previously, wherein said image input modalities comprise medical radiation image input modalities.

8. A system as defined in claim 7 wherein said input device characteristics are characteristics concerning gradation of said image information.

9. A system as defined in claim 7 wherein said input device characteristics are characteristics concerning response of said image information.

10. A system as defined in claim 7 wherein said standardization means comprises:

a) a device characteristics detecting means for detecting said input device characteristics, upon which said received image information depends, b) an input device characteristics cancel processing means for canceling the dependence of said received image information upon said input device characteristics, and c) a standardization processing means for transforming said received image information, whose dependence upon said input device characteristics has been canceled, into said standard image information.

11. An image processing system, to which at least one kind of image input modality and at least one kind of image information output device are connected, at least one kind of image information output device, which is among connected image information output devices, including a plurality of image information output devices, which have different output device characteristics, the image processing system comprising:

a standardization means for carrying out transform processing on image information, which is to be fed into an image information output device, said transform processing being carried out such that, in every case where said image information is to be fed into one image information output device, which is among the plurality of the image information output devices, said image information may be reproduced by said one image information output device to be fed with said image information and as a standard image, which does not depend upon the output device characteristics of said one image information output device to be fed with said image information and depends upon standard device characteristics having been set previously for the kind of said one image information output device to be fed with said image information, wherein said image input modality comprises a medical radiation image input modality.

12. A system as defined in claim 11 wherein said output device characteristics are characteristics concerning gradation of said image information.

13. A system as defined in claim 11 wherein said output device characteristics are characteristics concerning response of said image information.

14. A system as defined in claim 11 wherein said standardization means comprises:
   a) an output device characteristics detecting means for detecting said output device characteristics of said one image information output device to be fed with said image information,
   b) an output device characteristics cancel processing means for canceling the dependence of said image information, which is reproduced by said one image information output device, upon said output device characteristics of said one image information output device, and
   c) a standardization processing means for transforming said image information, whose dependence upon said output device characteristics has been canceled, into image information, which depends upon standard characteristics having been set for the kind of said one image information output device.

15. The image processing system according to claim 11 wherein said output device imparts a first transformation to output image data, and said standardization means transforms the image information input to the output device using an inverse relationship of the first transformation.

16. The image processing system according to claim 15, wherein said first inverse transformation comprises a modulation transfer function.

17. An image processing system, to which at least one kind of image input modality and at least two kinds of image information output devices are connected,
   the image processing system comprising:
   a standardization means for carrying out transform processing on image information, which is to be fed into an image information output device, said transform processing being carried out such that, in every case where said image information is to be fed into one image information output device, which is among the plurality of the image information output devices, said image information may be reproduced by said one image information output device to be fed with said image information and as a standard image, which does not depend upon output device characteristics of said one image information output device characteristics of said one image information output device to be fed with said image information and depends upon standard device characteristics of the system that have been set previously, wherein said image input modality comprises a medical radiation image input modality.

18. A system as defined in claim 17 wherein said output device characteristics are characteristics concerning gradation of said image information.

19. A system as defined in claim 17 wherein said output device characteristics are characteristics concerning response of said image information.

20. A system as defined in claim 17 wherein said standardization means comprises:
   a) an output device characteristics detecting means for detecting said output device characteristics of said one image information output device to be fed with said image information,
   b) an output device characteristics cancel processing means for canceling the dependence of said image information, which is reproduced by said one image information output device, upon said output device characteristics of said one image information output device, and
   c) a standardization processing means for transforming said image information, whose dependence upon said output device characteristics has been canceled, into image information, which depends upon standard characteristics of the system that have been set previously.

21. An image processing system, to which at least one kind of image input modality and least one kind of image information output device are connected,
   at least one kind of image input modality, which is among connected image input modalities, including a plurality of image information input apparatuses, which have different input device characteristics,
   at least one kind of image information output device, which is among connected image information output devices, including a plurality of image information output devices, which have different output device characteristics,
   the image processing system comprising:
   a standardization means for carrying out transform processing on image information, said transform processing being carried out such that, in every case where said image information has been received from one image information input apparatus, which is among the plurality of the image information input apparatuses, said image information is to be fed into one image information output device, which is one of the plurality of the image information output devices, said image information may be reproduced by said one image information output device to be fed with said image information and as a standard image, which does not depend upon the input device characteristics of said one image information input apparatus having fed said image information and the output device characteristics of said one image information output device to be fed with said image information and depends upon standard device characteristics having been set previously for the kind of the image input modality including said one image information input apparatus; having fed said image information and for the kind of said one image information output device to be fed with said image information, wherein said image input modality comprises a medical radiation image input modality.

22. A system as defined in claim 21 Wherein said input device characteristics are characteristics concerning gradation of said image information.

23. A system as defined in claim 21 wherein said input device characteristics are characteristics concerning response of said image information.

24. A system as defined in claim 21 wherein said output device characteristics are characteristics concerning gradation of said image information.

25. A system as defined in claim 21 wherein said output device characteristics are characteristics concerning response of said image information.

26. A system as defined in claim 21 wherein said standardization means comprises:
a) a device characteristics detecting means for detecting said input device characteristics of said one image information input apparatus having fed said image information and said output device characteristics of said one image information output device to be fed with said image information,
b) a device characteristics cancel processing means for canceling the dependence of said image information, which has been received from said one image information input apparatus and is reproduced by said one image information output device, upon said input device characteristics of said one image information input apparatus and said output device characteristics of said one image information output device, and
c) a standardization processing means for transforming said image information, whose dependence upon said input device characteristics and said output device characteristics has been canceled, into image information, which depends upon standard characteristics having been set for the combination of the kind of the image input modality including said one image information input apparatus and the kind of said one image information output device.

27. The image processing system according to claim 21 wherein said input apparatus imparts a first transformation to input image data to provide said image information, and said standardization means transforms the image information transformed by the input device using an inverse relationship of the first transformation to provide transformed data having a format of the input image data.

28. The image processing system according to claim 27, wherein said modality comprises at least one of computed radiography, computed tomography, magnetic resonance imaging, and radioisotope data.

29. An image processing system, to which at least two kinds of image input modalities and at least two kinds of image information output devices are connected,
the image processing system comprising:
a standardization means for carrying out transform processing on image information, said transform processing being carried out such that, in every case where said image information has been received from an image information input apparatus belonging to one image input modality, which is among the connected image input modalities, and said image information is to be fed into one image information output device, which is among the plurality of the image information output devices, said image information may be reproduced by said one image information output device to be fed with said image information and as a standard image, which does not depend upon input device characteristics of said image information input apparatus having fed said image information and output device characteristics of said on image information output device to be fed with said image information and depends upon standard device characteristics that have been set previously, wherein said image input modalities comprise medical radiation image input modalities.

30. A system as defined in claim 29 wherein said input device characteristics are characteristics concerning gradation of said image information.

31. A system as defined in claim 29 wherein said input device characteristics are characteristics concerning response of said image information.

32. A system as defined in claim 29 wherein said output device characteristics are characteristics concerning gradation of said image information.

33. A system as defined in claim 29 wherein said output device characteristics are characteristics concerning response of said image information.

34. A system as defined in claim 29 wherein said standardization means comprises:
a) a device characteristics detecting means for detecting said input device characteristics of said image information input apparatus having fed said image information and said output device characteristics of said one image information output device to be fed with said image information,
b) a device characteristics cancel processing means for canceling the dependence of said image information, which has been received from said image information input apparatus and is reproduced by said one image information output device, upon said input device characteristics of said image information input apparatus and said output device characteristics of said one image information output device, and
c) a standardization processing means for transforming said image information, whose dependence upon said input device characteristics and said output device characteristics has been canceled, into image information, which depends upon standard characteristics of the system that have been set previously.

35. An image processing system, to which at least one kind of image information input apparatus and at least one kind of image information output device are connected,
the image processing system comprising:
i) a standardization means for carrying out transform processing on image information and in accordance with response characteristics of one image information output device, into which said image information is to be fed, such that said image information may be reproduced by said one image information output device to be fed with said image information and as an image, which does not depend upon the response characteristics of said one image information output device to be fed with said image information and depends upon standard response characteristics having been set previously,
ii) a response characteristics variation calculating means for calculating a variation component of said image from said standard response characteristics in cases where said image reproduced by said one image information output device is subjected to image size enlargement processing with a desired scale of enlargement or image size reduction processing with a desired scale of reduction, and
iii) a correction means for carrying out frequency emphasis processing on said image information such that said variation component may be compensated for.

36. A system as defined in claim 35 wherein said response characteristics variation calculating means calculates response characteristics, which occur after said image size enlargement processing or said image size reduction processing, in accordance with parameters, which define details of interpolation processing in accordance with said scale of enlargement or said scale of reduction, and said response characteristics variation calculating means thereby calculates said variation component.

37. The image processing system according to claim 35 wherein said output device imparts a first transformation to output image data, and said standardization means transforms the image information to be provided to the output device using an inverse relationship of the first transformation.

38. The image processing system according to claim 37, wherein said first inverse transformation comprises a modulation transfer function.

39. An image processing system, to which at least one kind of image information input apparatus and at least one kind of image information output device are connected,
the image processing system comprising:
i) a standardization means for carrying out transform processing on image information and in accordance with response characteristics of one image information output device, into which said image information is to be fed, such that said image information may be reproduced by said one image information output device to be fed with said image information and as an image, which does not depend upon the response characteristics of said one image information output device to be fed with said image information and depends upon standard response characteristics having been set previously,
ii) a response characteristics variation calculating means for calculating a variation component of said image from said standard response characteristics in cases where said image reproduced by said one image information output device is subjected to image size enlargement processing with a desired scale of enlargement or image size reduction processing with a desired scale of reduction, and
iii) a correction means for correcting parameters, which define details of said transform processing carried out by said standardization means, such that said variation component may be compensated for.

40. An image processing system, to which at least one kind of image information input apparatus and at least one kind of image information output device are connected,
the image processing system comprising:
i) a standardization means for carrying out transform processing on image information and in accordance with response characteristics of one image information output device, into which said image information is to be fed, such that said image information may be reproduced by said one image information output device to be fed with said image information and as an image, which does not depend upon the response characteristics of said one image information output device to be fed with said image information and depends upon standard response characteristics having been set previously,
ii) a response characteristics variation calculating means for calculating a variation component of said image from said standard response characteristics in cases where said image reproduced by said one image information output device is subjected to image size enlargement processing with a desired scale of enlargement or image size reduction processing with a desired scale of reduction, and
iii) a correction means for correcting parameters, which define details of interpolation processing accompanying said image size enlargement processing or accompanying said image size reduction processing, such that said variation component may be compensated for.

41. An image processing system, to which at least one image information input apparatus having inherent input device characteristics and at least one image information output device having inherent output device characteristics are connected,
the image processing system comprising:
i) an input standardization means for carrying out transform processing on image information, said transform processing being carried out such that, in every case where said image information has been received from one image information input apparatus, which is among connected image information input apparatuses, said received image information may be transformed into standard image information, which does not depend upon the input device characteristics of said one image information input apparatus having fed said image information and depends upon standard device characteristics having been set previously,
ii) a normalization processing means for carrying out normalization processing for normalizing and extracting image information, which is contained in said standard image information and corresponds to a desired image portion,
iii) an image processing means for carrying out desired image processing on said image information, which has been normalized by said normalization processing means,
iv) an output standardization means for carrying out transform processing on said image information, which has been obtained from said image processing, said transform processing being carried out such that, in every case where said image information, which has been obtained from said image processing, is to be fed into and reproduced as a visible image by one image information output device, which is among connected image information output devices, said image may be reproduced by said one image information output device to be fed with said image information and as an image, which does not depend upon the output device characteristics of said one image information output device to be fed with said image information and depends upon standard device characteristics having been set previously, and
v) a filing means for appending pieces of profile information to said image information, which is fed into said input standardization means, said pieces of profile information comprising first profile information, which is necessary for defining details of said transform processing carried out by said output standardization means, second profile information, which is necessary for defining details of said image processing carried out by said image processing means, third profile information, which is necessary for defining details of said normalization processing carried out by said normalization processing means, and fourth profile information, which is necessary for defining details of said transform processing carried out by said input standardization means.

42. The image processing system according to claim 41 wherein said input apparatus imparts a first transformation to input image data to output said image information, and said standardization means transforms the image information using an inverse relationship of the first transformation to provide transformed data having a format of the input image data.

43. The image processing system according to claim 42, wherein said modality comprises at least one of computed radiography, computed tomography, magnetic resonance imaging, and radioisotope data.

44. An image processing system, to which at least one image information input apparatus having inherent input device characteristics and at least one image information output device having inherent output device characteristics are connected, the image processing system comprising:
i) an input standardization means for carrying out transform processing on image information, said transform processing being carried out such that, in every case where said image information has been received from one image information input apparatus, which is among connected image information input apparatuses, said received image information may be transformed into input standard image information, which does not depend upon the input device characteristics of said one image information input apparatus having fed said image information and depends upon standard device characteristics having been set previously,
ii) a normalization processing means for carrying;out normalization processing for normalizing and extracting image information, which is contained in said input standard image information and corresponds to a desired image portion,
iii) an image processing means for carrying out desired image processing on said image information, which has been normalized by said normalization processing means,
iv) an output standardization means for carrying out transform processing on said image information, which has been obtained from said image processing, said transform processing being carried out such that, in every case where said image information, which has been obtained from said image processing, is to be fed into and reproduced as a visible image by one image information output device, which is among connected image information output devices, said image may be reproduced by said one image information output device to be fed with said image information and as an image, ;which does not depend upon the output device characteristics of said one image information output device to be fed with said image information and depends upon standard device characteristics having been set previously, and
v) a filing means for appending pieces of profile information to said input standard image information, said pieces of profile information comprising first profile information, which is necessary for defining details of said transform processing carried out by said output standardization means, second profile information, which is necessary for defining details of said image processing carried out by said image processing means, and third profile information, which is necessary for defining details of said normalization processing carried out by said normalization processing means.

45. An image processing system, to which at least one image information input apparatus having inherent input device characteristics and at least one image information output device having inherent output device characteristics are connected, the image processing system comprising:
i) an input standardization means for carrying out transform processing on image information, said transform processing being carried out such that, in every case where said image information has been received from one image information input apparatus, which is among connected image information input apparatuses, said received image information may be transformed into input standard image information, which does not depend upon the input device characteristics of said one image information input apparatus having fed said image information and depends upon standard device characteristics having been set previously,
ii) a normalization processing means for carrying out normalization processing for normalizing and extracting image information, which is contained in said input standard image information and corresponds to a desired image portion,
iii) an image processing means for carrying out desired image processing on said image information, which has been normalized by said normalization processing
iv) an output standardization means for carrying out transform processing on said image information, which has been obtained from said image processing, said transform processing being carried out such that, in every case where said image information, which has been obtained from said image processing, is to be fed into and reproduced as a visible image by one image information output device, which is among connected image information output devices, said image may be reproduced by said one image information output device to be fed with said image information and as an image, which does not depend upon the output device characteristics of said one image information output device to be fed with a said image information an d depends upon standard device characteristics having been set previously, and
v) a filing means for appending pieces of profile information to said image information, which has been normalized, said pieces of profile information comprising first profile information, which is necessary for defining details of said transform processing carried out by said output standardization means, and second profile information, which is necessary for defining details of said image processing carried out by said image processing means.

46. An image processing system, to which at least one image information input apparatus having inherent input device characteristics and at least one image information output device having inherent output device characteristics are connected, the image processing system comprising:
i) an input standardization means for carrying out transform processing on image information, said transform processing being carried out such that, in every case where said image information has been received from one image information input apparatus, which is among connected image information input apparatuses, said received image information may be transformed into input standard image information, which does not depend upon the input device characteristics of said one image information input apparatus having fed said image information and depends upon standard device characteristics having been set previously,
ii) a normalization processing means for carrying out normalization processing for normalizing and extracting image information, which is contained in said input standard image information and corresponds to a desired image portion, iii) an image processing means for carrying out desired image processing on said image information, which has been normalized by said normalization processing means, iv) an output standardization means for carrying out transform processing on said image information, which has been obtained from said image processing, said transform processing being carried out such that, in every case where said image information, which has been obtained from said image processing, is to be fed into and reproduced as a visible image by one image information output device, which is among connected image information output devices, said image may be reproduced by said one image information output device to be fed with said image information and as an image, which does not depend upon the output device characteristics of said one image information output device to be fed with said image information and depends upon standard device characteristics having been set previously, and v) a filing means for appending profile information to said image information, which has been obtained from said image processing, said profile information being first profile information, which is necessary for defining details of said transform processing carried out by said output standardization means.

47. An image information filing method in an image processing system, to which at least one image information input apparatus having inherent input device characteristics and at least one image information output device having inherent output device characteristics are connected, the image processing system comprising:

i) an input standardization means for carrying out transform, processing on image information, said transform processing being carried out such that, in every case where said image information has been received from one image information input apparatus, which is among connected image information input apparatuses, said received image information may be transformed into standard image information, which does not depend upon the input device characteristics of said one image information input apparatus having fed said image information and depends upon standard device characteristics having been set previously, ii) a normalization processing means for carrying out normalization processing for normalizing and extracting image information, which is contained in said standard image information and corresponds to a desired image portion, iii) an image processing means for carrying out desired image processing on said image information, which has been normalized by said normalization processing means, and iv) an output standardization means for carrying out transform processing on said image information, which has been obtained from said image processing, said transform processing being carried out such that, in every case where said image information, which has been obtained from said image processing, is to be fed into and reproduced as a visible image by one image information output device, which is among connected image information output devices, said image may be reproduced by said one image information output device to be fed with said image information and as an image, which does not depend upon the output device characteristics of said one image information output device to be fed with said image information and depends upon standard device characteristics having been set previously, the image information filing method comprising:

appending pieces of profile information to said image information, which is fed into said input standardization means, said pieces of profile information comprising first profile information, which is necessary for defining details of said transform processing carried out by said output standardization means, second profile information, which is necessary for defining details of said image processing carried out by said image processing means, third profile information, which is necessary for defining details of said normalization processing carried out by said normalization processing means, and fourth profile information, which is necessary for defining details of said transform processing carried out by said input standardization means.

48. An image information filing method in an image processing system, to which at least one image information input apparatus having inherent input device characteristics and at least one image information output device having inherent output device characteristics are connected, the image processing system comprising:

i) an input standardization means for carrying out transform processing on image information, said transform processing being carried out such that, in every case where said image information has been received from one image information input apparatus, which is among connected image information input apparatuses, said received image information may be transformed into input standard image information, which does not depend upon the input device characteristics of said one image information input apparatus having fed said image information and depends upon standard device characteristics having been set previously, ii) a normalization processing means for carrying out normalization processing for normalizing and extracting image information, which is contained in said input standard image information and corresponds to a desired image portion, iii) an image processing means for carrying out desired image processing on said image information, which has been normalized by said normalization processing means, and iv) an output standardization means for carrying out transform processing on said image information, which has been obtained from said image processing, said transform processing being carried out such that, in every case where said image information, which has been obtained from said image processing, is to be fed into and reproduced as a visible image by one image information output device, which is among connected image information output devices, said image may be reproduced by said one image information output device to be fed with said image information and as an image, which does not depend upon the output device characteristics of said one image information output device to be fed with said image information and depends upon standard device characteristics having been set previously, the image information filing method comprising:

appending pieces of profile information to said input standard image information, said pieces of profile information comprising first profile information, which is necessary for defining details of said transform processing carried out by said output standardization means, second profile information, which is necessary for defining details of said image processing carried out by said image processing means, and third profile information, which is necessary for defining details of said normalization processing carried out by said normalization processing means.

49. An image information filing method in an image processing system, to which at least one image information input apparatus having inherent input device characteristics and at least one image information output device having inherent output device characteristics are connected, the image processing system comprising:

i) an input standardization means for carrying out transform processing on image information, said transform processing being carried out such that, in every case where said image information has been received from one image information input apparatus, which is among connected image information input apparatuses, said received image information may be transformed into input standard image information, which does not depend upon the input device characteristics of said one image information input apparatus having fed said image information and depends upon standard device characteristics having been set previously, ii) a normalization processing means for carrying out normalization processing for normalizing and extracting image information, which is contained in said input standard image information and corresponds to a desired image portion, iii) an image processing means for carrying out desired image processing on said image information, which has been normalized by said normalization processing means, and iv) an output standardization means for carrying out transform processing on said image information, which has been obtained from said image processing, said transform processing being carried out such that, in every case where said image information, which has been obtained from said image processing, is to be fed into and reproduced as a visible image by one image information output device, which is among connected image information output devices, said image may be reproduced by said one image information output device to be fed with said image information and as an image, which does not depend upon the output device characteristics of said one image information output device to be fed with said image information and depends upon standard device characteristics having been set previously, the image information filing method comprising:
appending pieces of profile information to said image informtion, which has been normalized, said pieces of profile information comprising first profile information, which is necessary for defining details of said transform processing carried out by said output standardization means, and second profile information, which is necessary for defining details of said image processing carried out by said image processing means.

50. An image information filing method in an image processing system, to which at least one image information input apparatus having inherent input device characteristics and at least one image information output device having inherent output device characteristics are connected, the image processing system comprising:

i) an input standardization means for carrying out transform processing on image information, said transform processing being carried out such that, in every case where said image information has been received from one image information input apparatus, which is among connected image information input apparatuses, said received image information may be transformed into input standard image information, which does not depend upon the input device characteristics of said one image information input apparatus having fed said image information and depends upon standard device characteristics having been set previously, ii) a normalization processing means for carrying out normalization processing for normalizing and extracting image information, which is contained in said input standard image information and corresponds to a desired image portion, iii) an image processing means for carrying out desired image processing on said image information, which has been normalized by said normalization processing means, and iv) an output standardization means for carrying out transform processing on said image information, which has been obtained from said image processing, said transform processing being carried out such that, in every case where said image information, which has been obtained from said image processing, is to be fed into and reproduced as a visible image by one image information output device, which is among connected image information output devices, said image may be reproduced by said one image information output device to be fed with said image information and as an image, which does not depend upon the output device characteristics of said one image information output device to be fed with said image information and depends upon standard device characteristics having been set previously, the image information filing method comprising:
appending profile information to said image information, which has been obtained from said image processing, said profile information being first profile information, which is necessary for defining details of said transform processing carried out by said output standardization means.

51. An image output device, comprising:

i) an image output means for reproducing a visible image from image information, which has been subjected to image processing carried out by assuming output gradation and is provided with subsidiary information representing said assumed output gradation, and ii) a gradation correcting means for correcting the gradation of said image information in accordance with said subsidiary information and output gradation characteristics of said image output means, the correction being made such that the gradation of the output image reproduced by said image output means may approximately coincide with said assumed output gradation, wherein said image information is formed from a medical radiation image apparatus.

52. A device as defined in claim 51 wherein said gradation correcting means is provided with a look-up table forming means for forming a gradation correction look-up table such that the gradation of the output image reproduced by said image output means may approximately coincide with said assumed output gradation, and said gradation correcting means transforms the gradation of said image information in accordance with the formed gradation correction look-up table.

53. A device as defined in claim 51 wherein said gradation correcting means comprises:

a plurality of gradation correction look-up tables having different correction characteristics for correcting the gradation of said image information, and a selection means for selecting a gradation correction look-up table, which is among the plurality of the gradation correction look-up tables and has the correction characteristics such that the gradation of the output image reproduced by said image output means may become closest to said assumed output gradation.

* * * * *